United States Patent
Arai

(10) Patent No.: US 10,514,011 B2
(45) Date of Patent: Dec. 24, 2019

(54) STARTING POWER GENERATION APPARATUS AND STARTING POWER GENERATION METHOD

(71) Applicant: SHINDENGEN ELECTRIC MANUFACTURING CO., LTD., Tokyo (JP)

(72) Inventor: Tatsuya Arai, Hanno (JP)

(73) Assignee: SHINDENGEN ELECTRIC MANUFACTURING CO., LTD., Tokyo (JP)

(*) Notice: Subject to any disclaimer, the term of this patent is extended or adjusted under 35 U.S.C. 154(b) by 28 days.

(21) Appl. No.: 15/766,431

(22) PCT Filed: Oct. 4, 2016

(86) PCT No.: PCT/JP2016/079497
§ 371 (c)(1),
(2) Date: Apr. 6, 2018

(87) PCT Pub. No.: WO2018/066065
PCT Pub. Date: Apr. 12, 2018

(65) Prior Publication Data
US 2019/0085809 A1    Mar. 21, 2019

(51) Int. Cl.
*F02N 11/04* (2006.01)
*H02P 9/04* (2006.01)
(Continued)

(52) U.S. Cl.
CPC ............ *F02N 11/04* (2013.01); *F02N 11/08* (2013.01); *F02N 11/087* (2013.01); *H02K 3/28* (2013.01);
(Continued)

(58) Field of Classification Search
CPC .......... F02N 11/00; F02N 11/04; F02N 11/08; F02N 11/087; H02P 9/009; H02P 9/08
See application file for complete search history.

(56) References Cited

U.S. PATENT DOCUMENTS 6,278,194 B1 * 8/2001 Nakagawa ............ F02N 11/04
290/31
7,554,303 B1    6/2009 Kawamura
(Continued)

FOREIGN PATENT DOCUMENTS

| DE | 10 2015 117 912 A1 | 4/2016 |
| JP | 2003-83209 A | 3/2003 |

(Continued)

OTHER PUBLICATIONS

International Search Report dated Dec. 27, 2016 in International Application No. PCT/JP2016/079497, with English Translation (3 pages).
(Continued)

*Primary Examiner* — Tulsidas C Patel
*Assistant Examiner* — Thomas K Quigley
(74) *Attorney, Agent, or Firm* — Nixon & Vanderhye P.C.

(57) ABSTRACT

A starting power generation apparatus according to an embodiment of the present invention includes: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; a second power conversion unit including a plurality of second AC terminals connected to the second multi-phase winding, the second power conversion unit (Continued)

being configured to control a current to be input and output via the second AC terminals; and a control unit configured to detect a positional relationship between the field portion and the armature unit based on an output voltage of the second multi-phase winding, and control the first power conversion unit and the second power conversion unit in accordance with the positional relationship detected. The control unit is configured to detect the positional relationship when the starter generator is stopped, based on time widths of two or more predetermined voltages generated in two or more windings constituting the second multi-phase winding in a case that an output voltage of the battery is applied to the first multi-phase winding for a predetermined time in a state where current input and output via the second AC terminals is off.

7 Claims, 37 Drawing Sheets

(51) Int. Cl.

| | | |
|---|---|---|
| *F02N 11/08* | (2006.01) | |
| *H02P 6/28* | (2016.01) | |
| *H02P 6/182* | (2016.01) | |
| *H02P 1/46* | (2006.01) | |
| *H02P 6/18* | (2016.01) | |
| *H02P 6/20* | (2016.01) | |
| *H02P 9/00* | (2006.01) | |
| *H02K 21/22* | (2006.01) | |
| *H02K 3/28* | (2006.01) | |
| *H02K 29/03* | (2006.01) | |

(52) U.S. Cl.
CPC ............... *H02K 21/22* (2013.01); *H02P 1/46* (2013.01); *H02P 6/182* (2013.01); *H02P 6/187* (2013.01); *H02P 6/20* (2013.01); *H02P 6/28* (2016.02); *H02P 9/009* (2013.01); *H02P 9/04* (2013.01); *F02N 2011/0874* (2013.01); *F02N 2200/046* (2013.01); *H02K 29/03* (2013.01); *Y02T 10/48* (2013.01)

(56) References Cited

U.S. PATENT DOCUMENTS

| | | | | |
|---|---|---|---|---|
| 2001/0006292 | A1* | 7/2001 | Inaba | F02N 11/04 290/38 R |
| 2003/0094929 | A1* | 5/2003 | Pendell | H02K 17/42 322/44 |
| 2004/0036295 | A1* | 2/2004 | Nakagawa | F02N 11/04 290/31 |
| 2007/0284888 | A1* | 12/2007 | Shimazaki | F02N 11/00 290/380 |
| 2008/0067984 | A1* | 3/2008 | Anghel | F01D 15/10 322/52 |
| 2012/0291739 | A1* | 11/2012 | Hashimoto | F02N 11/08 123/179.3 |
| 2014/0070769 | A1* | 3/2014 | Harada | H02P 9/48 320/109 |
| 2016/0109265 | A1 | 4/2016 | Ishida et al. | |
| 2017/0338706 | A1* | 11/2017 | Hao | F02N 11/00 |
| 2018/0254724 | A1* | 9/2018 | Arai | F02N 11/04 |

FOREIGN PATENT DOCUMENTS

| | | | |
|---|---|---|---|
| JP | | 4329527 B2 | 9/2009 |
| JP | | 4801772 B2 | 10/2011 |
| WO | WO 2016/143032 A1 | | 9/2016 |
| WO | WO 2016/143036 A1 | | 9/2016 |

OTHER PUBLICATIONS

Examination Report dated Nov. 14, 2019 in Indian Application No. 201847013102, 6 pages.

* cited by examiner

| ROTOR ANGLE | STAGE |
|---|---|
| 0 TO 10 DEGREES | 3 |
| 10 TO 20 DEGREES | 2 |
| 20 TO 30 DEGREES | 6 |
| 30 TO 40 DEGREES | 4 |
| 40 TO 50 DEGREES | 5 |
| 50 TO 60 DEGREES | 1 |

FIG. 27
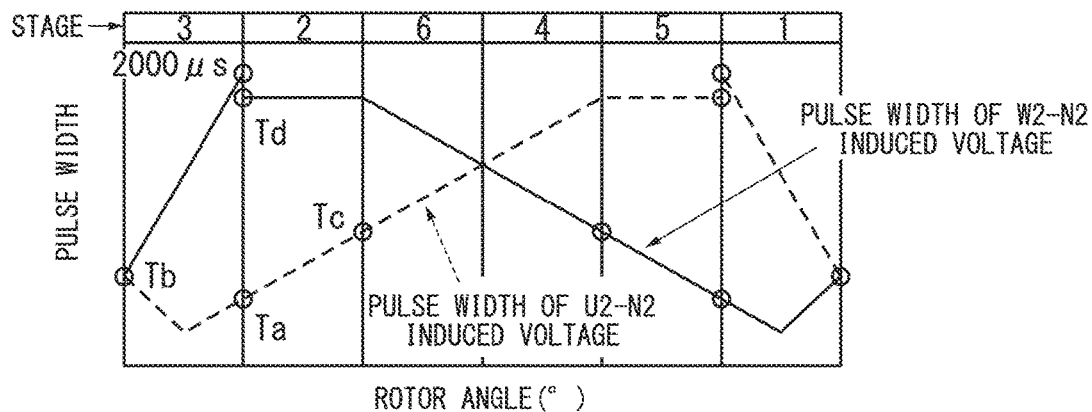
FIG. 28
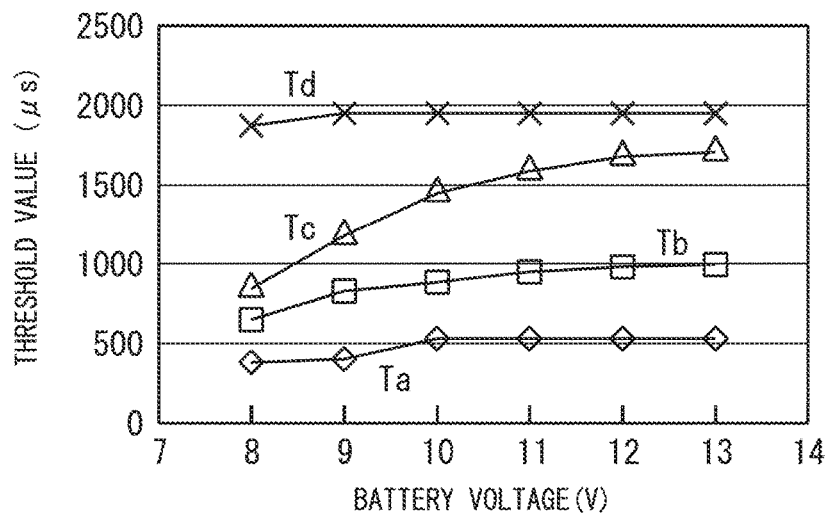
FIG. 29
|  | RISE TIME T1 | FALL TIME T2 | ORDER |
|---|---|---|---|
| STAGE 3 | $T1 \leq Tb$ | $Tb \leq T2 \leq 2000 \mu s$ | w⇒u |
| STAGE 2 | $Ta \leq T1 \leq Tc$ | $Td \leq T2$ | ↑ |
| STAGE 6 | $Tc \leq T1$ | $T2 \leq Td$ | ↑ |
| STAGE 4 | $Tc \leq T1$ | $T2 \leq Td$ | u⇒w |
| STAGE 5 | $Ta \leq T1 \leq Tc$ | $Td \leq T2$ | ↑ |
| STAGE 1 | $T1 \leq Tb$ | $Tb \leq T2 \leq 2000 \mu s$ | ↑ |

| ROTOR ANGLE | STAGE | HI-SIDE | LO-SIDE |
|---|---|---|---|
| 0 TO 10 DEGREES | 3 | UH | WL |
| 10 TO 20 DEGREES | 2 | VH | |
| 20 TO 30 DEGREES | 6 | | UL |
| 30 TO 40 DEGREES | 4 | WH | |
| 40 TO 50 DEGREES | 5 | | VL |
| 50 TO 60 DEGREES | 1 | UH | |

| ROTOR ANGLE | STAGE | HI-SIDE | LO-SIDE |
|---|---|---|---|
| 55 TO 5 DEGREES | 1～3 | UH | WL |
| 5 TO 15 DEGREES | 3～2 | VH | |
| 15 TO 25 DEGREES | 2～6 | | UL |
| 25 TO 35 DEGREES | 6～4 | WH | |
| 35 TO 45 DEGREES | 4～5 | | VL |
| 45 TO 55 DEGREES | 5～1 | UH | |

ENERGIZATION UH⇒VL
CASE WHERE STAGE 1 IS CLOSE TO STAGE 5

ENERGIZATION UH⇒VL
CASE WHERE STAGE 1 IS CLOSE TO STAGE 3

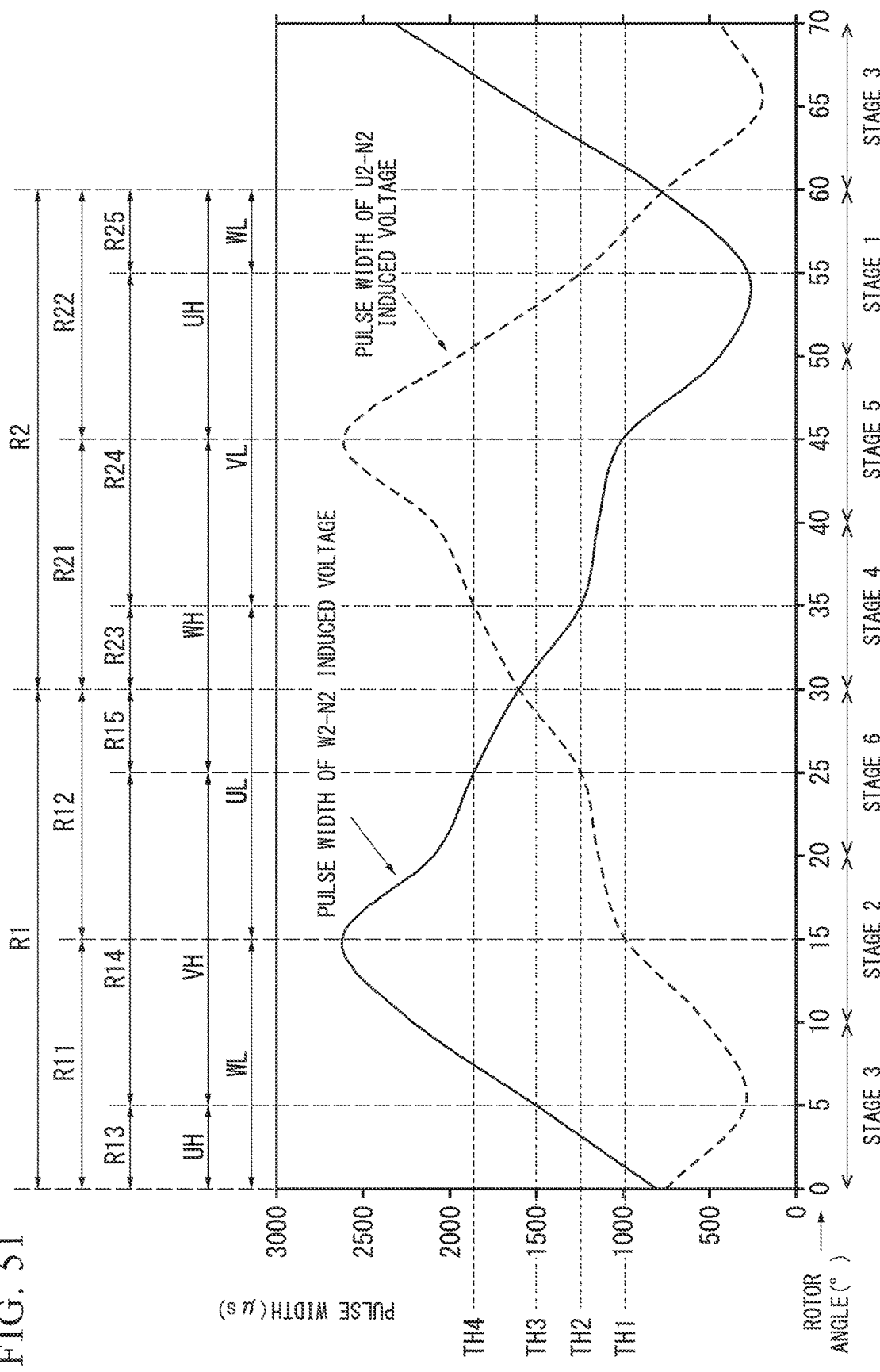

STARTING POWER GENERATION APPARATUS AND STARTING POWER GENERATION METHOD

This application is the U.S. national phase of International Application No. PCT/JP2016/079497 filed Oct. 4, 2016 which designated the U.S., the entire contents of which are hereby incorporated by reference.

TECHNICAL FIELD

The present invention relates to a starting power generation apparatus and a starting power generation method.

BACKGROUND ART

Conventionally, in vehicles, particularly in small two-wheeled vehicles and the like, ACG (AC generator) starter motors acting as starter motors at start of engines and acting also as power generators after the start of the engines are often used. Three-phase DC brushless motors are used for these ACG starter motors (Patent Document 1). For detection of a rotor position at the start of the engine and at the time of power generation of this three-phase DC brushless motor, hall sensors have been provided for respective phase windings of the three-phase winding, and thereby a rotor position has been detected using the hall sensors.

On the other hand, a technique of detecting a rotor position without using the hall sensors has been developed (Patent Document 2). In a control device described in Patent Document 2, when the brushless motor is stopped, a DC voltage with a plurality of patterns is applied to two windings of the three-phase windings for a short period of time, and rise characteristics of current which varies in accordance with the rotor position are detected, thereby detecting the stop position of the rotor.

CITATION LIST

Patent Document

[Patent Document 1] Japanese Patent Application Publication No. 2003-83209
[Patent Document 2] Japanese Patent Publication No. 4801772

SUMMARY OF THE INVENTION

Problems to be Solved by the Invention

However, the control device described in Patent Document 2 requires a circuit for detecting current flowing in the windings. Generally, a current detection circuit tends to have a complicated configuration or a large loss as compared with a voltage detection circuit. Therefore, the control device described in Patent Document 2 has a problem that it is difficult to achieve downsizing or reduce the price.

The present invention has an object to provide a starting power generation apparatus and a starting power generation method which can solve the above problem.

Means for Solving the Problems

To solve the above problem, a starting power generation apparatus according to one aspect of the present invention includes: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; a second power conversion unit including a plurality of second AC terminals connected to the second multi-phase winding, the second power conversion unit being configured to control a current to be input and output via the second AC terminals; and a control unit configured to detect a positional relationship between the field portion and the armature unit based on an output voltage of the second multi-phase winding, and control the first power conversion unit and the second power conversion unit in accordance with the positional relationship detected. The control unit is configured to detect the positional relationship when the starter generator is stopped, based on time widths of two or more predetermined voltages generated in two or more windings constituting the second multi-phase winding in a case that an output voltage of the battery is applied to the first multi-phase winding for a predetermined time in a state where current input and output via the second AC terminals is off.

Additionally, in the above starting power generation apparatus according to one aspect of the present invention, the control unit is configured to compare the time widths of the two or more predetermined voltages and a plurality of determination values having different voltage dependencies, thereby detecting the positional relationship when the starter generator is stopped.

Further, in the starting power generation apparatus according to one aspect of the present invention, the control unit is configured to compare the time widths of the two or more predetermined voltages, a difference value between the time widths of the two or more predetermined voltages, and a plurality of determination values having different voltage dependencies, thereby detecting the positional relationship when the starter generator is stopped.

Moreover, in the starting power generation apparatus according to one aspect of the present invention, the control unit is configured to detect the positional relationship for each of regions predetermined, and each of the regions is set so that a phase difference between a magnetic flux vector formed by the field portion on a boundary of each region and a current vector flowing in the multi-phase winding can be 120°.

Additionally, in the starting power generation apparatus according to one aspect of the present invention, the control unit is configured to determine a plurality of regions crossing over switching positions of energization patterns to the armature unit at start of rotation of the starter generator, thereby detecting the positional relationship when the starter generator is stopped.

Further, in the starting power generation apparatus according to one aspect of the present invention, the predetermined voltage is a voltage at which voltages generated in the two or more windings exceed a predetermined threshold value, and the threshold value is set based on the output voltage of the battery.

Moreover, a starting power generation method according to one aspect of the present invention uses: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; a second power conversion unit including a plurality of second AC terminals connected to the second multi-phase winding, the second power conversion unit being configured to control a current to be input and output via the second AC terminals; and a control unit configured to detect a positional relationship between the field portion and the armature unit based on an output voltage of the second multi-phase winding, and control the first power conversion unit and the second power conversion unit in accordance with the positional relationship detected. The starting power generation method includes: detecting, by the control unit, the positional relationship when the starter generator is stopped, based on time widths of two or more predetermined voltages generated in two or more windings constituting the second multi-phase winding in a case that an output voltage of the battery is applied to the first multi-phase winding for a predetermined time in a state where current input and output via the second AC terminals is off.

Effects of the Invention

According to the present invention, when the output voltage of the battery is applied to the first multi-phase winding for a predetermined time, time widths of two or more predetermined voltages generated in the two or more windings constituting the second multi-phase winding are detected, thereby making it possible to determine the stop position of the rotor. According to this, current detection can be made unnecessary.

BRIEF DESCRIPTION OF THE DRAWINGS

FIG. 27 is a diagram showing an approximate curve of the characteristic diagram shown in FIG. 26.
FIG. 28 is a diagram showing voltage characteristics of thresholds shown in FIG. 27.
FIG. 29 is a figure showing a stage discrimination condition corresponding to the approximate curve shown in FIG. 27.

FIG. 51 is a characteristic diagram showing a correspondence relationship between a rotor angle and a pulse width for illustrating an operation example of the stage determination process (S12) shown in FIG. 50.

MODE FOR CARRYING OUT THE INVENTION

<First Embodiment>

Figure 1:
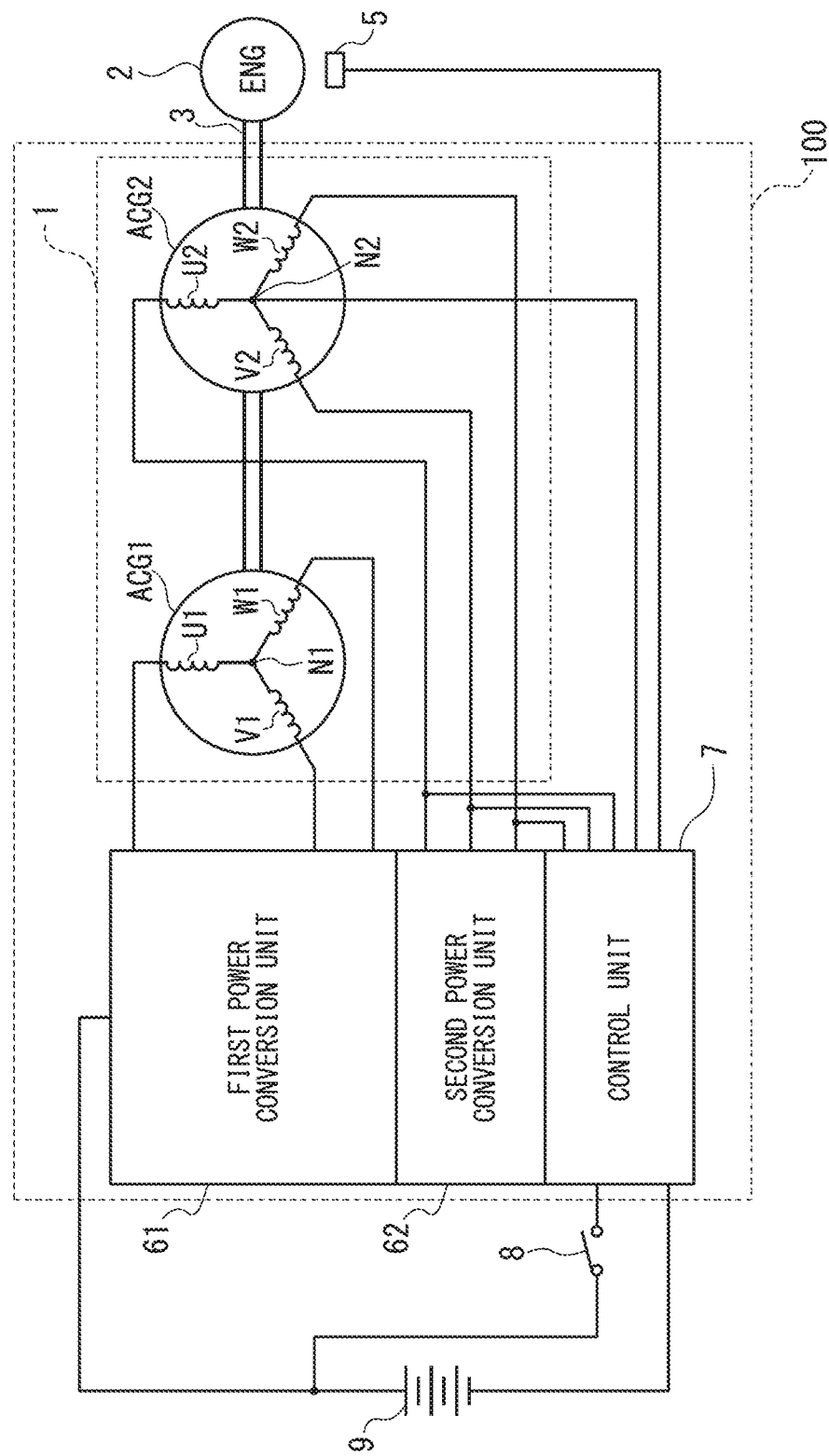
FIG. 1 is a block diagram showing a configuration example of a first embodiment of the present invention.

Hereinafter, a first embodiment of the present invention will be described with reference to the accompanying drawings. Here, the same or corresponding configuration in each figure is appended with the same reference numeral. FIG. 1 is a block diagram showing a configuration example of a starting power generation control apparatus 100 of the first embodiment of the present invention. The starting power generation control apparatus 100 shown in FIG. 1 includes a starter generator (ACG starter motor) 1, a first power conversion unit 61, a second power conversion unit 62, and a control unit 7. The starter generator 1 is connected directly to a crank shaft 3 and rotates in synchronization with rotation of an engine 2. The first power conversion unit 61, the second power conversion unit 62, and the control unit 7 are connected with a positive electrode of the battery 9 and are grounded. The battery 9 is a secondary battery with a negative electrode grounded. Additionally, one end of a starter switch 8 is connected to the positive electrode of the battery 9, while the other end of the starter switch 8 is connected to the control unit 7. The starter switch 8 is a switch operated by the user at the start of the engine 2. Additionally, the control unit 7 is connected with an output of an engine water temperature gauge 5.

Under control of the first power conversion unit 61 and the second power conversion unit 62, the starter generator 1 operates as a starter motor or operates as a power generator. The starter generator 1 includes a winding portion ACG1, a winding portion ACG2, and a field portion 15 shown in FIG. 2. The winding portion ACG1 includes windings U1, V1 and W1 which constitute a star-connected three-phase winding (multi-phase winding). The winding portion ACG2 includes windings U2, V2, and W2 which constitute a star-connected three-phase winding. A neutral point N1 is a neutral point of the star connection constituting the winding portion ACG1. A neutral point N2 is a neutral point of the star connection constituting the winding portion ACG2. A set of windings U1, V1, and W1 and a set of the windings U2, V2, and W2 are wound around the same armature core (not shown), and are electrically insulated from each other. Here, the winding portion ACG1, the winding portion ACG2, and the armature core (not shown) constitute an armature unit. Here, the configurations of the winding portion ACG1 and the winding portion ACG2 are not limited to the star connections, and may be delta connections.

Figure 2:
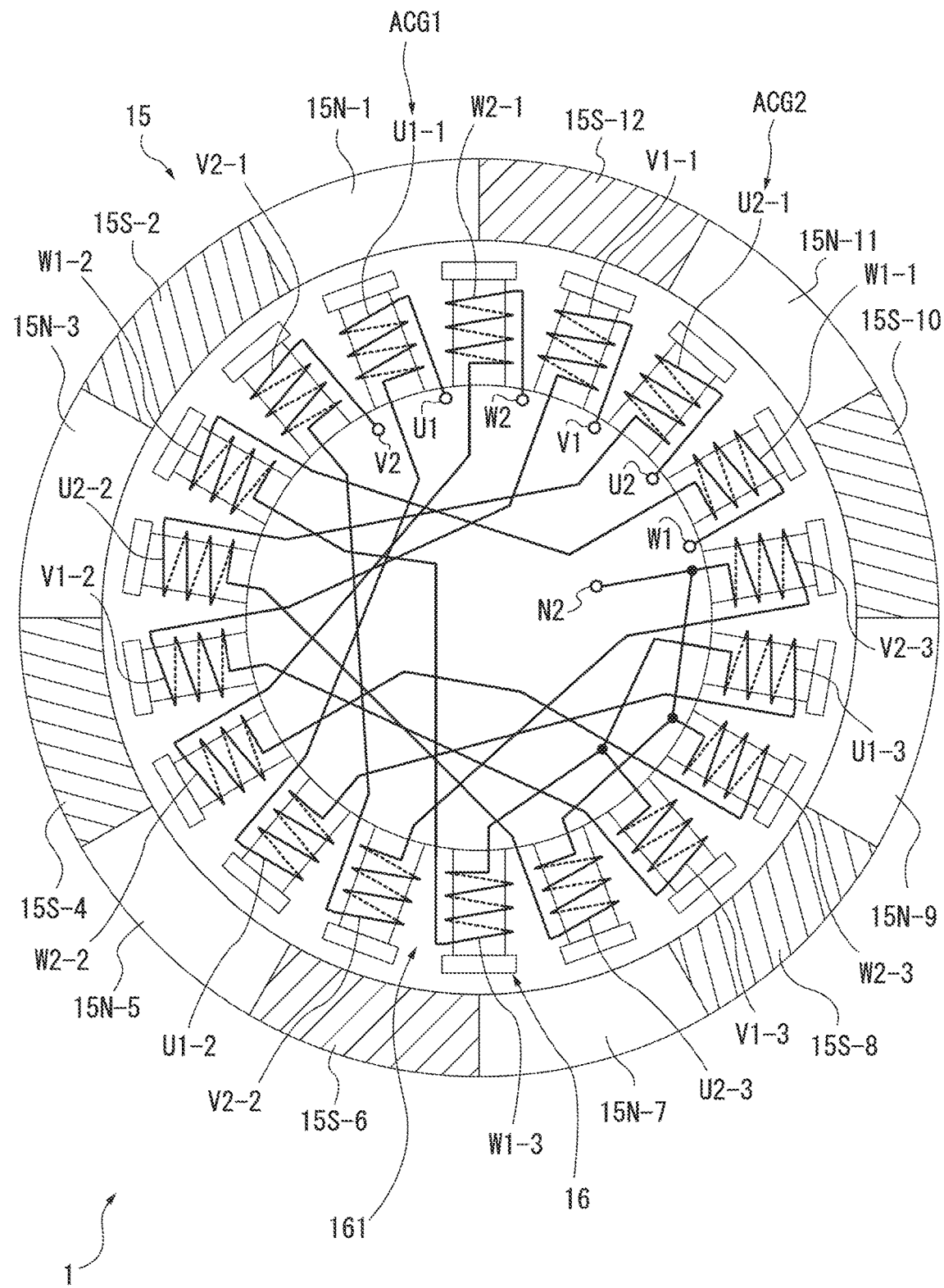
FIG. 2 is a view schematically showing a configuration example of a starter generator 1 shown in FIG. 1.
Figure 3:
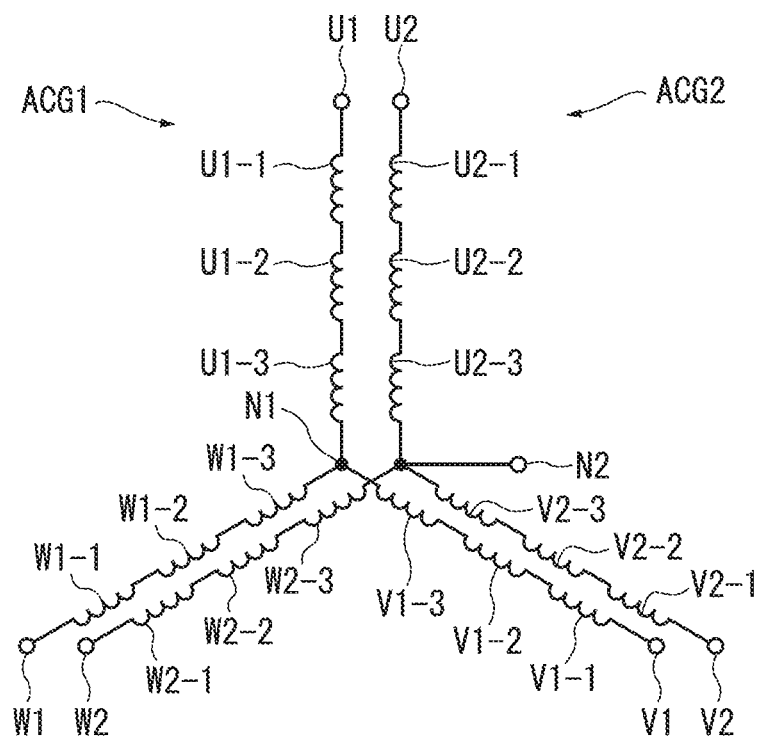
FIG. 3 is a connection view showing a winding portion ACG1 and a winding portion ACG2 which are shown in FIG. 2.

FIG. 2 is a schematic view, viewed from an axial direction, showing a configuration example of the field portion 15 of the starter generator 1 shown in FIG. 1 and the armature unit 161 including the armature core 16, the winding portion ACG1, and the winding portion ACG2. In the configuration example shown in FIG. 2, the starter generator 1 is a brushless motor of outer rotor type in which the field portion 15 includes the plural sets of N-pole permanent magnets 15N and S-pole permanent magnets 15S. In this case, the windings U1, V1, and W1 which constitute the winding portion ACG1 respectively include windings U1-1 to U1-3, windings V1-1 to V1-3, and winding W1-1 to W1-3, which are arranged every 120 degrees with respect to the armature core 16. The windings U2, V2, and W2 which constitute the winding portion ACG2 respectively include windings U2-1 to U2-3, windings V2-1 to V2-3, and winding W2-1 to W2-3, which are arranged every 120 degrees with respect to the armature core 16. In the configuration example shown in FIG. 2, the number of poles of the field portion 15 is 12. The field portion 15 includes N-pole permanent magnets 15N-1, 3, 5, 7, 9, 11 and S-pole permanent magnets 15S-2, 4, 6, 8, 10, 12, where each pole is alternately arranged (hereinafter permanent magnets are simply referred to as magnets). The number of slots of the armature core 16 is 18, and each slot is wound alternately with one of the windings U1-1 to U1-3, windings V1-1 to V1-3, and windings W1-1 to W1-3 and one of the windings U2-1 to U2-3, windings V2-1 to V2-3, and windings W2-1 to W2-3. As shown in FIG. 3, the windings U1-1 to U1-3 are connected in series; the windings V1-1 to V1-3 are connected in series; and the windings W1-1 to W1-3 are connected in series. One ends of the winding U1-3, the winding V1-3, and the winding W1-3 are connected in common to a neutral point N1. Similarly, the windings U2-1 to U2-3 are connected in series; the windings V2-1 to V2-3 are connected in series; and the windings W2-1 to W2-3 are connected in series. One ends of the winding U2-3, the winding V2-3, and the winding W2-3 are connected in common to a neutral point N2.

Here, in the following description, when the appellation of winding U1 or winding U2 is used as a connection destination of a circuit, it refers to an input-output terminal of the winding U1 or the winding U2 which is a terminal opposite to the neutral point N1 or the neutral point N2. The same applies to the winding V1, the winding W1, the winding V2, and the winding W2. Additionally, in some cases, the winding U1, the winding U2, the winding V1, the winding W1, the winding V2, the winding W2, the neutral point N1 and the neutral point N2 are represented simply by symbols U1, U2, V1, W1, V2, W2, N1, and N2.

Here, in FIG. 1, the engine 2 is a power generator mounted on, for example, a small two-wheeled vehicle. The crankshaft 3 is a component of the engine 2, which is a shaft for converting into a rotational motion, a reciprocating motion of a piston (not shown) included in the engine 2. The engine water temperature gauge 5 is a sensor for detecting the temperature of a coolant of the engine 2.

Figure 4:
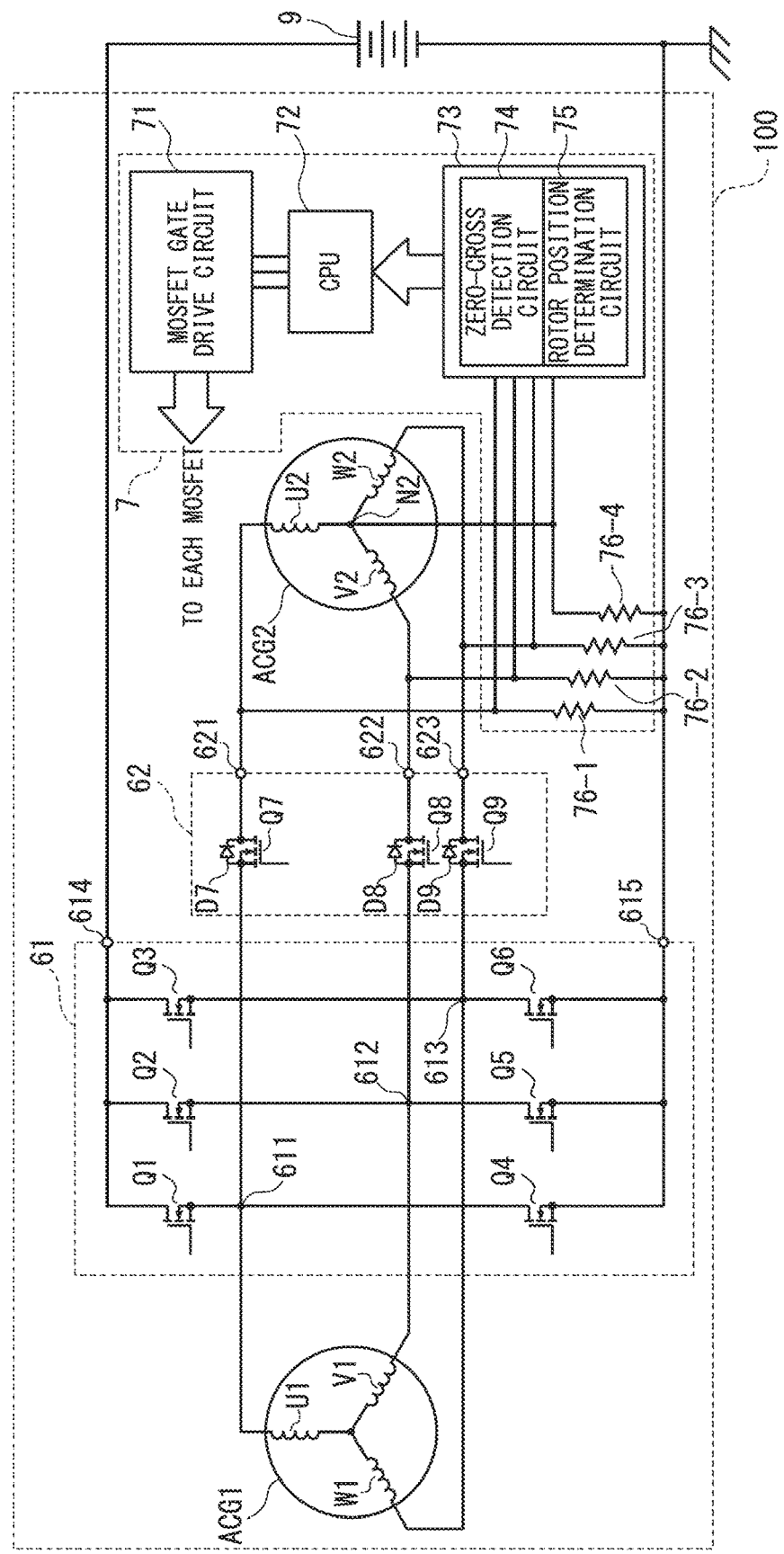
FIG. 4 is a circuit diagram for illustrating internal configurations of a first power conversion unit 61, a second power conversion unit 62, and a control unit 7, which are shown in FIG. 1.

Next, an example of internal configurations of the first power conversion unit 61, the second power conversion unit 62, and the control unit 7, which are shown in FIG. 1, will be described with reference to FIG. 4. As shown in FIG. 4, the first power conversion unit 61 includes six n-channel MOSFETs (metal oxide semiconductor field effect transistors, hereinafter referred to as MOSFETs (switching elements)) (Q1) to (Q6), which constitute a 3-phase bridge orthogonal transform circuit (multi-phase bridge circuit). In the first power conversion unit 61, a positive-side (high side) DC terminal 614 (first positive-side DC terminal) of an input-output line is connected to the positive electrode of the battery 9, while a negative-side (low side) DC terminal 615 is connected to the negative electrode of the battery 9. The first power conversion unit 61 performs bidirectional power conversion between AC and DC, between the battery 9 and the winding portion ACG1, or, between the battery 9 and the winding portions ACG1 and ACG2. Additionally, AC terminals (first AC terminals) 611, 612, and 613 of the first power conversion unit 61 are connected respectively with the windings U1, V1, and W1 of the winding portion ACG1.

The second power conversion unit 62 includes three AC terminals (second AC terminals) 621, 622, and 623, and three MOSFETs (Q7), (Q8), and (Q9). The AC terminal 621 is connected to the winding U2 of the winding portion ACG2 and a drain of the MOSFET (Q7). The AC terminal 622 is connected to the winding V2 of the winding portion ACG2 and a drain of the MOSFET (Q8). The AC terminal 623 is connected to the winding W2 of the winding portion ACG2 and a drain of the MOSFET (Q9). A source of the MOSFET (Q7) is connected to the AC terminal 611 of the first power conversion unit 61. A source of the MOSFET (Q8) is connected to the AC terminal 612 of the first power conversion unit 61. A source of the MOSFET (Q9) is connected to the AC terminal 613 of the first power conversion unit 61. The second power conversion unit 62 turns on or off the MOSFETs (Q7), (Q8), and (Q9), thereby controlling a current to be input and output via the AC terminals 621, 622, and 623. In this case, the second power conversion unit 62 turns on or off the MOSFETs (Q7), (Q8), and (Q9), thereby connecting or disconnecting the windings U2, V2, and W2 of the winding portion ACG2 respectively to or from the AC terminals 611, 612, and 613 of the first power conversion unit 61.

Additionally, in this case, the three MOSFETs (Q7), (Q8), and (Q9) are interposed between the respective AC terminals 611, 612, and 613 of the first power conversion unit 61 connected with the respective windings U1, V1, and W1 of the winding portion ACG1 and the respective windings U2, V2, and W2 of the winding portion ACG2. Further, the three MOSFETs (Q7), (Q8), and (Q9) turn on or off the respective windings U2, V2, and W2 of the winding portion ACG2, thereby connecting or disconnecting the respective windings U2, V2, and W2 to or from the respective AC terminals 611, 612, and 613.

Additionally, in the respective MOSFETs (Q7), (Q8), and (Q9), parasitic diodes D7, D8, and D9 are formed between drains and sources (here, parasitic diodes for other MOSFETs are not shown). The directions of the parasitic diodes D7, D8, and D9 are the same with respect to the respective AC terminals 611, 612, and 613. In this case, anodes are connected to the AC terminals 611, 612, and 613. Additionally, cathodes are connected to the windings U2, V2, and W2 of the winding portion ACG2. By thus aligning the directions of the parasitic diodes D7, D8, and D9, it is possible to, when the respective MOSFETs (Q7), (Q8), and (Q9) are turned off, block an inflow of current from the battery 9 to the winding portion ACG2 via the first power conversion unit 61 in the motor operation and block an outflow of current from the winding portion ACG2 to the battery 9 via the first power conversion unit 61 in the power generating operation. Here, the directions of the parasitic diodes D7, D8, and D9 (i.e., directions of the drains and sources of the MOSFETs (Q7), (Q8), and (Q9)) may be opposite to those shown.

The control unit 7 includes a MOSFET gate drive circuit 71, a CPU (central processing unit) 72, a detection and determination circuit 73, and resistors 76-1 to 76-4. Here, in addition, the control unit 7 can perform ignition control of the engine 2, and the like, by connecting the input and output between sensors, actuators, and the like. The detection and determination circuit 73 includes a zero-cross detection circuit 74 and a rotor position determination circuit 75.

One end of the resistor 76-1 is connected to the winding U2, while the other end thereof is grounded. One end of the resistor 76-2 is connected to the winding V2, while the other end thereof is grounded. One end of the resistor 76-3 is connected to the winding W2, while the other end is grounded. Additionally, one end of the resistor 76-4 is connected to the neutral point N2, while the other end is grounded. Terminal voltages of the resistors 76-1 to 76-4 are input to the detection and determination circuit 73.

The zero-cross detection circuit 74 detects zero-cross points of induced voltages generated in the windings U2, V2, and W2. When a zero-cross point is detected, the zero-cross detection circuit 74 generates a stage signal indicating in which predetermined stage the rotor position is present and outputs the generated signal to the CPU 72.

At the time the starter generator 1 is stopped, the rotor position determination circuit 75 determines in which predetermined stage the rotor position is present in the following manner and outputs a result of the determination to the CPU 72. Here, the time the starter generator 1 is stopped means the time the engine 2 is stopped. Additionally, the rotor position means a relative positional relationship among the field portion 15, the winding portion ACG1, and the winding portion ACG1. The determination by the rotor position determination circuit 75 is performed in a state where the winding portion ACG2 is electrically released by the second power conversion unit 62. The rotor position determination circuit 75 determines a rotor stage based on information regarding a voltage (pulse width) induced in the other winding portion ACG2 when a short pulse to the extent that the motor will not move is conducted to the winding portion ACG1 using the first power conversion unit 61.

Based on an output of the zero-cross detection circuit 74, an output of the rotor position determination circuit 75, and the like, the CPU 72 generates a control signal for turning on or off the MOSFETs (Q1) to (Q9) and outputs the generated control signal to the MOSFET gate drive circuit 71.

In response to the control signal input by the CPU 72, the MOSFET gate drive circuit 71 generates gate signals of the respective MOSFETs (Q1) to (Q9) and supplies the generated gate signals to the respective gates of the MOSFETs (Q1) to (Q9).

Next, an operation example of the starting power generation control apparatus 100 described with reference to FIGS. 1 to 4 will be described with reference to FIGS. 5 to 33. First, a case where the starter generator 1 is operated as a starter motor that performs starting of the engine 2 will be described with reference to FIGS. 5 to 31. Then, a case where the starter generator 1 is operated as a power generator will be described with reference to FIGS. 32 and 33.

Figure 5:
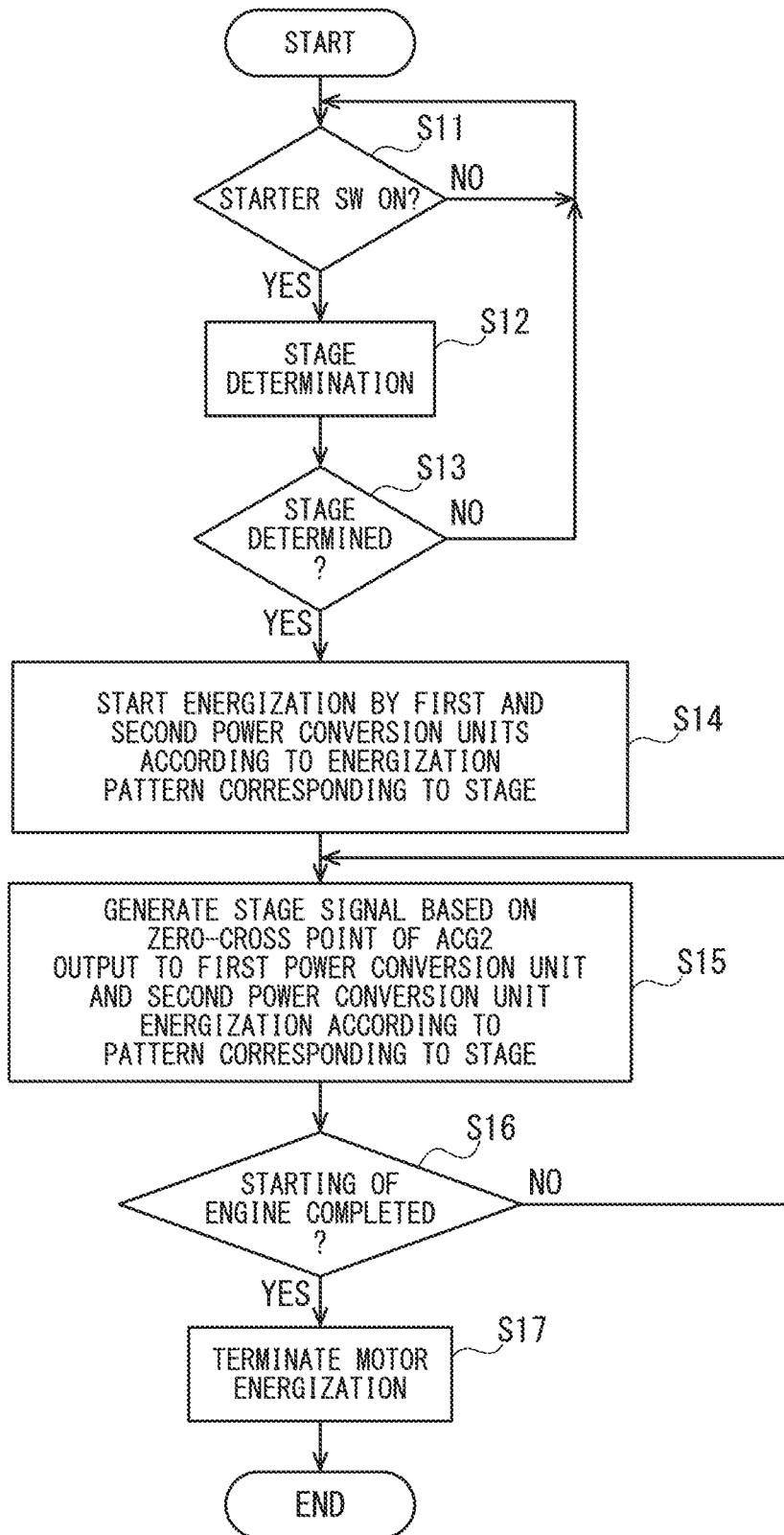
FIG. 5 is a flowchart showing an example of a starter motor starting control of a starting power generation apparatus 100 shown in FIG. 1.

FIG. 5 is a flowchart showing an example of starter motor starting control by the starting power generation control apparatus 100 shown in FIG. 1. When an ignition switch (not shown) is turned on by the user in a state where the engine 2 is stopped, the power is supplied from the battery 9 to the control unit 7. Then, the CPU 72 performs a predetermined initial processing, and then starts the processing shown in FIG. 5. First, the CPU 72 waits until the starter switch 8 is turned on (repetition of NO in step S11). When the user turns on the starter switch 8, the CPU 72 performs the stage determination process (YES in step S11 to step S12).

In step S12, the CPU 72 first turns off the MOSFETs (Q7) to (Q9) of the second power conversion unit 62 so as to electrically separate the winding portion ACG1 and the winding portion ACG2. Then, the CPU 72 controls the MOSFETs (Q1) to (Q6) of the first power conversion unit 61 to be turned on or off, thereby conducting to the winding portion ACG1, a short pulse to the extent that the motor will not move. On the other hand, the rotor position determination circuit 75 captures the voltage induced in the winding portion ACG2 and thereby determines a rotor stage.

Figures 6, 7:
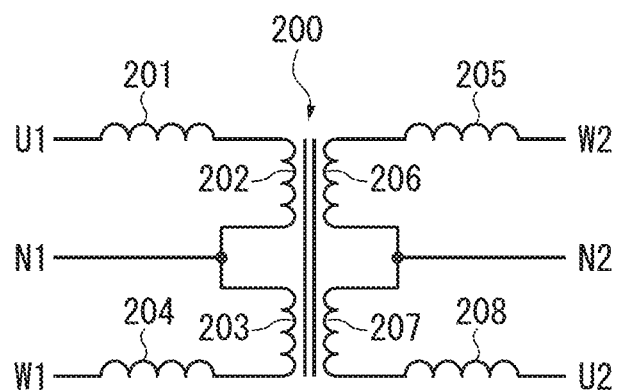
FIG. 6 is an equivalent circuit diagram for illustrating a stage determination process (S12) shown in FIG. 5.
FIG. 7 is a figure showing a correspondence relationship between a stage determined in the stage determination process (S12) shown in FIG. 5 and a rotor angle.

Here, a basic principle of the process of determining the rotor position without a sensor in step S12 of FIG. 5 will be described with reference to FIG. 6. FIG. 6 is an equivalent circuit for the U-phase and the W-phase in the winding portion ACG1 and the winding portion AGC2. Here, the winding of the winding portion ACG1 is described as the primary winding, while the winding of the winding portion ACG2 will be described as the secondary winding. In the present embodiment, a short pulse is conducted to the primary winding in which the winding U1 and the winding W1 are connected in series (i.e., a voltage is applied between the lines of U1 and W1), and a voltage generated in the secondary winding (specifically, a phase voltage U2-N2 of the winding U2 and a phase voltage W2-N2 of the winding W2) is measured, thereby determining the rotor position. In this case, as shown in FIG. 6, the primary winding and the secondary winding form a magnetic circuit via a magnet and can be regarded as a transformer. FIG. 6 shows a transformer 200 in which a winding 202 representing the winding U1 and a winding 203 representing the winding W1 are regarded as primary side windings, while a winding 206 representing the winding W2 and a winding 207 representing the winding U2 are regarded as secondary side windings. In this case, the primary side windings have leakage inductances 201 and 204, while the secondary side windings have leakage inductances 205 and 208.

A primary current Ip when the primary winding is energized is so small that the current of the secondary winding is negligible, and therefore is expressed as the following equation.

$$I_p = \frac{V}{R}(1 - e^{-t/\tau}) \quad \text{[Equation 1]}$$

Here, V is a pulse energization voltage to the primary winding, R is a primary winding resistance, L is a primary winding inductance, and $\tau$ is L/R. Np represents the number of turns of the primary winding U1 and the winding W1, while Rmu and Rmw represent magnetic path resistances. The magnetic fluxes $\phi$pu and $\phi$pw generated from the respective windings are as follows. Here, Vu and Vw are winding voltages such that Vu/Vw=Lu/Lw. $\tau$u=Lu/R and $\tau$w=Lw/R represent time constants.

$$\phi_{pu} = \frac{N_p \cdot I_p}{R_{mu}} \quad \text{[Equation 2]}$$

$$\phi_{pw} = \frac{N_p \cdot I_p}{R_{mw}}$$

-continued $$\phi_{pu} = \frac{N_p \cdot V_u}{R_{mu} \cdot R}(1 - e^{-t/\tau u})$$

$$\phi_{pw} = \frac{N_p \cdot V_w}{R_{mw} \cdot R}(1 - e^{-t/\tau w})$$

When the primary winding and the secondary winding are regarded as a transformer circuit, an equivalent circuit in consideration of the leakage magnetic flux can be expressed as shown in FIG. 6, but the effective inductances of the primary winding and the secondary winding are reduced by the leakage magnetic flux. An effective magnetic flux $\phi$s intersecting the secondary winding by this leakage magnetic flux is expressed by the following equation, where K represents a coupling coefficient of the primary winding and secondary winding.

$$\phi_s = \frac{K \cdot N_p \cdot V}{R_{mu} \cdot R}(1 - e^{-t/\tau}) \quad \text{[Equation 3]}$$

Therefore, the voltage Vs induced in the secondary winding is expressed by the following equation, where Ns represents the number of windings of the secondary winding.

$$V_s = N_s \frac{d\phi_s}{dt} = \frac{K \cdot N_p \cdot N_s \cdot V}{R_m \cdot L}e^{-t/\tau} \quad \text{[Equation 4]}$$

The voltage Vs has $$V_s = \frac{K \cdot N_p \cdot N_s \cdot V}{R_m \cdot L} \quad \text{[Equation 5]}$$

as a maximum value and decays exponentially at the time t=+0.

Therefore, considering that the winding U1 and the winding W2, and the winding W1 and the winding U2, are magnetically coupled to each other, the voltages induced in the respective secondary windings are expressed by the following equation. Here, Np=Ns in the expressions of Vsu and Vsw.

$$V_{sw} = N_p \frac{d\phi_{su}}{dt} = \frac{K \cdot N_p^2 \cdot V_u}{R_{mu} \cdot L_u}e^{-t/\tau u} \quad \text{[Equation 6]}$$

$$V_{su} = N_p \frac{d\phi_{sw}}{dt} = \frac{K \cdot N_p^2 \cdot V_w}{R_{mw} \cdot L_w}e^{-t/\tau w}$$

$$L_u = \frac{N_p^2}{R_{mu}} \quad \text{[Equation 7]}$$

$$L_w = \frac{N_p^2}{R_{mw}}$$

Substituting the above relational expression in the above equation, then $$V_{sw} = K \cdot V_u \cdot e^{-t/\tau u}$$

$$V_{su} = K \cdot V_w \cdot e^{-t/\tau w} \quad \text{[Equation 8]}$$

is obtained.

Np, Ns, R, K are values determined by the structure of the motor, and the voltage induced in the secondary winding is determined from the above equation by the magnetic resistance, the inductance, of the primary winding. In other words, if the positions of the magnet and the primary and secondary windings are determined, the voltage induced in the secondary winding is uniquely determined by the magnetic resistance (inductance) that varies depending on whether the magnetic field produced by the magnet and the magnetic field produced by the winding are strengthening or weakening each other.

Since an attenuation factor is $\exp(-t/\tau)$ where $\tau=L/R$, the inductance can be known by measuring the attenuation factor. In other words, the position of the magnet can be identified.

Here, a voltage determination circuit with an appropriate threshold for Vs is provided to measure the time the voltage goes below the threshold, thereby measuring the magnitude of the attenuation factor, that is, the inductance. Therefore, it is possible to detect the position of the magnet by pulsing the voltage induced in the U and W-phases of the secondary winding and measuring the time thereof.

In the present embodiment, the double winding includes ACG1 (U1, V1, W1) and ACG2 (U2, V2, W2, N2), which are electrically and magnetically separated. In the example shown in FIG. 2, the winding portion ACG1 and the winding portion ACG2 are wound alternately (U1⇒V2⇒W1⇒ U2 . . . ) (although other winding methods are possible). When a current is conducted to the winding portion ACG1, for example, from U1 to W1, a change in magnetic force lines occurs in the adjacent W2 and U2, so that an induced voltage is generated accordingly. The magnitude of the induced voltage changes as the inductance of the winding changes, depending on the relationship with the poles of the opposing magnets (same pole, different pole, whether it is close to the center or the end with respect to the magnet). Since U1 and W1 are connected in series, they are excited with the same current. The generated magnetic flux is determined only by the polarity and the positional relationship of the opposing magnets. For example, when U1 and W1 are excited and the poles of opposing magnets are different poles, the magnetic resistance increases while the inductance decreases. In the case of the same poles, the magnetic resistance decreases while the inductance increases.

Here, in the present embodiment, one cycle 360 degrees of the electrical angle is divided into six stages 1 to 6 every 60 degrees to determine a rotor position. As shown in FIG. 7, the stages correspond to the respective 10-degree rotor angles (mechanical angles). The rotor angle 0 to 10 degrees corresponds to the stage 3; the rotor angle 10 to 20 degrees corresponds to the stage 2 corresponds to; the rotor angle 20 to 30 degrees corresponds to the stage 6; the rotor angle 30 to 40 degrees corresponds to the stage 4; the rotor angle 40 to 50 degrees corresponds to the stage 5; and the rotor angle 50 to 60 degrees corresponds to the stage 1. The pattern shown in FIG. 7 is repeated six times so as to correspond to the rotor angle of 360 degrees.

Figure 8:
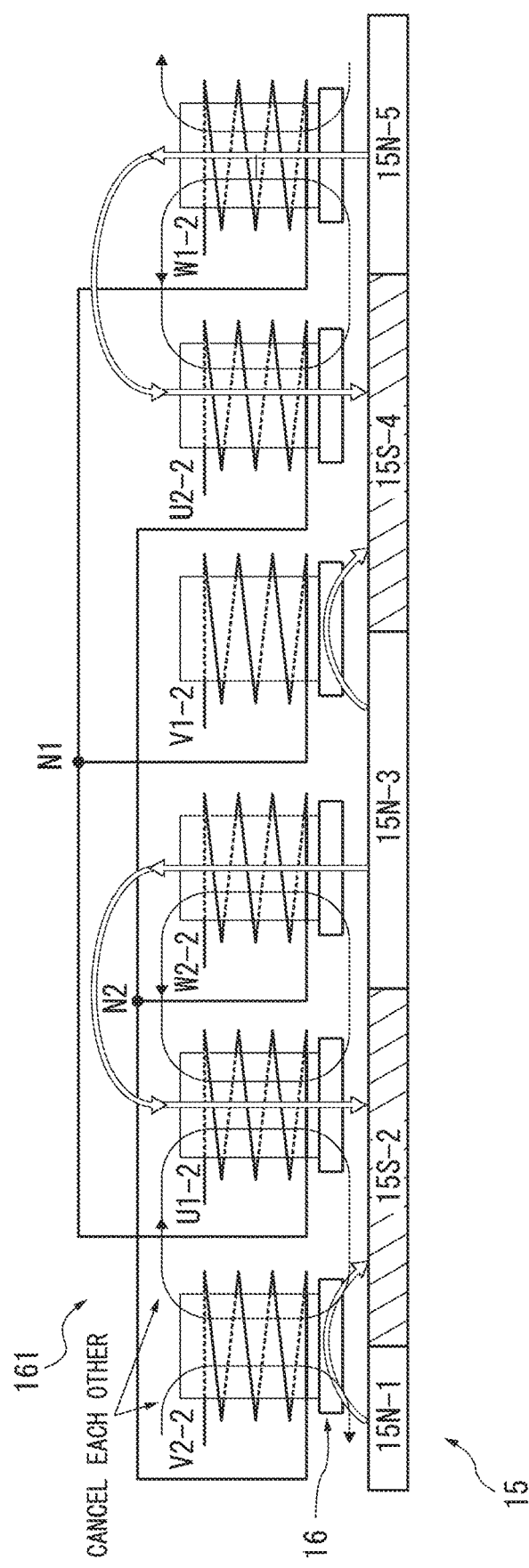
FIG. 8 is a schematic view for illustrating the stage determination process (S12) shown in FIG. 5.

Next, with reference to FIG. 8, a detailed description is given with respect to the induced voltages generated in the windings U2 and W2 at the boundary between the stage 1 and the stage 3 in the combination of the field portion 15 and the armature unit 161 shown in FIG. 2. FIG. 8 schematically shows the rotor positional relationship and the lines of magnetic force generated at the boundary between the stage 1 and the stage 3 (mechanical angle 0 degree) in the combination of the field portion 15 and the armature unit 161 shown in FIG. 2. In this case, the inductances of U1 and W2 are equal respectively to the inductances of W1 and U2.

Here, in FIG. 8 and FIGS. 11 and 14 which will be described later, lines of magnetic force before the pulse is conducted to the winding portion ACG1 are indicated by outlined arrows, while lines of magnetic force at the time of the energization are indicated by black arrows. Additionally, in each figure, in order to schematically show the difference in the number of lines of magnetic force, one line of magnetic force is indicated using a thick arrow, while 0.5 lines of magnetic force is indicated by a thin arrow.

In the case shown in FIG. 8, since the windings U1 and W1 before the energization are located at the same position with respect to the opposing magnets, the magnetic resistance and the inductance by the magnets are equal. Since the number of lines of magnetic force passing through the windings is equal, and the winding V1 is located at the center of the magnet, there is no line of magnetic force passing through the winding. When energization U1⇒W1 is performed, the winding U1 is magnetized to the N-pole, while the winding W1 is magnetized to the S-pole, and since the opposing magnets are different poles, the magnetic resistance is large, while the inductance is small. Although the lines of magnetic force passing through the winding increase, the lines of magnetic force are suppressed by the magnetic resistance. The lines of magnetic force produced by the winding U1 flow into the winding W2, while the lines of magnetic force produced by the winding W1 flow into the winding U2. The voltages induced in U2 and W2 are small because the lines of magnetic force are suppressed. The exact same magnitude of voltage is generated in the windings U2 and W2, which is plus for the winding U2 viewed from the midpoint N2, and which is minus for the winding W2 viewed from the midpoint N2.

Figure 9:
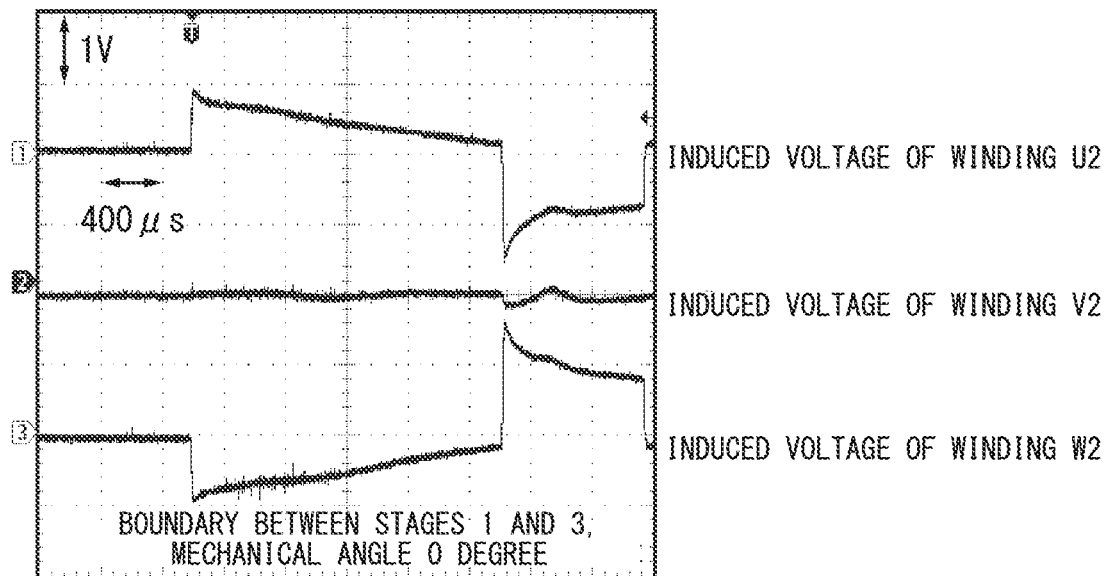
FIG. 9 is a waveform diagram for illustrating the stage determination process (S12) shown in FIG. 5.
Figure 10:
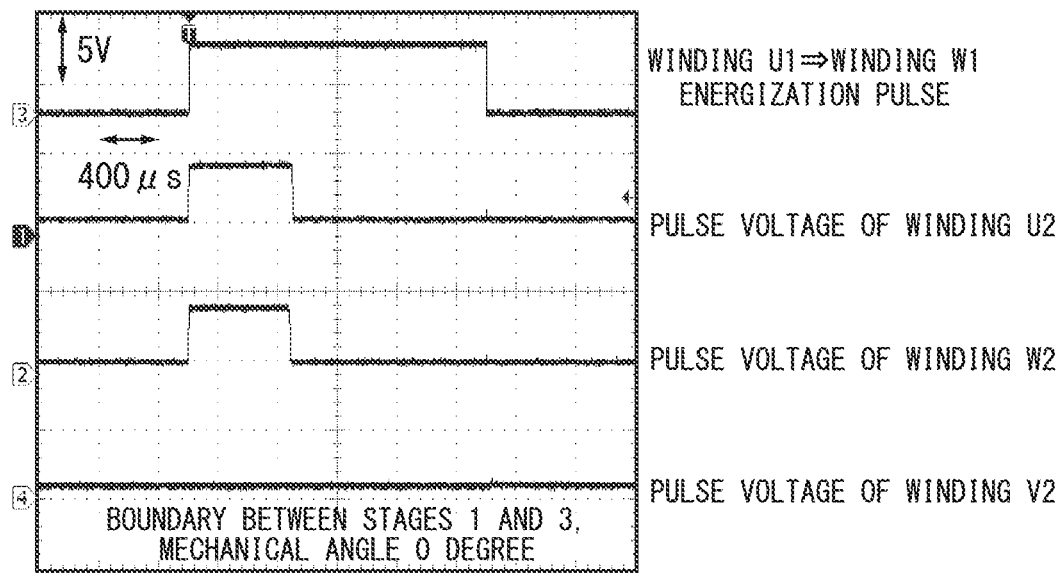
FIG. 10 is a waveform diagram for illustrating the stage determination process (S12) shown in FIG. 5.

FIG. 9 shows waveforms of the induced voltages observed in the winding U2, the winding V2, and the winding W2 when energization was performed for 2 ms from the winding U1 to the winding W1, in the positional relationship shown in FIG. 8. Additionally, FIG. 10 shows an energizing pulse from the winding U1 to the winding W1, a pulse voltage of the winding U2, a pulse voltage of the winding W2, and a pulse voltage of the winding V2, which were observed in the positional relationship shown in FIG. 8. The pulse voltage of the winding U2, the pulse voltage of the winding W2, and the pulse voltage of the winding V2 shown in FIG. 10 are waveforms obtained by binarizing with the threshold value 0.7V the induced voltage of the winding U2, the induced voltage of the winding W2, and the induced voltage of the winding V2. As shown in FIGS. 9 and 10, the pulse voltage of the winding pulse U2 and the pulse voltage of the winding pulse W2 have the substantially equal pulse width at the boundary between the stage 1 and the stage 3 (mechanical angle 0°).

Figure 11:
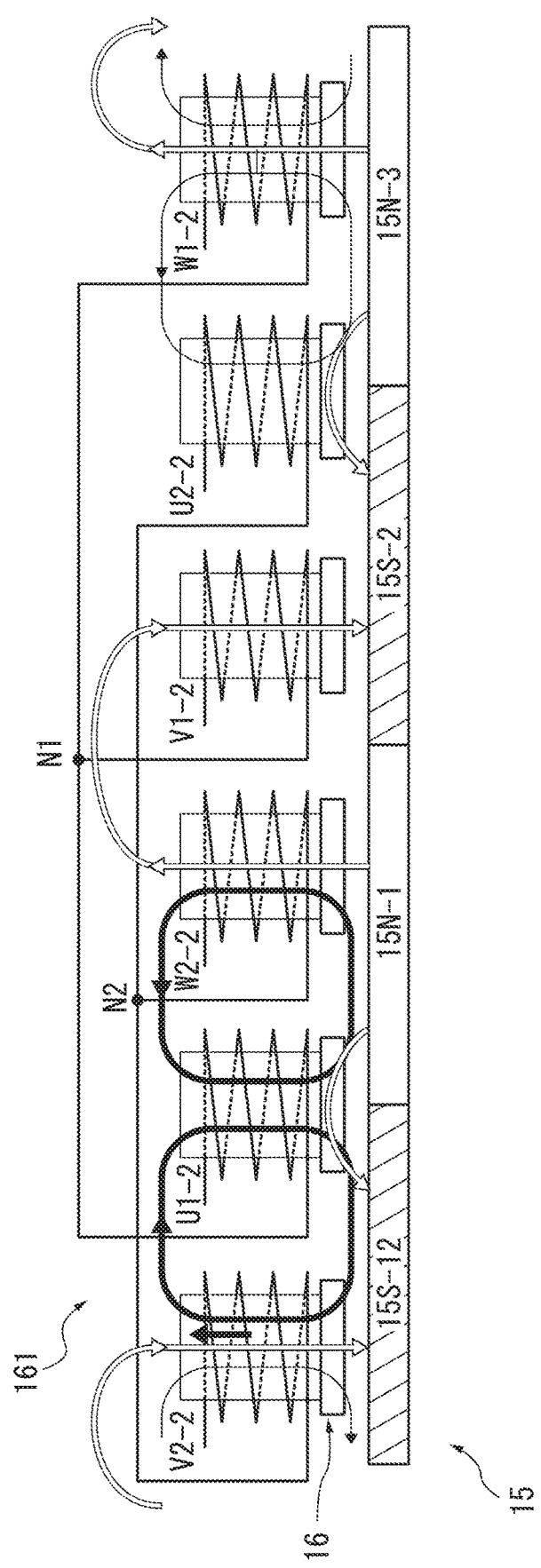
FIG. 11 is a schematic view for illustrating the stage determination process (S12) shown in FIG. 5.

Next, with reference to FIG. 11, a detailed description is given with respect to the induced voltages generated in the windings U2 and W2 at the boundary between the stage 3 and the stage 2 in the combination of the field portion 15 and the armature unit 161 shown in FIG. 2. FIG. 11 schematically shows the rotor positional relationship and lines of magnetic force generated at the boundary between the stage 3 and the stage 2 (mechanical angle 10 degree) in the combination of the field portion 15 and the armature unit 161 shown in FIG. 2. In this case, the inductances of U1 and W2 are larger than the inductances of W1 and U2.

In the case shown in FIG. 11, since the winding U1 is located at the center of the NS-poles, and there is no cross magnetic flux, the magnetic resistance is small. In other words, the inductance is large. On the other hand, since the winding W1 is located close to the center of the magnet, the magnetic resistance increases when excited with a different polarity from that of the magnet. In other words, the inductance is small. When energization U1⇒W1 is performed, the winding U1 is magnetized to the N-pole, while the winding W1 is magnetized to the S-pole. Since the magnet opposing to the winding W1 is a different pole, the lines of magnetic force passing through the winding increase, but the magnetic resistance is large, so that the lines of magnetic force become smaller than the magnetic flux by the winding U1. The lines of magnetic force of the winding U1 cross the winding V2 and the winding W2, while the winding W1 crosses the winding U2 and the winding V2. The lines of magnetic force by the windings U1 and W1 interfere with the winding V2 so that the magnetic resistance temporarily decreases. For this reason, the magnetic flux crossing the winding W2 does not have an attenuated waveform of the induced voltage, but continuously has a flat waveform until the interference with the winding W1 ends, and has an attenuated waveform after the interference ends. Since the lines of magnetic force of W1 coincide with those of the magnet, they face in the direction so as to raise the magnetic resistance. On the other hand, since the direction of U1 is opposite, the lines of magnetic force thereof face in the direction so as to decrease the magnetic resistance. If U1 prevails over W1, the magnetic resistance of V2 decreases, so that the lines of magnetic force will increase. If W1 prevails, the magnetic resistance will increase. This prevents mutual increase and decrease of the lines of magnetic force, so that no induced voltage is generated in the winding V2. Due to this action, the lines of magnetic force passing through the magnetic poles of U2 and W2 are affected. In other words, when the magnetic resistance of the magnetic pole V2 is represented by Rv2, the magnetic resistance of the magnetic pole W2 is represented by Rw2, and the magnetomotive force of the magnetic pole U1 is represented by Hu1, the lines of magnetic force passing from the magnetic pole U1 through the magnetic pole W2 are Hu1×Rv2(Rv2+Rw2). This expression means that the magnetic pole U1 and the magnetic poles V2 and W2 are represented by a parallel circuit in terms of a magnetic circuit, and the magnetic force lines of the winding W2 are influenced by the magnetic resistance of the magnetic pole V2. When the magnetic flux density approaches a saturation state, the line of magnetic force does not increase.

Figure 12:
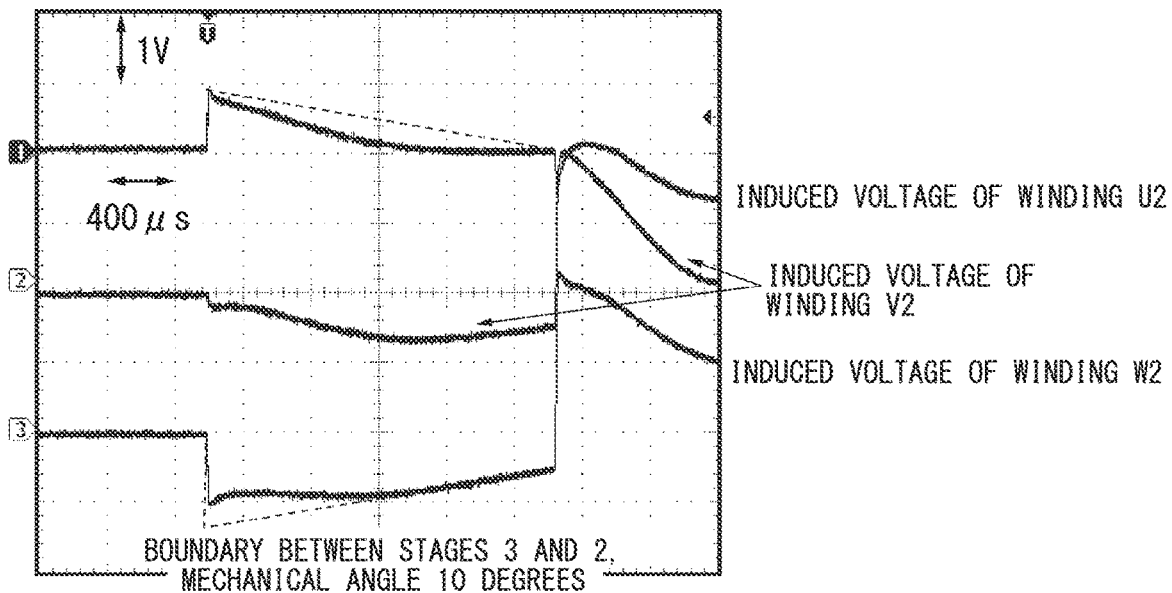
FIG. 12 is a waveform diagram for illustrating the stage determination process (S12) shown in FIG. 5.
Figure 13:
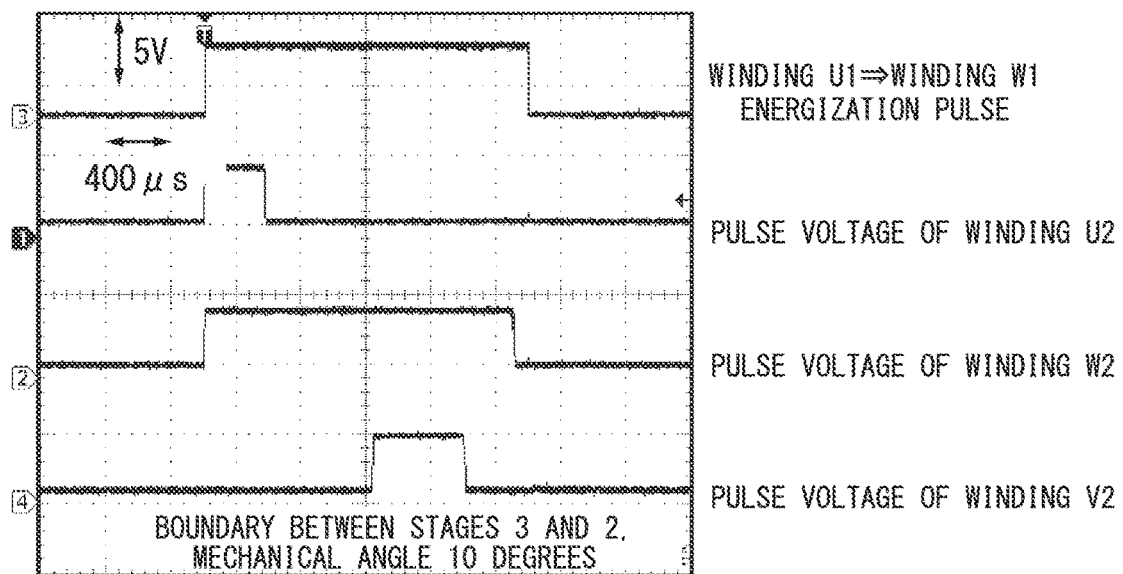
FIG. 13 is a waveform diagram for illustrating the stage determination process (S12) shown in FIG. 5.

FIG. 12 shows waveforms of the induced voltages observed in the winding U2, the winding V2, and the winding W2 when energization was performed for 2 ms from the winding U1 to the winding W1, in the positional relationship shown in FIG. 11. Additionally, FIG. 13 shows an energizing pulse from the winding U1 to the winding W1, a pulse voltage of the winding U2, a pulse voltage of the winding W2, and a pulse voltage of the winding V2, which were observed in the positional relationship shown in FIG. 11. The pulse voltage of the winding U2, the pulse voltage of the winding W2, and the pulse voltage of the winding V2 shown in FIG. 13 are waveforms obtained by binarizing with the threshold value 0.7V the induced voltage of the winding U2, the induced voltage of the winding W2, and the induced voltage of the winding V2. As shown in FIGS. 12 and 13, the pulse voltage of the winding U2 has a shorter pulse width than the pulse voltage of the winding W2 at the boundary between the stage 3 and the stage 2 (mechanical angle 10°).

Figure 14:
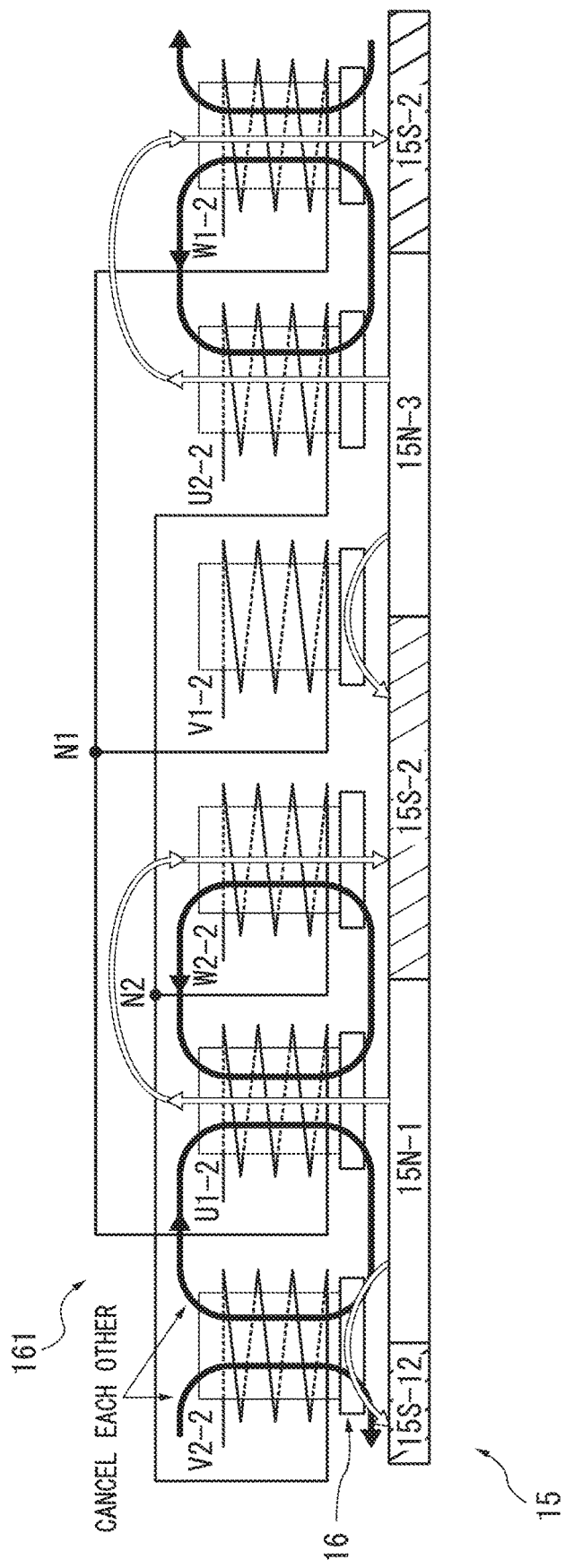
FIG. 14 is a schematic view for illustrating the stage determination process (S12) shown in FIG. 5.

Next, with reference to FIG. 14, a detailed description is given with respect to the induced voltages generated in the windings U2 and W2 at the boundary between the stage 4 and the stage 6 in the combination of the field portion 15 and the armature unit 161 shown in FIG. 2. FIG. 14 schematically shows the rotor positional relationship and the lines of magnetic force generated at the boundary between the stage 4 and the stage 6 (mechanical angle 30 degree) in the combination of the field portion 15 and the armature unit 161 shown in FIG. 2. In this case, the inductances of U1 and W2 are equal to the inductances of W1 and U2.

In the case shown in FIG. 14, since the windings U1 and W1 before energization are located at the same position with respect to the opposing magnets, the magnetic resistance and the inductance by the magnets are equal. Since the number of lines of magnetic force passing through the winding is equal, and the winding V1 is located at the center of the magnet, there is no line of magnetic force passing through the winding. When energization U1⇒W1 is performed, the winding U1 is magnetized to the N-pole, while the winding W1 is magnetized to the S-pole, and since the opposing magnets are the same pole, the magnetic resistance is small, while the inductance is large. Although the lines of magnetic force passing through the windings increase, since the inductance is larger than that in the case of the boundary between the stages 1 and 3, the increase of the magnetic force lines is larger than that in the case of the boundary between the stages 1 and 3. The same applies to W1. The lines of magnetic force produced by the winding U1 flow into the winding W2, while the lines of magnetic force produced by the winding W1 flow into the winding U2. There occurs the exact same magnitude of voltage, which is plus for winding U2 viewed from the neutral point N2, and which is minus for the winding W2 viewed from the neutral point.

Figure 15:
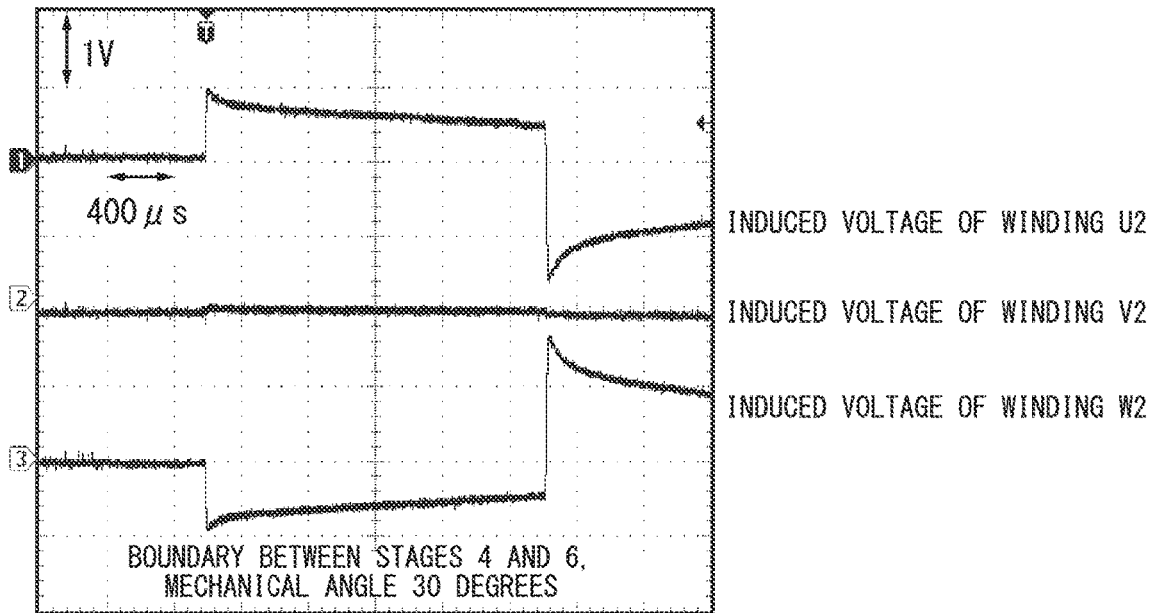
FIG. 15 is a waveform diagram for illustrating the stage determination process (S12) shown in FIG. 5.
Figure 16:
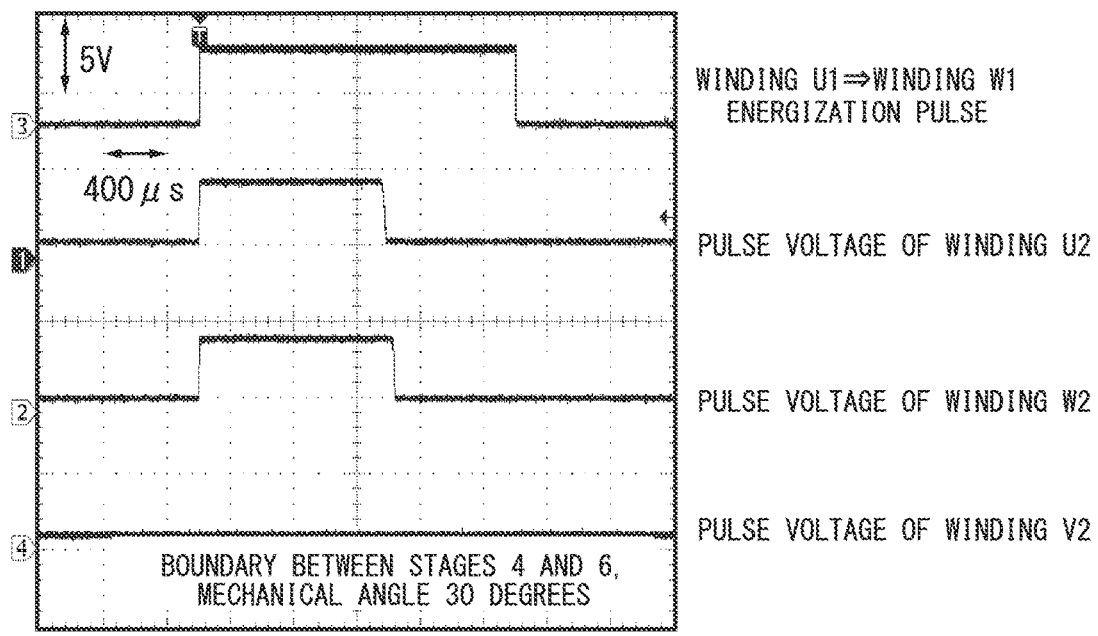
FIG. 16 is a waveform diagram for illustrating the stage determination process (S12) shown in FIG. 5.

FIG. 15 shows waveforms of the induced voltages observed in the winding U2, the winding V2, and the winding W2 when energization was performed for 2 ms from the winding U1 to the winding W1, in the positional relationship shown in FIG. 14. Additionally, FIG. 16 shows an energizing pulse from the winding U1 to the winding W1, a pulse voltage of the winding U2, a pulse voltage of the winding W2, and a pulse voltage of the winding V2, which were observed in the positional relationship shown in FIG. 14. The pulse voltage of the winding U2, the pulse voltage of the winding W2, and the pulse voltage of the winding V2 shown in FIG. 16 are waveforms obtained by binarizing with the threshold value 0.7V the induced voltage of the winding U2, the induced voltage of the winding W2, and the induced voltage of the winding V2. As shown in FIGS. 15 and 16, the pulse voltage of the winding pulse U2 and the pulse voltage of the winding pulse W2 have the substantially equal pulse width at the boundary between the stage 4 and the stage 6 (mechanical angle 30°).

Figure 17:
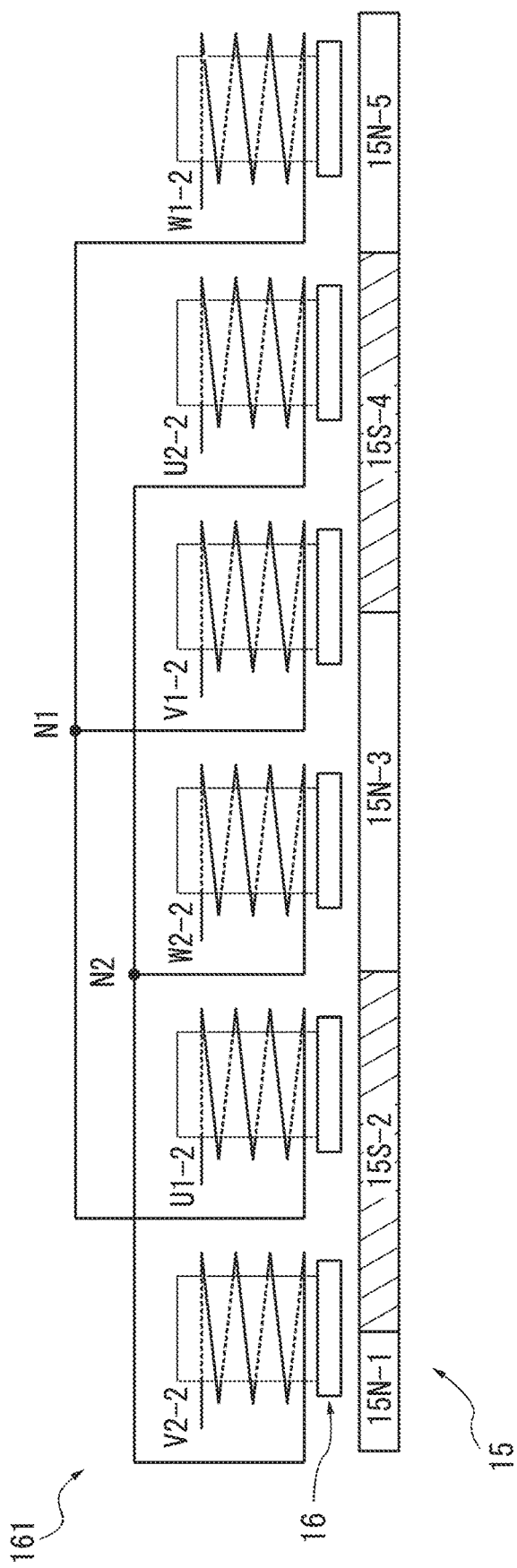
FIG. 17 is a schematic view for illustrating the stage determination process (S12) shown in FIG. 5.
Figure 18:
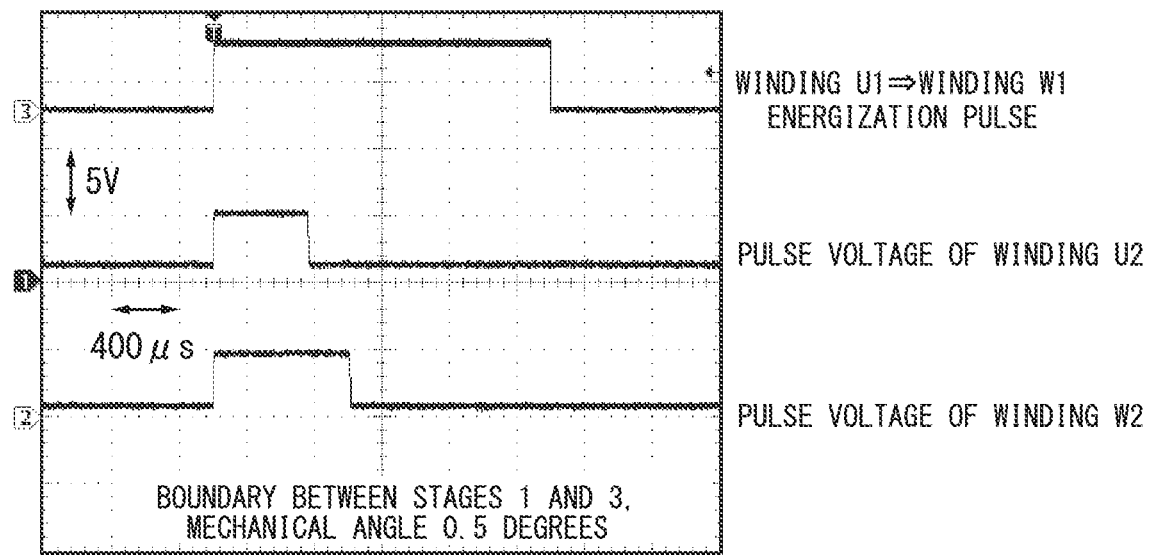
FIG. 18 is a waveform diagram for illustrating the stage determination process (S12) shown in FIG. 5.
Figure 19:
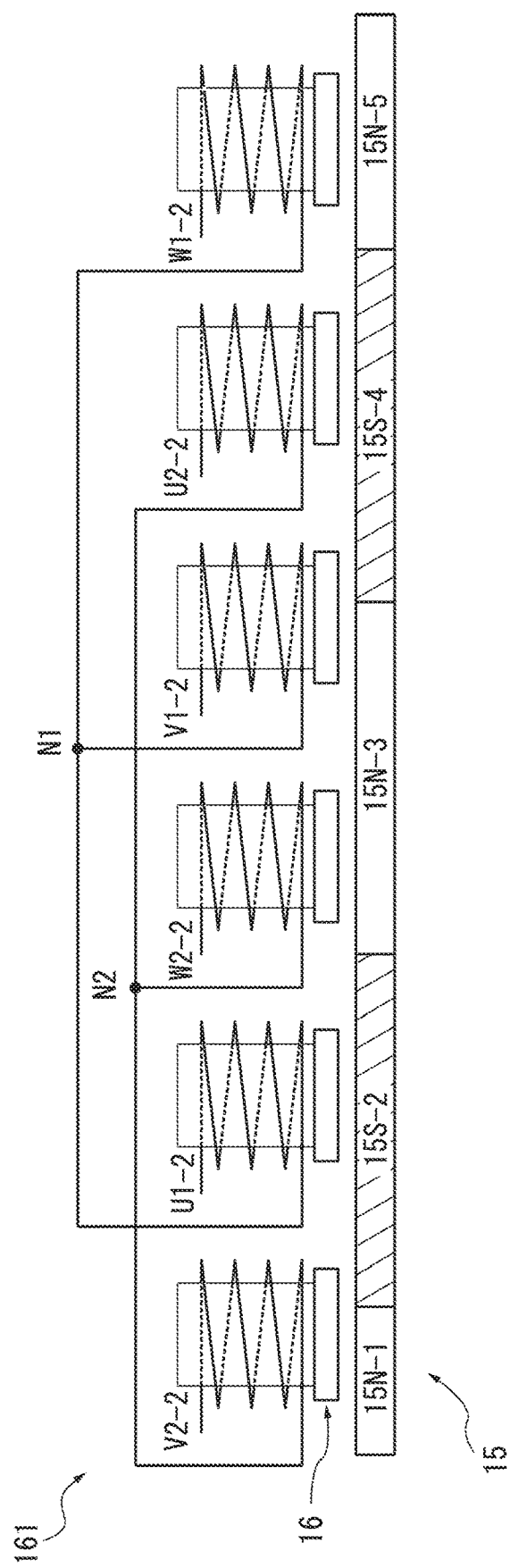
FIG. 19 is a schematic view for illustrating the stage determination process (S12) shown in FIG. 5.
Figure 20:
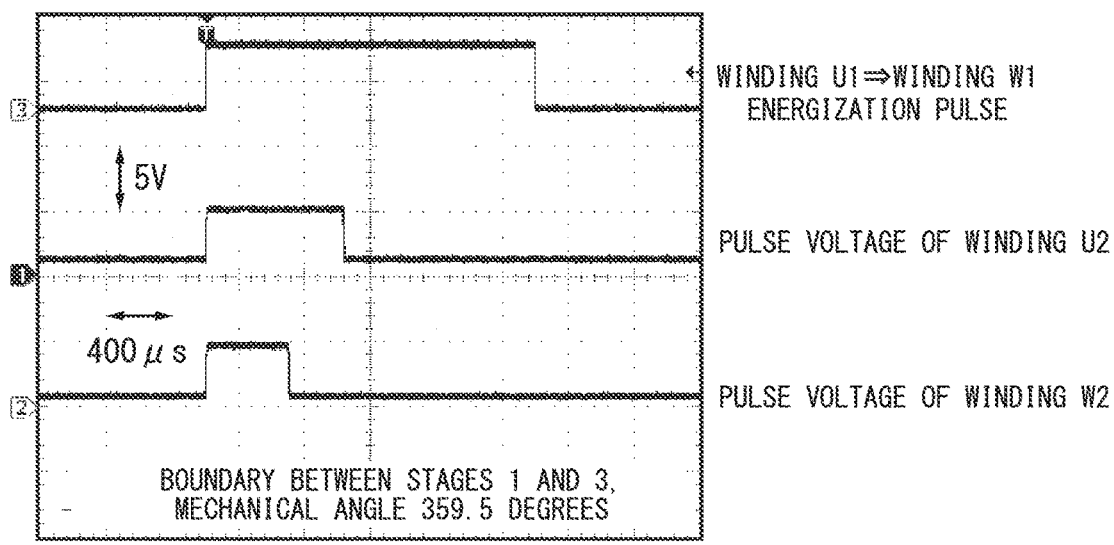
FIG. 20 is a waveform diagram for illustrating the stage determination process (S12) shown in FIG. 5.

Next, with reference to FIGS. 17 to 20, a detailed description is given with respect to the induced voltages generated in the winding U2 and the winding W2 when the position slightly deviates from the boundary between the stage 1 and the stage 3 in the combination of the field portion 15 and the armature unit 161 shown in FIG. 2. FIG. 17 schematically shows the rotor positional relationship in the vicinity of the boundary between the stage 1 and the stage 3 (mechanical angle 0.5 degrees) in the combination of the field portion 15 and the armature part 161 shown in FIG. 2. FIG. 18 shows an energizing pulse from the winding U1 to the winding W1, a pulse voltage of the winding U2, and a pulse voltage of the winding W2 which were observed in the positional relationship shown in FIG. 17. FIG. 19 schematically shows the rotor positional relationship in the vicinity of the boundary between the stage 1 and the stage 3 (mechanical angle 359.5 degrees) in the combination of the field portion 15 and the armature unit 161 shown in FIG. 2. FIG. 20 shows an energizing pulse from the winding U1 to the winding W1, a pulse voltage of the winding pulse U2, and a pulse voltage of the winding W2 observed in the positional relationship shown in FIG. 19.

As shown in FIG. 8 and FIG. 10 described above, when positioned at the center of the boundary between the stage 1 and the stage 3, the same voltage with different polarities is generated in U2 and W2, while no voltage is generated in the winding V2. On the other hand, when slightly shifted from the boundary as shown in FIG. 17, the pulse width clearly changes as shown in FIG. 18. The waveform shown in FIG. 18 is a pulse-converted waveform when the rotor is shifted slightly from the equilibrium state shown in FIG. 8 (shifted by 0.5 degrees toward the stage 3 direction). Since the winding W1 is closer to the center of the magnet than the winding U1, the magnetic reluctance is large, while the lines of magnetic force penetrating at the time of energization is less than those by the winding U1. Therefore, the voltage induced in U2 is smaller (the pulse width is shorter) than that induced in W2.

Additionally, likewise, as shown in FIG. 19, even when the rotor is slightly shifted in the reverse direction from the boundary, the pulse width obviously changes as shown in FIG. 20. The waveform of FIG. 20 is a pulse-converted waveform when the rotor is shifted slightly from the equilibrium state (shifted by 0.5 degrees toward the stage 1 direction). Since the winding U1 is closer to the center of the magnet than the winding W1, the magnetic resistance is large, while the lines of magnetic force penetrating at the time of energization is less than that by the winding W1. Therefore, the voltage induced in W2 is smaller (the pulse width is shorter) than that induced in U2.

Figure 21:
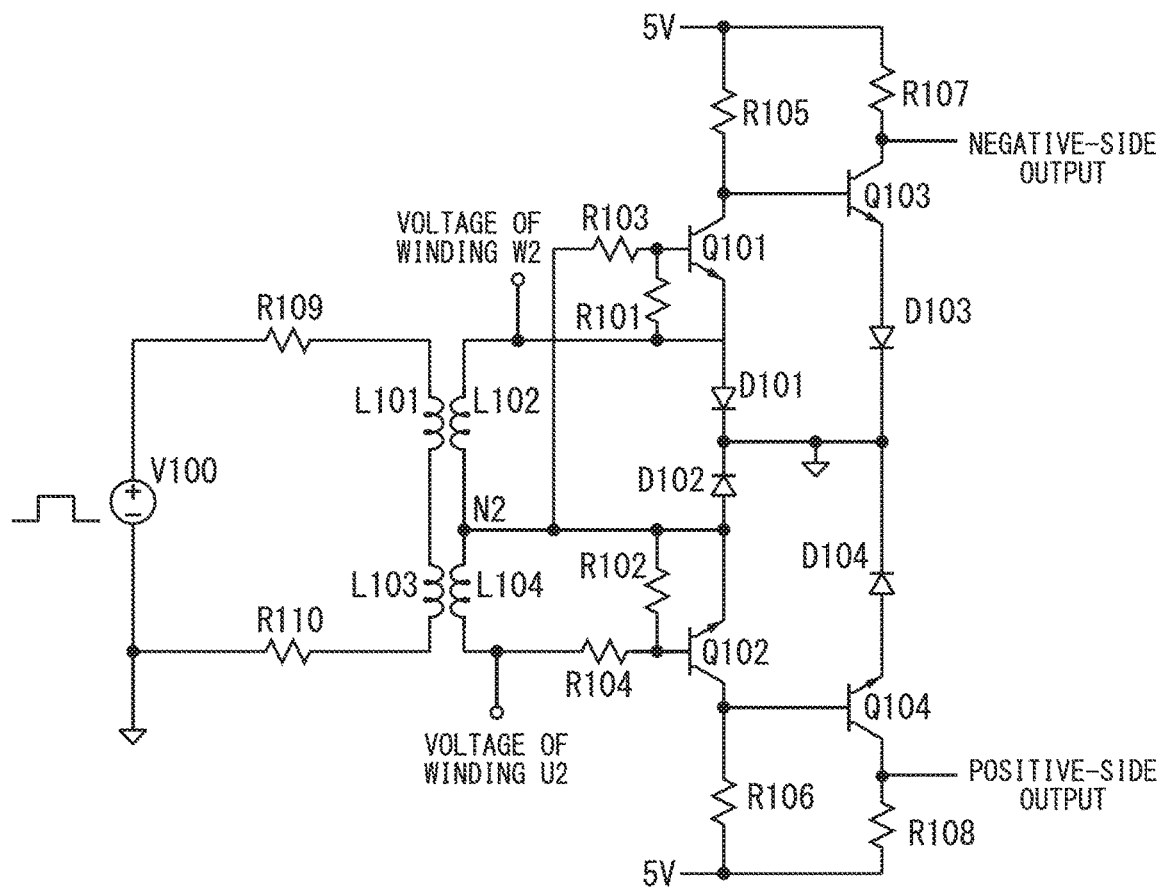
FIG. 21 is a circuit diagram showing a simulation circuit for illustrating the stage determination process (S12) shown in FIG. 5.
Figure 22:
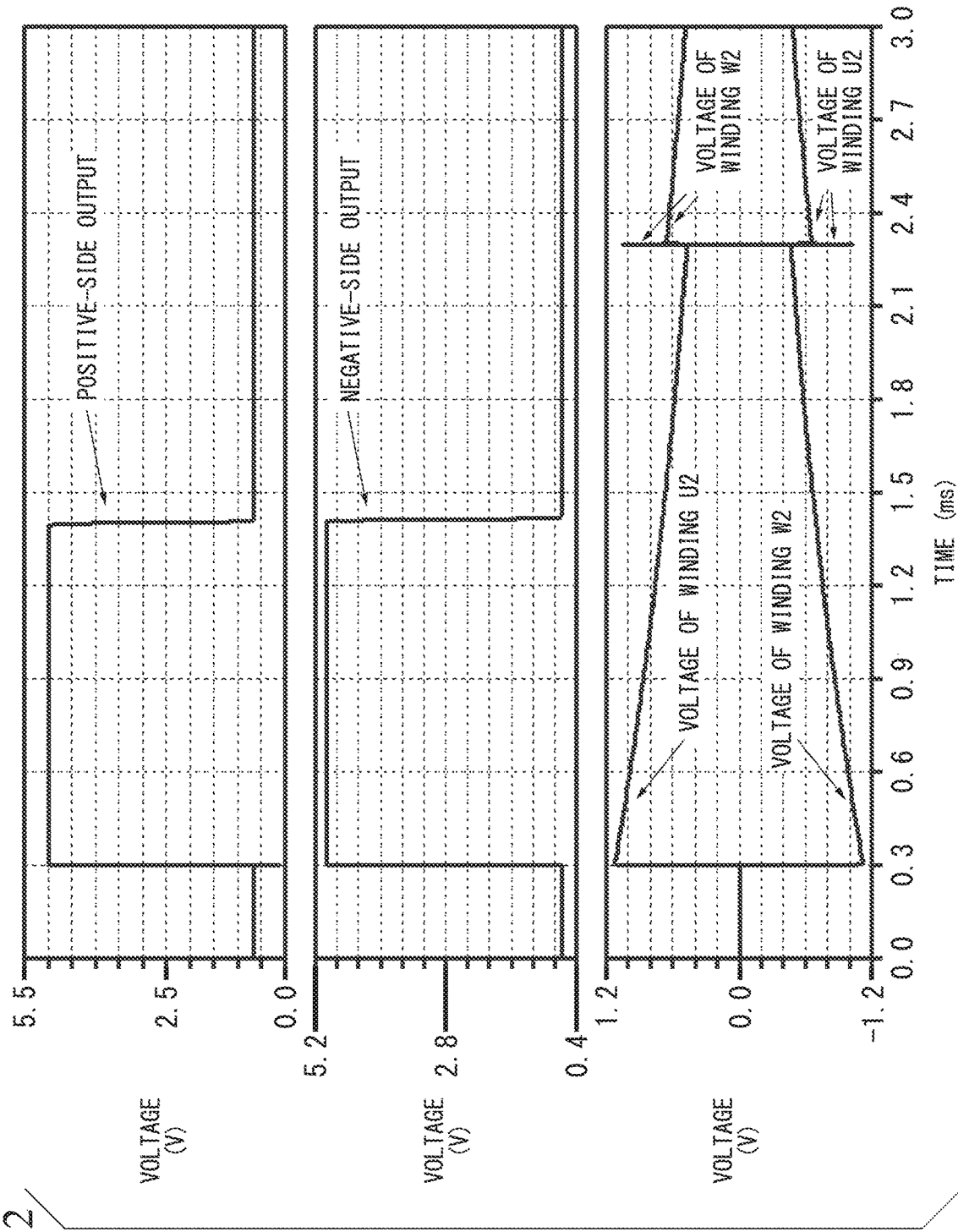
FIG. 22 is a waveform diagram showing a result of calculation using the simulation circuit for illustrating the stage determination process (S12) shown in FIG. 21.
Figure 23:
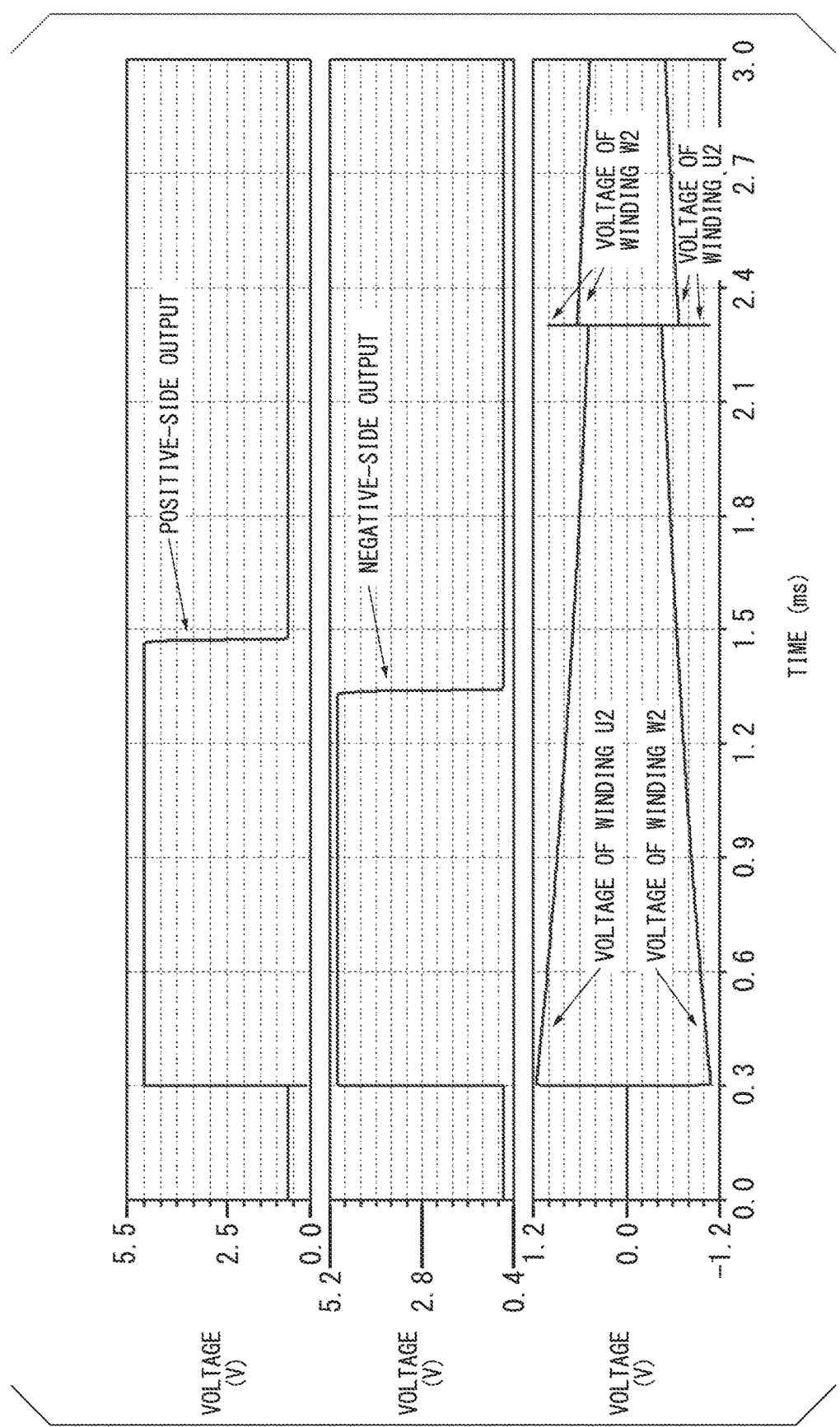
FIG. 23 is a waveform diagram showing a result of calculation using the simulation circuit for illustrating the stage determination process (S12) shown in FIG. 21.
Figure 24:
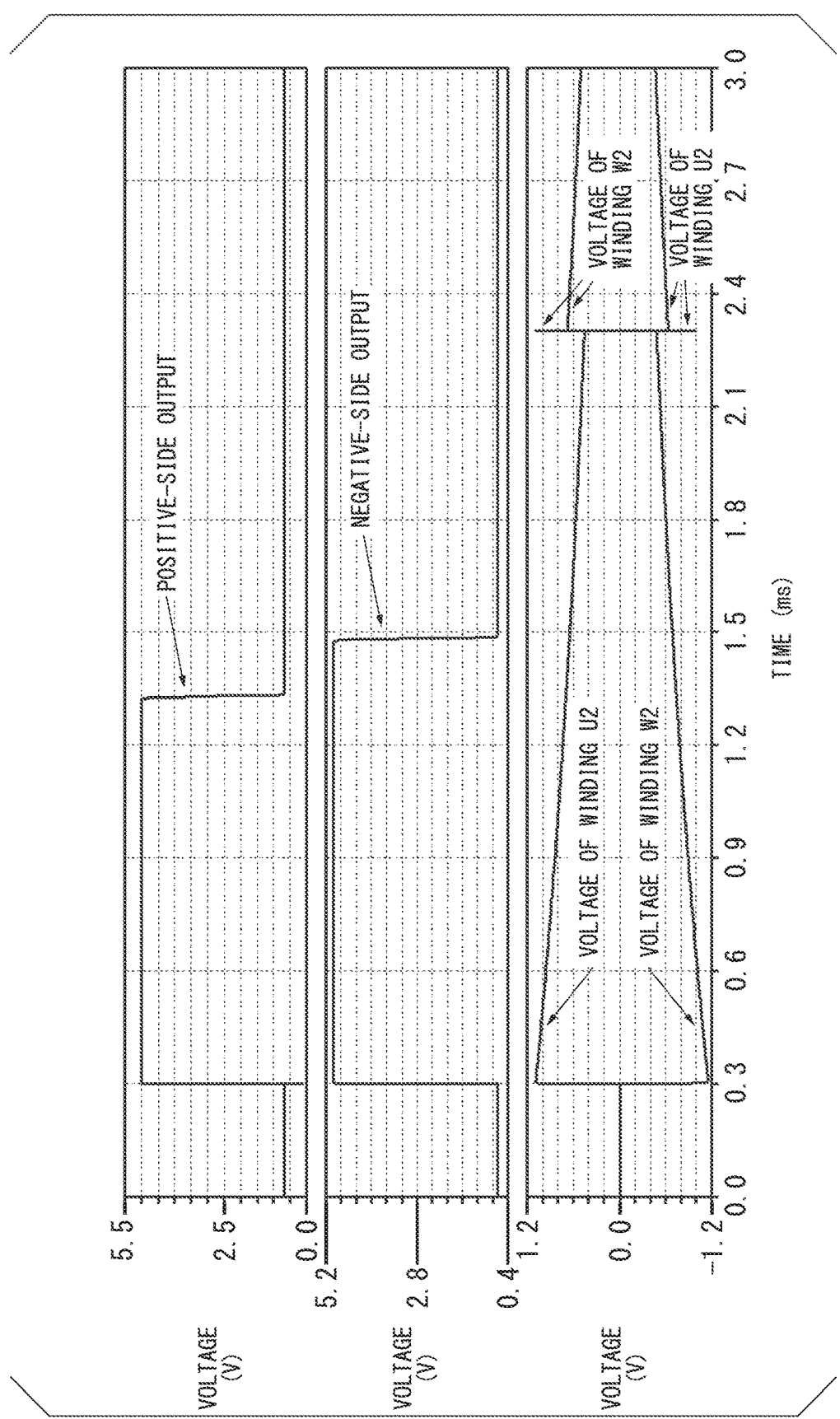
FIG. 24 is a waveform diagram showing a result of calculation using the simulation circuit for illustrating the stage determination process (S12) shown in FIG. 21.

Next, with reference to FIGS. 21 to 24, results of simulating by a circuit simulator the operation in the vicinity of the center of the boundary between the stage 1 and the stage 3 will be described. FIG. 21 shows a circuit used in the simulation. In FIG. 21, a power supply 100 is connected with an inductor L101 corresponding to the winding W1 of the primary winding and an inductor L103 corresponding to the winding U1 of the primary winding via a resistor R109 and a resistor R110. A voltage with a pulse width of 2 ms is output from the power supply 100. Additionally, an inductor L102 corresponding to the winding U2 of the secondary winding and an inductor L104 corresponding to the winding W2 of the secondary winding are connected at the neutral point N2. The inductance of each inductor is set with a value calculated based on the experimental results. A circuit including the transistors Q101 to Q104 on the secondary side, diodes D101 to D104, and resistors R101 to R108 constitutes a circuit for setting a negative side output or a positive side output to a H-level when the voltage generated in the inductor L102 and the inductor L104 exceeds approximately 0.7V, and setting the negative side output or the positive side output to an L-level when the voltage does not exceed approximately 0.7V. FIG. 22 shows simulation results of the time changes of the positive side output, the negative side output, the voltage of the winding U2, and the voltage of the winding W2 at the boundary between the stage 1 and the stage 3 (mechanical angle 0 degree) when the voltage with the pulse width of 2 ms is output from the power supply 100. FIG. 23 shows simulation results of the time changes of the positive side output, the negative side output, the voltage of the winding U2, and the voltage of the winding W2 at the boundary between the stage 1 and the stage 3 (mechanical angle 0.5 degrees) when the voltage with the pulse width of 2 ms is output from the power supply 100. FIG. 24 shows simulation results of the time changes of the positive side output, the negative side output, the voltage of the winding U2, and the voltage of the winding W2 at the boundary between the stage 1 and the stage 3 (mechanical angle 359.5 degrees) when the voltage with the pulse width of 2 ms is output from the power supply 100. As is apparent from FIGS. 22 to 24, in the vicinity of the boundary between the stage 1 and the stage 3, the pulse width of the voltage of the winding U2 and the pulse width of the voltage of the winding W2 are compared, thereby making it possible to accurately determine a stage.

Figure 25:
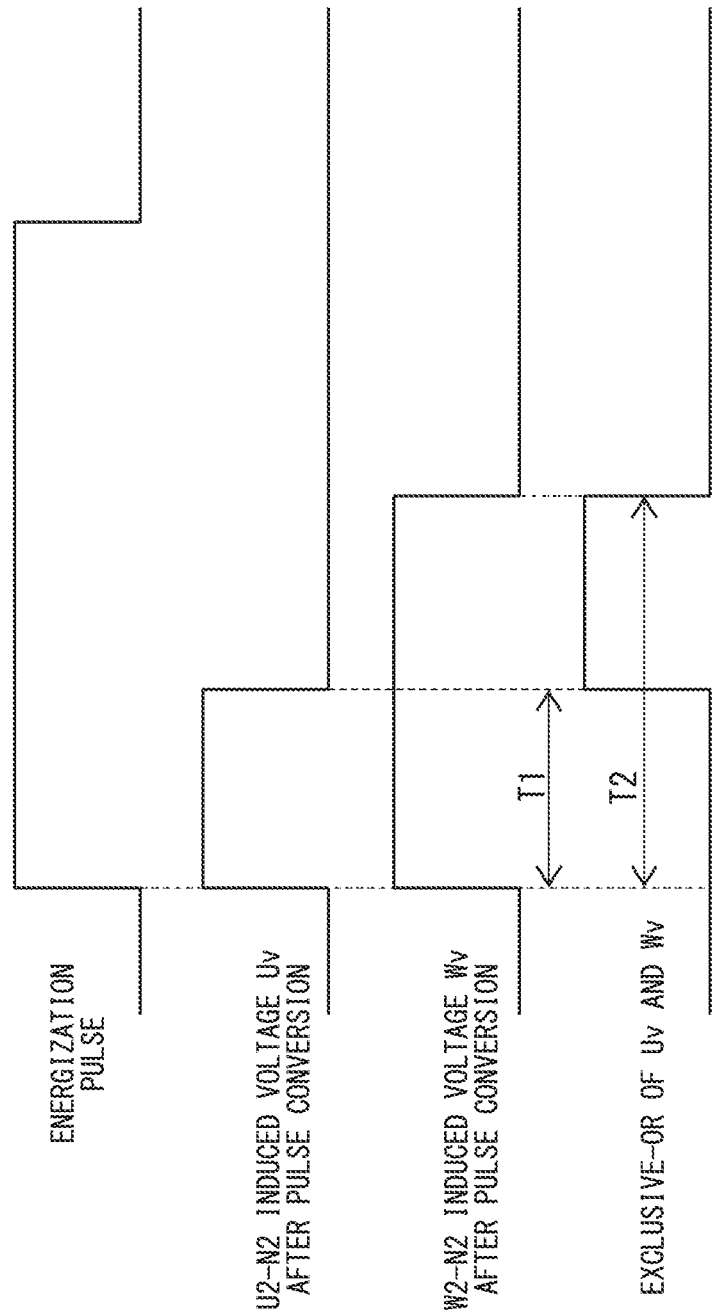
FIG. 25 is a timing chart for illustrating the stage determination process (S12) shown in FIG. 5.

Based on the theoretical and experimental verification as described above, in the present embodiment, rotor position determination is performed as follows. In other words, first, preliminarily, a pulse width of the U2-N2 induced voltage Uv obtained by performing pulse conversion (binarization) on the phase voltage U2-N2 when the energizing pulse with the predetermined pulse width shown in FIG. 25 is supplied between U1 and W1, a pulse width of the induced voltage W2-N2 obtained by performing pulse conversion on the phase voltage W2-N2, a rise time T1, and a fall time T2 are acquired for each predetermined rotor angle by experiments or simulation. The U2-N2 induced voltage Uv and the W2-N2 induced voltage Wv are binary signals at the H-level or L-level obtained by binarizing with a predetermined threshold value the absolute values of the U2-N2 phase voltage and the W2-N2 phase voltage. Additionally, the rise time T1 is a time until an exclusive OR of the U2-N2 induced voltage Uv and the W2-N2 induced voltage Wv rises to the H-level after the pulse supply. The fall time T2 is a time from when the exclusive OR roses to the H-level after the pulse supply to when the exclusive OR falls to the L-level.

Figure 26:
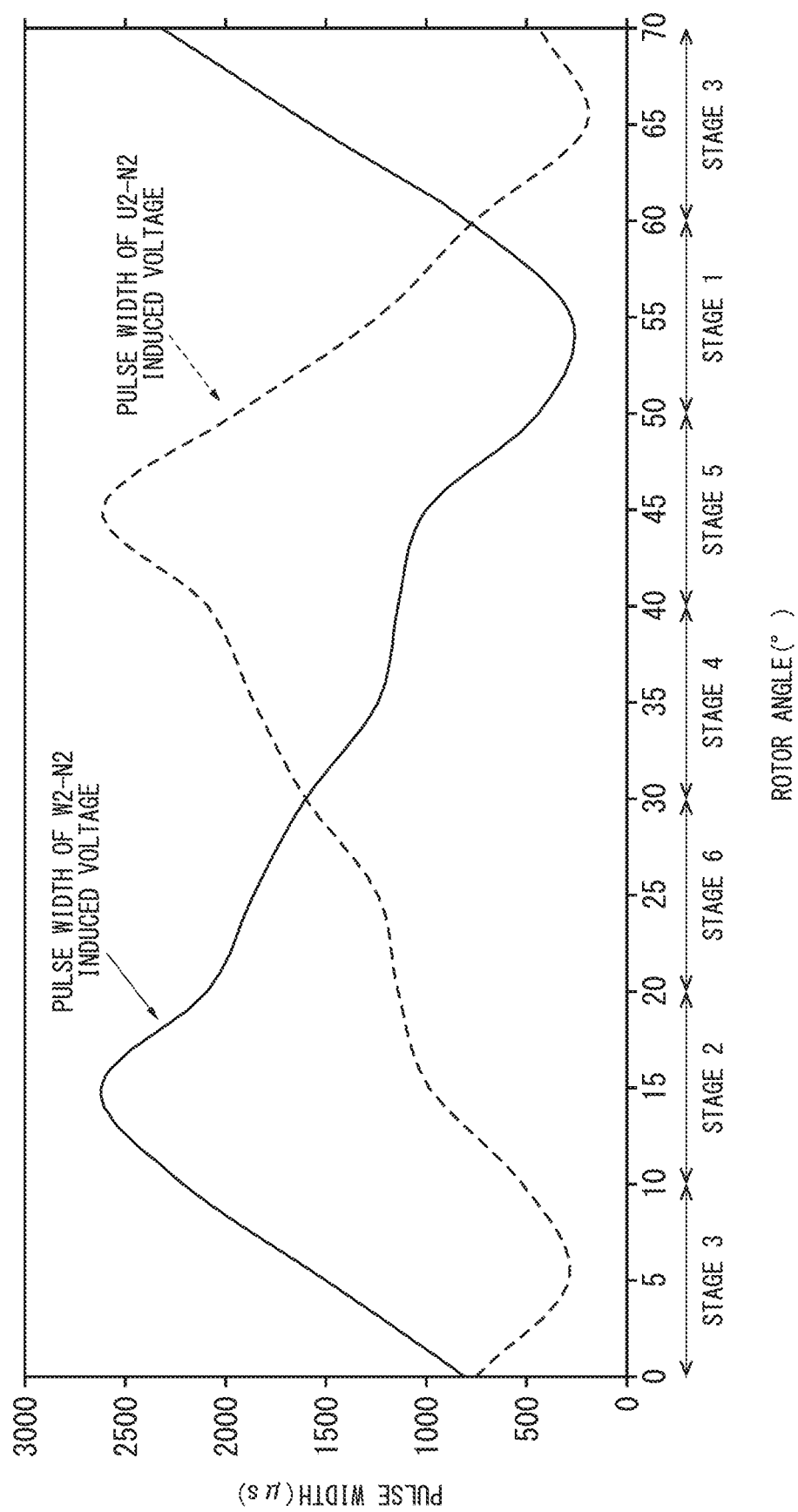
FIG. 26 is a characteristic diagram showing a correspondence relationship between a rotor angle and a pulse width for illustrating the stage determination process (S12) shown in FIG. 5.

FIG. 26 is a characteristic diagram showing a result of measuring the pulse width of the W2-N2 induced voltage Wv of the secondary winding and the pulse width of the U2-N2 induced voltage Uv when the battery voltage with the pulse width of 2 ms is applied between U1-W1 of the primary winding. A horizontal axis is the rotor angle) (°), while a vertical axis is the pulse width. When the pulse width of the W2-N2 induced voltage Wv is larger than the pulse width of the U2-N2 induced voltage Uv, the pulse width of the W2-N2 induced voltage Wv is the fall time T2 shown in FIG. 25, while the pulse width of the U2-N2 induced voltage Uv is the rise time T1. When the pulse width of the W2-N2 induced voltage Wv is smaller than the pulse width of the U2-N2 induced voltage Uv, the pulse width of the W2-N2 induced voltage Wv is the rise time T1 shown in FIG. 25, while the pulse width of the U2-N2 induced voltage Uv is the fall time T2.

Further, preliminarily, the characteristics shown in FIG. 26 are replaced by a characteristic diagram based on linear approximation shown in FIG. 27, and threshold values Ta, Tb, Tc, and Td are determined from the characteristic diagram shown in FIG. 27. The threshold value Ta is the pulse width of the rise time T1 at the boundary between the stage 3 and the stage 2 or the boundary between the stage 5 and the stage 1. The threshold value Tb is the pulse width of the rise time T1 at the boundary between the stage 1 and the stage 3. The threshold value Tc is the pulse width of the rise time T1 at the boundary between the stage 2 and the stage 6 or the boundary between the stage 4 and the stage 5. The threshold Td is the pulse width of the fall time T2 at the boundary between the stage 3 and the stage 2 or the boundary between the stage 5 and the stage 1. Additionally, each threshold has a relationship of Ta<Tb<Tc<Td. Here, the maximum value of the pulse width in the approximate curve was set with the upper limit value of the time width 2 ms=2000 µs of the energizing pulse.

Further, preliminarily, as shown in FIG. 28, dependence characteristics of the threshold voltages Ta, Tb, Tc, and Td on the battery voltage shown in FIG. 27 are acquired. FIG. 28 shows a result of experimentally obtaining changes in threshold values Ta, Tb, Tc, and Td in accordance with the change of the approximate characteristic shown in FIG. 27 when the voltage of the battery 9 shown in FIG. 1 is changed. A horizontal axis represents the battery voltage, while a vertical axis represents the threshold time. The voltage dependency of the threshold value Tb and the threshold value Tc is larger particularly in the low voltage region than that of the threshold value Ta and the threshold value Td. Here, the dependency characteristic with respect to the battery voltage shown in FIG. 28 was measured under a condition that a determination value (voltage value) referred to as a reference at the time of binarizing the W2-phase voltage (W2-N2 voltage) and the U2-phase voltage (U2-N2 voltage) is kept constant. However, the determination value (voltage value) referred to as the reference at the time of the binarization is changed according to the battery voltage while keeping the threshold values Ta to Td (time) constant, thereby making it possible to deal with the dependence characteristics on the battery voltage.

Additionally, as shown in FIG. 29, each stage is classified by combining the rise time T1, the fall time T2, the order indicating which is larger between the pulse width of the W2-N2 induced voltage Wv and the pulse width of the U2-N2 induced voltage Uv. In the stage 3, the rise time T1 is T1≤Tb, the fall time T2 is Tb≤T2≤2000 µs, and the pulse width of the w-phase is larger than the pulse width of the u-phase. In the stage 2, the rise time T1 is Ta≤T1≤Tc, the fall time T2 is Td≤T2, and the pulse width of the w-phase is larger than the pulse width of the u-phase. In the stage 6, the rise time T1 is Tc≤T1, the fall time T2 is T2≤Td, and the pulse width of the w-phase is larger than the pulse width of the u-phase. In the stage 4, the rise time T1 is Tc≤T1, the fall time T2 is T2≤Td, and the pulse width of the w-phase is smaller than the pulse width of the u-phase. In the stage 5, the rise time T1 is Ta≤T1≤Tc, the fall time T2 is Td≤T2, and the pulse width of the w-phase is smaller than the pulse width of the u-phase. In the stage 1, the rise time T1 is T1≤Tb, the fall time T2 is Tb≤T2≤2000 µs, and the pulse width of the w-phase is smaller than the pulse width of the u-phase.

Figure 30:
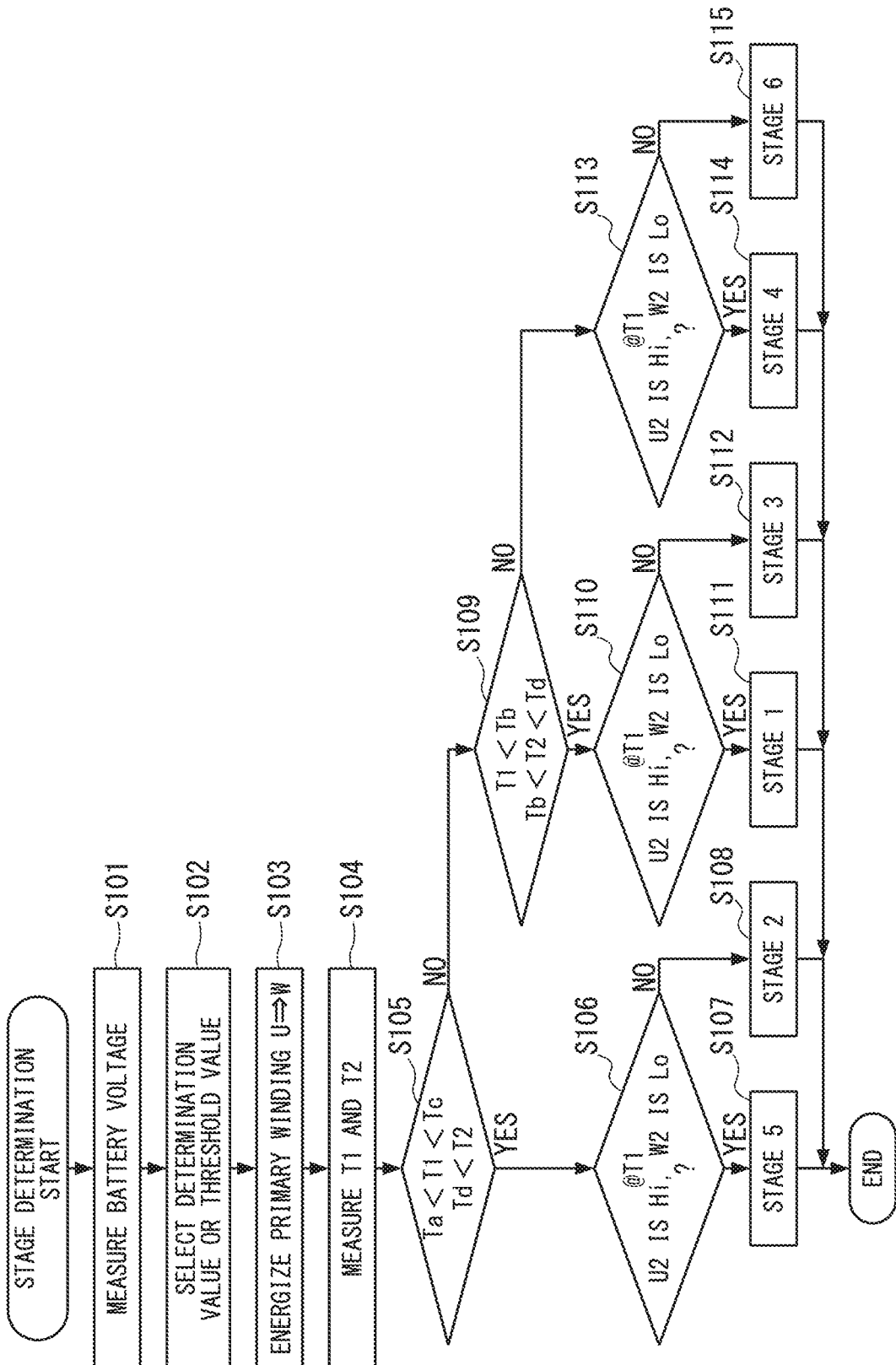
FIG. 30 is a flowchart for illustrating the stage determination process (S12) shown in FIG. 5.

Based on the classification shown in FIG. 29, the rotor position determination circuit 75 fetches the voltage induced in the winding portion ACG2 in step S12 of FIG. 5, according to the process flow shown in FIG. 30, and determines a rotor stage. In other words, the rotor position determination circuit 75 measures a battery voltage (step S101) and selects a determination value or a threshold value (step S102). Next, the battery voltage is applied for 2 ms from U1 to W1 (step S103). Next, the rotor position determination circuit 75 measures the rise time T1 and the fall time T2 (step S104).

Next, the rotor position determination circuit 75 determines whether or not Ta<T1<Tc and Td<T2 are met (step S105). If they are met (step S105: YES), the rotor position determination circuit 75 determines, at the time the rise time T1 elapses, whether or not the U2-N2 induced voltage Uv is at the H-level (U2 is Hi), and the W2-N2 induced voltage Wv is at the L-level (W2 is Lo) (step S106). If Uv is at the H-level, and Wv is at the L-level (step S106: YES), the rotor position determination circuit 75 determines that the rotor position is the stage 5 (step S107). If Uv is not at the H-level, or Wv is not at the L-level (step S106: NO), the rotor position determination circuit 75 determines that the rotor position is the stage 2 (step S108).

On the other hand, when the condition of step S105 is not met (step S105: NO), the rotor position determination circuit 75 determines whether or not T1<Tb and Tb<T2<Td are met (step S109). If T1<Tb and Tb<T2<Td are met, the rotor position determination circuit 75 determines, at the time the rise time T1 elapses, whether or not the U2-N2 induced voltage Uv is at the H-level (U2 is Hi), and the W2-N2 induced voltage Wv is at the L-level (W2 is Lo) (step S110). If Uv is at the H-level, and Wv is at the L-level (step S110: YES), the rotor position determination circuit 75 determines that the rotor position is stage 1 (step S111). If Uv is not at the H-level, or Wv is not at the L-level (step S110: NO), the rotor position determination circuit 75 determines that the rotor position is stage 3 (step S112). On the other hand, if T1<Tb is not met, or if Tb<T2<Td is not met (step S109: NO), the rotor position determination circuit 75 determines, at the time the rise time T1 elapses, whether or not the U2-N2 induced voltage Uv is at the H-level (U2 is Hi), and the W2-N2 induced voltage Wv is at the L-level (W2 is Lo) (step S113). If Uv is at the H-level, and Wv is at the L-level (step S113: YES), the rotor position determination circuit 75 determines that the rotor position is the stage 4 (step S114). If Uv is not at the H-level, or Wv is not at the L-level (step S113: NO), the rotor position determination circuit 75 determines that the rotor position is the stage 6 (step S115).

As described above, the rotor position determination circuit 75 performs the stage determination process in step S12 of FIG. 5.

Here, in the flow shown in FIG. 30, the rotor position determination circuit 75 first performs confirmation of the stage 2 and the stage 5. Next, the rotor position determination circuit 75 performs confirmation of the stage 1 and the stage 3, and then performs confirmation of the stage 4 and the stage 6. When the battery voltage becomes lower than 9V, the linearity of the threshold value Tc used for the determination is lost as shown in FIG. 28, and the characteristics thereof are deteriorated (however, the inversion relationship between the H-level and the L-level does not change over boundary). For this reason, there is a possibility that the stage 4 and the stage 6 might be erroneously recognized as the stage 2 or the stage 5. Therefore, the stage 2 and the stage 5, and the stage 1 and the stage 3, the characteristics of which are not deteriorated, are checked first. The stage 4 and the stage 6 are determined not by time, but only by the relation between the H-level and the L-level. It is easy, but achieves high certainty. Since the determination on the boundaries of the stages cannot be made, the stage 1 and the stage 3, and the stage 4 and the stage 6, are identified from the levels of U2 and W2 at the time the time T1 elapses.

Next, in FIG. 5, the CPU 72 determines whether or not the stage determination process has been completed normally in the rotor position determination circuit 75 (step S13). On the other hand, if the stage determination process has not been completed normally (in the case of "NO" in step S13), the CPU 72 again performs the determination process in step S12 (from "YES" in step S11 to step S12). On the other hand, if the stage determination process has been completed normally (in the case of "YES" in step S13), the CPU 72 starts energization control of the MOSFETs (Q1) to (Q9) of the first power conversion unit 61 and the second power conversion unit 62 according to the energization pattern corresponding to the result of the determination by the rotor position determination circuit 75 (step S14). At that time, the CPU 72 sets the energization angle of the first power conversion unit 61 to, for example, 180°, and sets the energization angle of the second power conversion unit 62 to 120° or more and smaller than 180°. Alternatively, the CPU 72 sets the energization angles of the first power conversion unit 61 and the second power conversion unit 62 both to 120°.

Then, after the starter generator 1 starts rotating, the zero-cross detection circuit 74 generates a stage signal based on the zero-cross points of the output voltage of the winding portion ACG2 and outputs the generated stage signal to the CPU 72 (step S15). Then, in step S15, the CPU 72 performs energization control on the first power conversion unit and the second power conversion unit according to the pattern corresponding to the stage detected by the zero-cross detection circuit 74.

Figure 31:
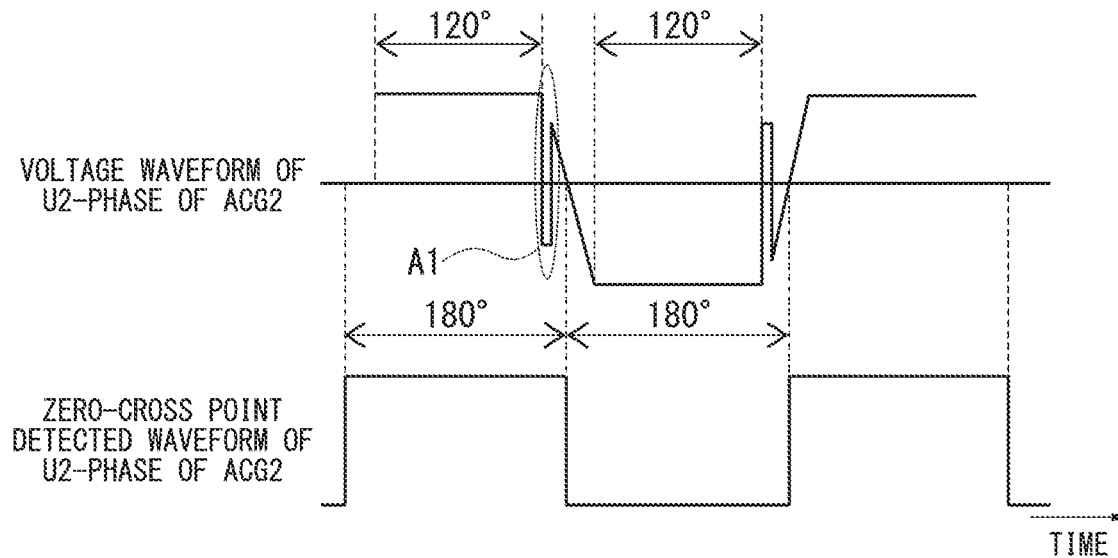
FIG. 31 is a waveform diagram for illustrating a process (S15) shown in FIG. 5.

Here, a voltage waveform of the winding portion ACG2 during the rotation at the time of the starter motor starting control will be described with reference to FIG. 31. FIG. 31 is a waveform diagram schematically showing a waveform of the output voltage of the winding U2 of the winding portion ACG2 and a waveform of the zero-cross points of the output voltage of the winding U2 detected by the rotor position determination circuit 75. In this case, the energization angle of the second power conversion unit 62 in step S14 and step S15 is set to 120°. In FIG. 31, the waveform of the detected zero-cross points rises or falls in the same direction as the change of the output voltage at the zero cross points of the output voltage. Here, in the voltage waveform of the winding portion ACG2, noise occurs at the timing of switching the phase (dashed area A1). Therefore, it is desirable for the rotor position determination circuit 75 to mask the noise at the switching timing so that the zero-cross detection will not be effected. The zero-cross detection circuit 74 generates the detected waveforms of the respective phases from the output voltage waveforms of the respective windings U2, V2, and W2; generates a stage signal indicating the rotor position based on the detected waveform of each phase; and outputs the generated stage signal to the CPU72.

Next, in FIG. 5, the CPU 72 determines whether or not the starting of the engine has been completed (step S16). If the starting of the engine has not been completed (in the case of "NO" in step S16), the CPU 72 returns to step S15 and continues the energization control according to the pattern corresponding to the stage detected by the zero-cross detection circuit 74 (step S15). If the starting of the engine has been completed (in the case of "YES" in step S16), the CPU 72 stops the motor energization and ends the starter motor starting control (step S17).

As described above, in the starter motor control, first, all the MOSFETs of the second power conversion unit 62 are tuned off. Then, using the first power conversion unit 61, the short pulse to the extent that the motor will not move is conducted to the winding portion ACG1 according to the predetermined energization pattern. Then, based on the information regarding the voltage induced in the other winding portion ACG, the rotor position determination circuit 75 determines a rotor stage when the rotor is stopped. Then, using the energization pattern corresponding to the rotor stage identified by the rotor position determination circuit 75, the CPU 72 starts energization of the first power conversion unit 61 and the second power conversion unit 62 connected to the respective phases of the winding portion ACG1 and the winding portion ACG2. Then, after the start of the energization, based on the rotor position information derived from the zero-cross points of the winding portion ACG2 detected by the zero-cross detection circuit 74, the CPU 72 performs energization of the winding portion ACG1 and the winding portion ACG2 until the starting of the engine is completed. This makes it possible in the present embodiment to use the winding portion ACG2 for the zero-cross point detection at the starting and to use both the winding portion ACG1 and the winding portion ACG2 as the starter windings. Additionally, for example, the energization mode for the winding portion ACG1 is set to 180°, while the energization mode for the winding portion ACG2 is set to as large an energization angle as possible to the extent that zero-cross points can be detected. This makes it possible to minimize a reduction in starting torque from the case where both the winding portion ACG1 and the winding portion ACG2 are set to the 180° energization mode.

Figure 32:
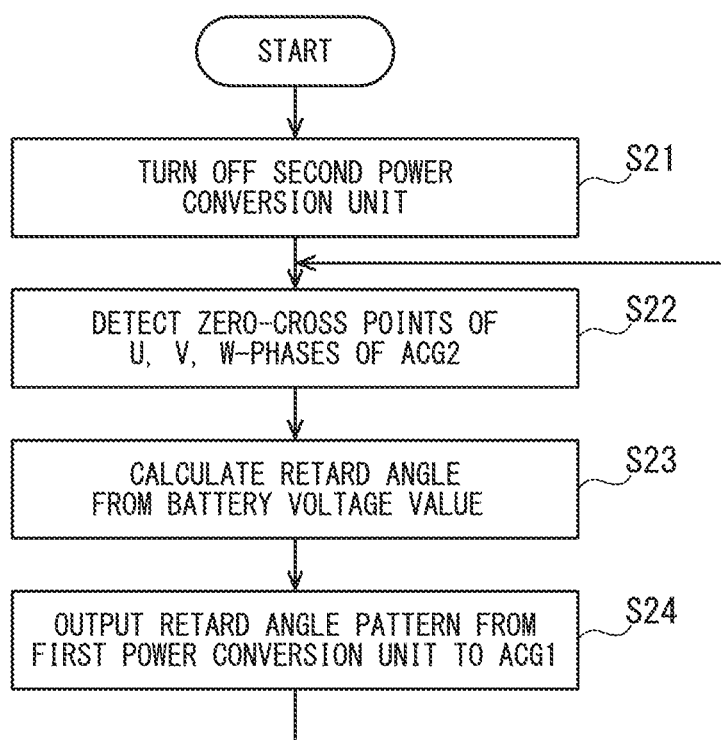
FIG. 32 is a flowchart showing an example of power generation control by the starting power generation control apparatus 100 shown in FIG. 1.
Figure 33:
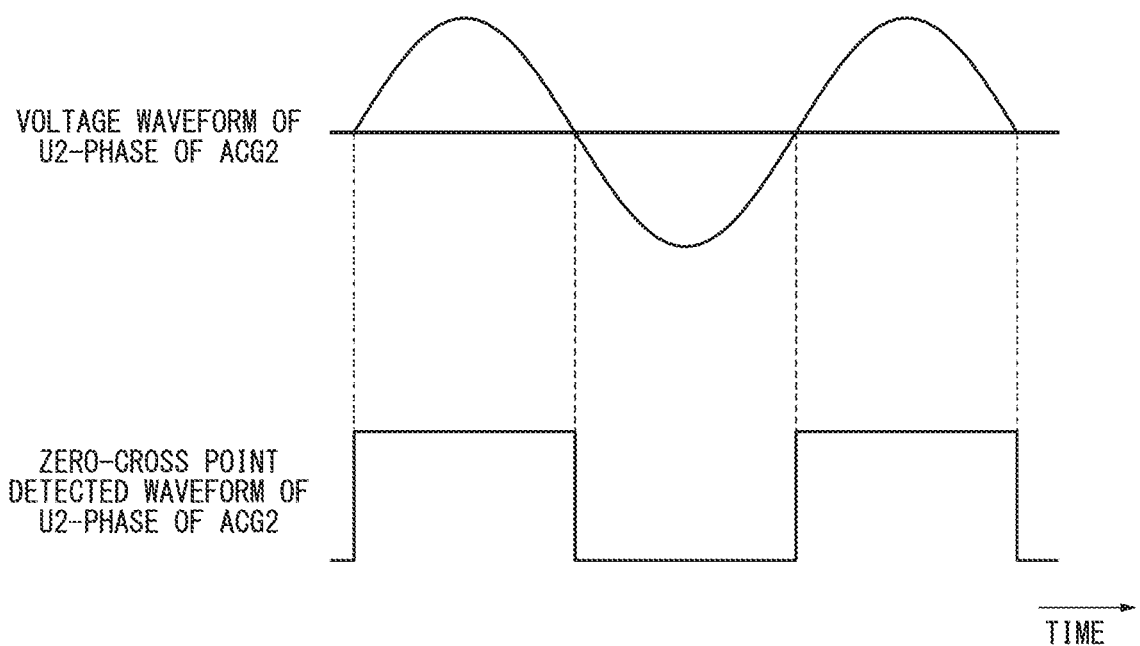
FIG. 33 is a waveform diagram for illustrating a process (S22) shown in FIG. 32.

Next, the case of operating the starter generator 1 as the power generator will be described with reference to FIG. 32 and FIG. 33. FIG. 32 is a flowchart showing an example of power generation control by the starting power generation apparatus 100 shown in FIG. 1. After the completion of the starting of the engine 2, the CPU 72 turns off the respective MOSFETs (Q7) to (Q9) of the second power conversion unit 62 (step S21).

Then, the CPU 72 receives the stage signal generated by the zero-cross detection circuit 74 based on the zero-cross points of the output voltage of the winding portion ACG2 (step S22).

Here, the voltage waveform of the winding portion ACG2 at the time of the power generation control will be described with reference to FIG. 33. FIG. 33 is a waveform diagram schematically showing a waveform of the output voltage of the winding U2 of the winding portion ACG2 and a waveform of the zero-cross points of the output voltage of the winding U2 which are detected by the rotor position determination circuit 75. In this case, the second power conversion unit 62 has been controlled to be in the off state. The waveform of the detected zero-cross points rises or falls in the same direction as that of the change of the output voltage at the zero cross points of the output voltage. The zero-cross detection circuit 74 generates the detected waveforms of the respective phases from the waveforms of the respective output voltages of the windings U2, V2, and W2 as shown in FIG. 33; based on the detected waveform of each phase, generates a stage signal stepwise indicating the rotor position; and outputs the stage signal to the CPU 72.

Then, the CPU 72 calculates the energization angle of the first power control unit 61 based on the voltage value of the battery 9 (step S23). Then, the CPU 72 outputs from the first power conversion unit 61 to the winding portion ACG1, a retard angle pattern based on the retard angle calculated in step S23 (step S24). Then, the CPU 72 returns to step S22 and performs the above-described processing again.

As described above, in the power generation control, all the MOSFETs of the second power conversion unit 62 are turned off after the start of the engine, thereby preventing generation of the excess power. Additionally, a rotor position is derived by the zero-cross detection circuit 74 from the zero-cross points of the no-load voltage generated in both ends of the windings of the winding portion ACG2, thereby generating a timing necessary for the first power conversion unit 61 to perform phase control of the AC voltage of the winding portion ACG1. This makes it possible in the present embodiment to supply the optimum electric power to the battery 9 and an electrical load (not shown).

As described above, according to the first embodiment, it is possible to inexpensively perform positioning of the rotor in a simple manner without using an expensive sensor and without using a sub-coil.

Additionally, in the first embodiment, provided are: the starter generator 1 (ACG starter motor) including the armature unit in which the winding portion ACG1 and the winding portion ACG2 which constitute the three-phase winding (multi-phase winding) are arranged in parallel and the field portion including the permanent magnets; the first power conversion unit 61 connected to the winding portion ACG1 or the winding portions ACG1 and ACG2, and configured to perform power conversion between AC and DC; the plurality of MOSFETs (switching elements) (Q7) to (Q9) interposed between the respective AC terminals 611, 612, and 613 of the first power conversion unit 61 which are connected to the respective ends of the winding ACG1, and the respective ends of the winding portion ACG2, and configured to connect or disconnect the respective ends of the winding portion ACG2 to or from the respective AC terminals 611, 612, and 613. According to this configuration, it is possible to easily improve the control characteristics of the starter generator 1, such as a reduction in power loss.

Further, as described above, according to the first embodiment, the winding portion is divided into two, and the case of using both ones and the case of using either one are switched selectively, thereby making it possible to optimize the balance between the power generation and the electrical load. According to this configuration, it is possible to reduce the surplus power to be generated by the unbalance with the electrical load when the motor with the specifications designed to meet the torque characteristics of the starter motor is used as a power generator. In other words, it is possible to reduce the reflux current of the winding portion and heat generation (power loss) of the winding and the power device elements. Therefore, the excess power at the time of the power generation can be easily reduced without impairing the motor torque. This enables an improvement in fuel efficiency and a reduction in friction of the engine 2.

Moreover, the reflux current is reduced at the time of the power generation control, thereby making it possible to reduce heat generation of the armature winding and the power devices.

As described above, according to the first embodiment of the present invention, in both cases where the starter generator 1 in which the winding portions ACG1 and ACG2 are arranged in parallel is used as a starter of the engine 2 and where the starter generator 1 is used as a power generator, the winding unit ACG2 is used as the detection winding for detecting the position of the rotor, thereby making it possible to detect the position of the rotor with high accuracy without providing a hall sensor. Therefore, it is not necessary to dispose an expensive hall sensor in correspondence with the high mounting accuracy, thereby making it possible to provide a starter generator that can perform rotor detection with high accuracy and at low cost.

Additionally, according to the first embodiment of the present invention, when a predetermined line-to-line voltage is applied to the winding portion ACG1 (first multi-phase winding) only once, a value of the phase voltage generated in the winding portion ACG2 (second multi-phase winding) is detected, thereby making it possible to determine the stop position of the rotor. According to this, current detection can be made unnecessary. In other words, according to the first embodiment of the present invention, when the output voltage of the battery is applied to the first multi-phase winding for a predetermined time, the time widths of two or more predetermined voltages generated in two or more windings constituting the second multi-phase winding is detected, thereby making it possible to determine the stop position of the rotor. According to this, current detection can be made unnecessary. Further, according to the first embodiment of the present invention, since the stop position (stage) of the rotor can be determined by one-time energization, the judgment time and the power consumption can be reduced. Moreover, in the vicinity of the boundaries of the stages, since which of two adjacent stages the rotor position is can be determined by comparing the time widths, it is possible to easily improve the position detection accuracy in the vicinity of the boundaries of the stages.

<Second Embodiment>

Next, a second embodiment of the present invention will be described with reference to FIGS. 34 to 41. The second embodiment of the present invention has the same hardware configuration as that of the first embodiment, while a software configuration, that is, operation is partially different. Specifically, the contents of the stage determination process in step S12 shown in FIG. 5 and the energization pattern at the start of the rotation in step S14 are different.

Figure 34:
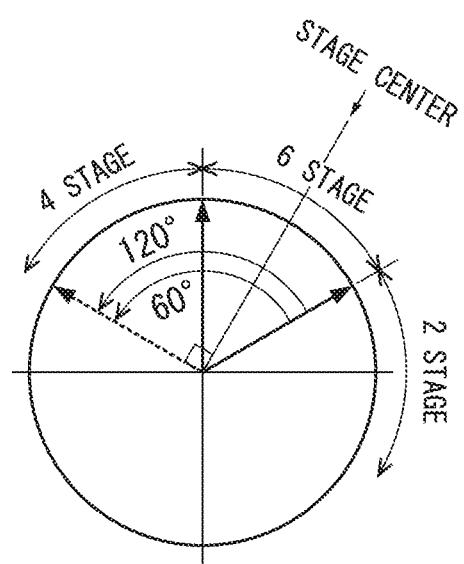
FIG. 34 is a schematic view for illustrating a second embodiment of the present invention.
Figure 35:
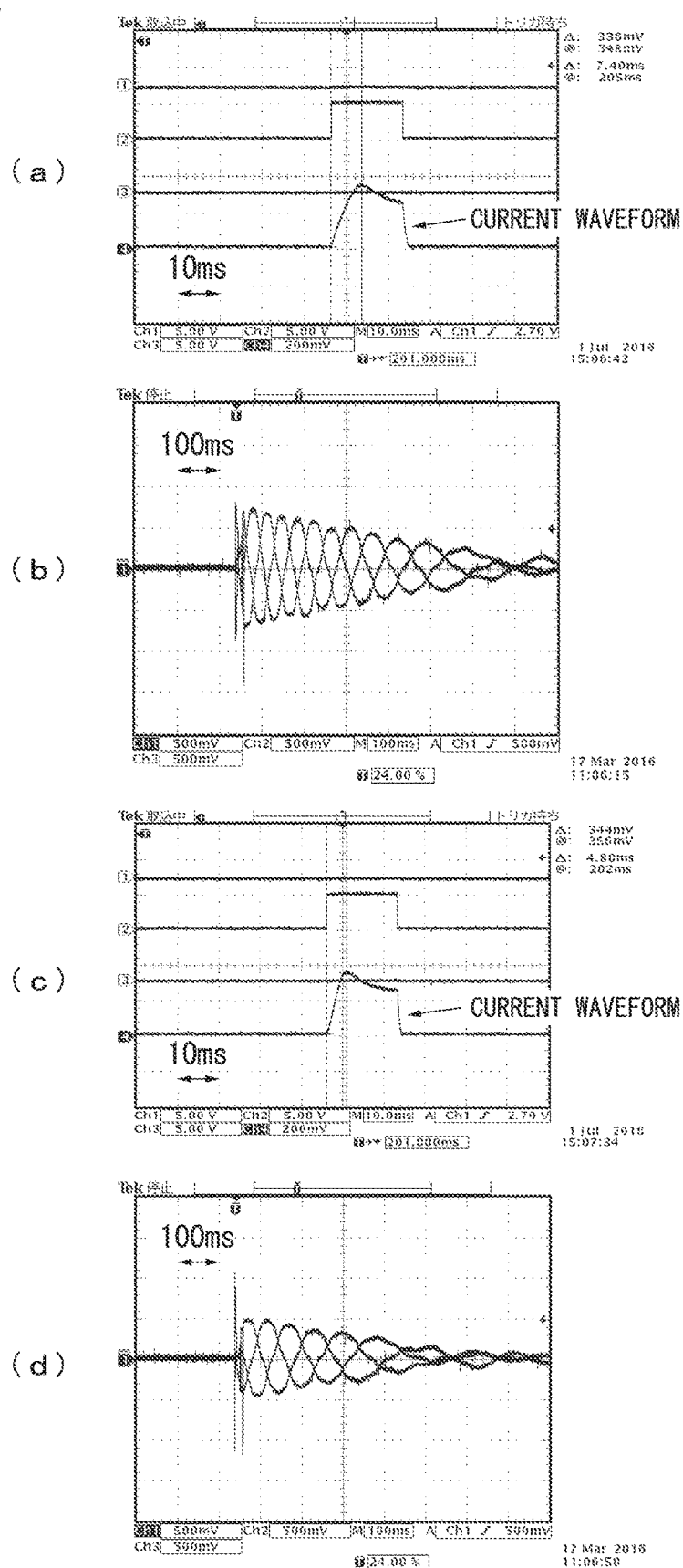
FIG. 35 is a waveform diagram for illustrating a second embodiment of the present invention.

First, with reference to FIG. 34 and FIG. 35, problems to be solved by the second embodiment and effects of the second embodiment will be described. When the piston position is at the compression top dead center at engine startup, a combustion chamber is in a compressed state, thereby requiring a large starting torque to overcome the compression force and to crank it. The torque of the motor becomes maximum when a magnetic flux vector of a rotor magnet and a current vector conducted to the armature winding are at a phase difference of 90°. However, since a resolution of a Hall sensor, which is a detection method of the magnetic flux vector in a three-phase brushless motor, is 60°, a phase difference in the stage between the magnetic flux and the current vector varies from 60° to 120° as shown in FIG. 34. For example, when the magnetic flux vector (solid line) is in the stage 6 and on the boundary with the stage 4, the phase difference from the current vector (broken line) is 60° so that the torque becomes small. Similarly, the phase difference is 120° on the boundary with the stage 2 so that the torque also becomes small. The phase difference becomes 90° on the center of the stage 6 so that the torque becomes maximum. Therefore, the torque becomes small at the rotor position close to the boundaries of the stage, so that engine cranking may not be performed normally at the engine compression top dead center.

FIG. 35(a) shows current waveforms when the rotor position is on the boundary between the stage 6 and the stage 2, and energization is performed at a current phase of 120°. FIG. 35(c) shows current waveforms when the position is on the boundary between the stage 6 and the stage 4, and energization is performed at a current phase of 60°. FIG. 35(b) shows a waveform of the voltage induced in the motor when energization shown in FIG. 35(a) is performed. FIG. 35(d) shows a waveform of the voltage induced in the motor when energization shown in FIG. 35(c) is performed.

As shown in FIG. 35(b), when the rotor position is in the stage 6 and close to the stage 2 (on the boundary between the stage 6 and the stage 2), if energization is performed according to the pattern of the stage 6, the magnetic flux vector and the current vector are in the relationship of 120°, so that the motor rotates 1+½ times with one-time energization for 18 ms. On the other hand, as shown in FIG. 35(d), when the rotor position is in the stage 6 and close to the stage 4 (on the boundary between the stage 6 and the stage 4), if energization is performed according to the pattern of the stage 6, the magnetic flux vector and the current vector are in the relationship of 60°, so that the motor rotates ¾ times with one-time energization for 18 ms.

FIG. 35(a) and FIG. 35(c) differ in rise time of the current waveform. The slope of the current waveform in the case of the energization at the 120° phase difference is not greater than that in the case of the energization at the 60° phase difference. This is due to a difference in inductance determined by the position of the magnet and the winding, and the inductance is larger at the current phase of 120°. Since the torque is proportional to the inductance, it is possible to obtain a larger torque in the energization at the current phase of 120° than in the energization at the current phase of 60°.

In the second embodiment, a method of determining the stage is set as follows so that energization can be performed at the current phase of 120° on the boundaries of the stages. According to the second embodiment, it is made possible to easily determine the boundaries of the stages, thereby making it possible to perform energization at the current phase of 120° (i.e., the phase difference of 120° between the magnetic flux vector and the current vector) on the boundaries, and to improve the cranking performance. This is due to the fact that the torque is larger when the phase difference between the magnetic flux vector and the current vector is 120° than when the phase difference is 60°.

Figure 36:
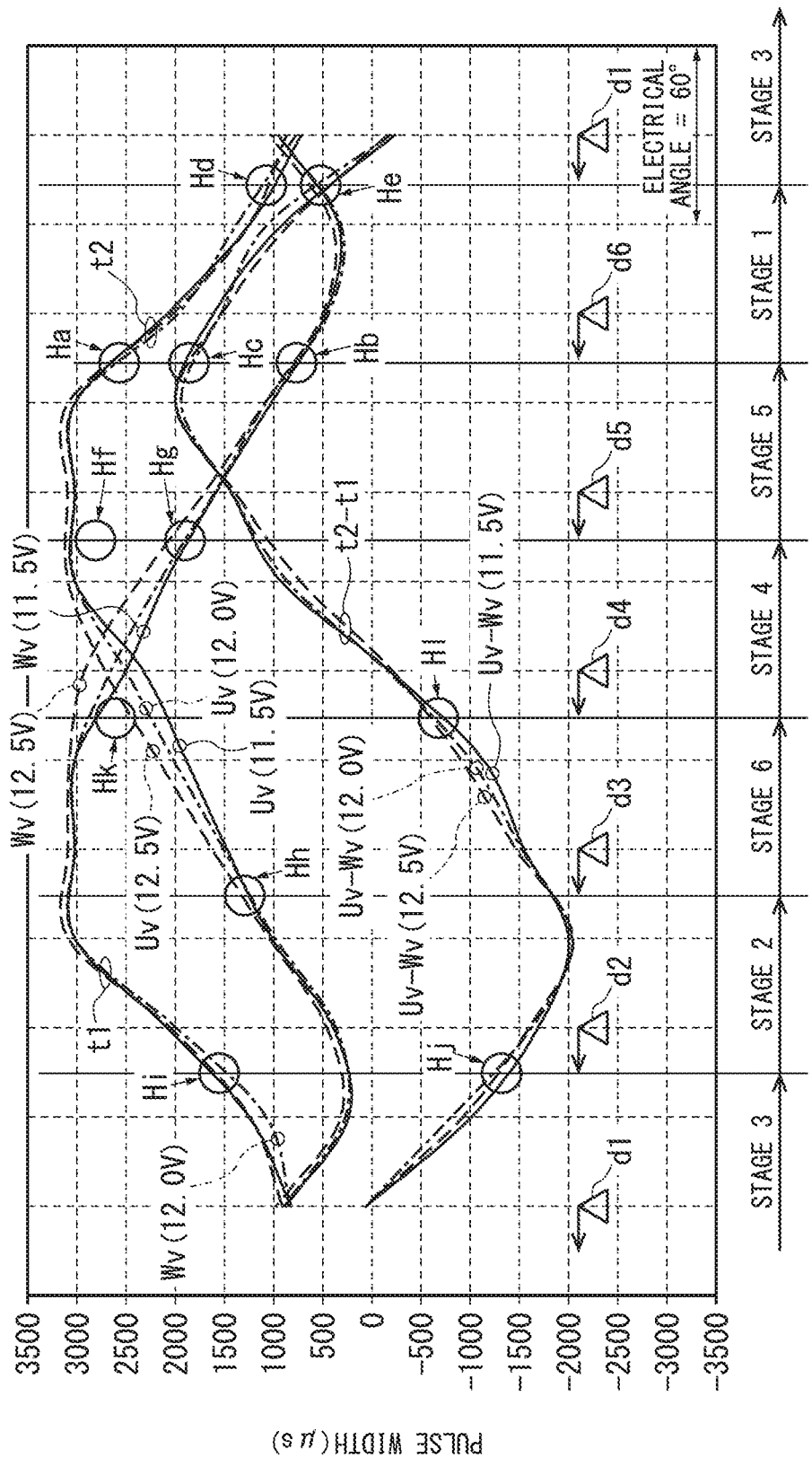
FIG. 36 is a characteristic diagram for illustrating a second embodiment of the present invention.
Figure 37:
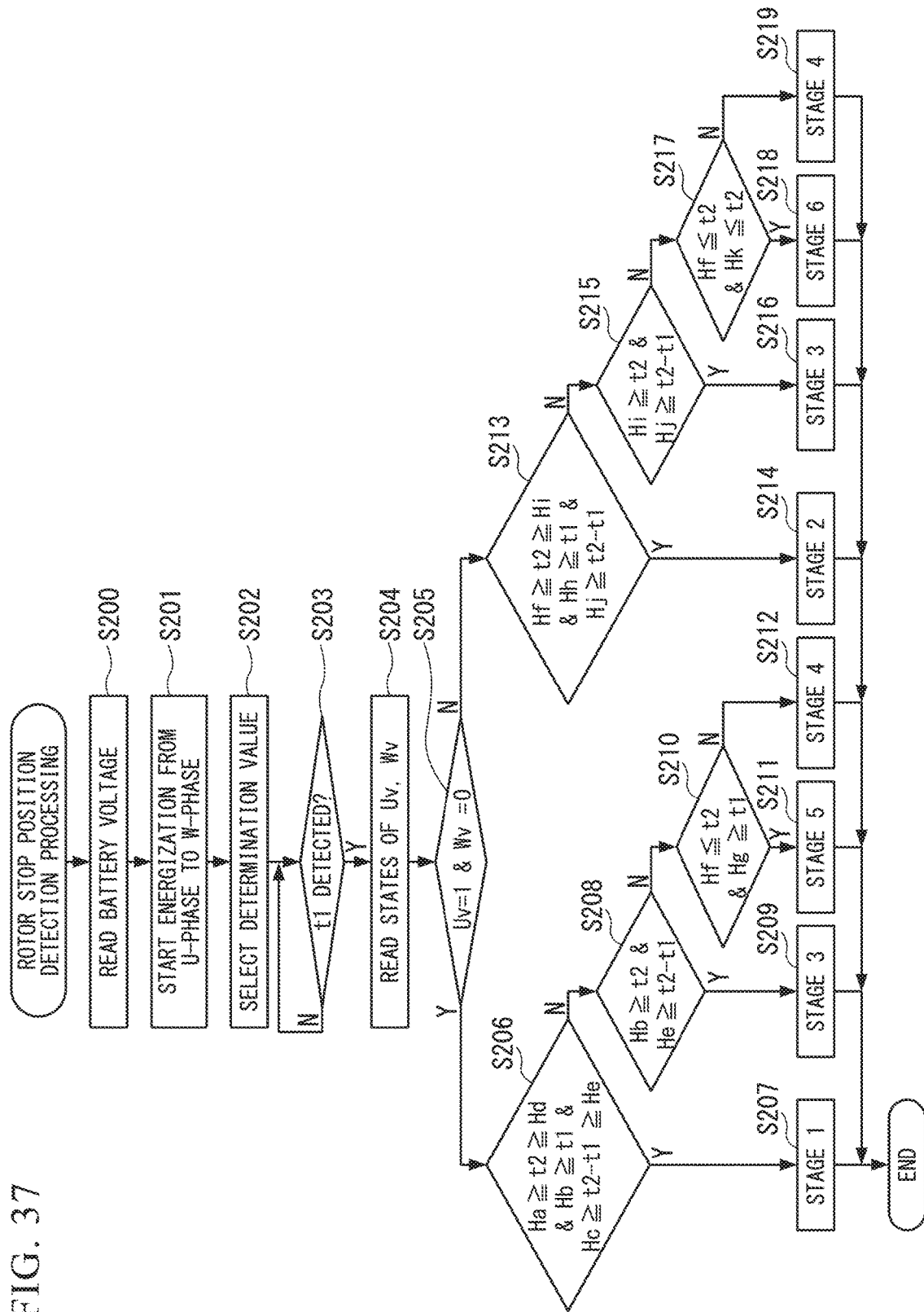
FIG. 37 is a flowchart for illustrating the second embodiment of the present invention.

Next, with reference to FIG. 36 and FIG. 37, a method of determining each stage will be described. Similar to FIG. 26, FIG. 36 is a characteristic diagram showing a result of measuring a pulse width t1 of the W2-N2 induced voltage Wv of the secondary winding and a pulse width t2 of the U2-N2 induced voltage Uv of the secondary winding when a battery voltage with a pulse width of 3 ms is applied between U1 and W1 of the primary winding while varying the rotor angle. A horizontal axis is the electrical angle, while a vertical axis is the pulse width. Wv(11.5V), Wv(12.0V), and Wv(12.5V) indicate a change of the pulse width t1 when the battery voltage is 11.5V, 12.0V and 12.5V. Uv(11.5V), Uv (12.0V), and Uv(12.5V) indicate a change of the pulse width t2 when the battery voltage is 11.5V, 12.0V and 12.5V. Additionally, FIG. 36 also shows a curve of a value obtained by subtracting the pulse width t1 of the W2-N2 induced voltage Wv from the pulse width t2 of the U2-N2 induced voltage Uv. Uv-Wv(11.5V), Uv-Wv (12.0V), and Uv-Wv(12.5V) indicate a change of t2–t1 when the battery voltage is 11.5V, 12.0V, and 12.5V.

Further, Ha to Hj represent reference values (threshold values) for determination (hereinafter referred to as determination values Ha to Hj). The determination value Ha is a criterion for determining the stage 5 and the stage 1 with respect to the pulse width t2. The determination value Hb is a criterion for determining the stage 5 and the stage 1 with respect to the pulse width t1. The determination value Hc is a criterion for determining the stage 5 and the stage 1 with respect to the pulse width t2—the pulse width t1. The determination value Hd is a criterion for determining the stage 1 and the stage 3 with respect to the pulse width t2. The determination value He is a criterion for determining the stage 1 and the stage 3 with respect to pulse width t2—pulse width t1. The determination value Hf is a criterion for determining the stage 4 and the stage 5 with respect to the pulse width t2. The determination value Hg is a criterion for determining the stage 4 and the stage 5 with respect to the pulse width t1. The determination value Hk is a criterion for determining the stage 6 and the stage 4 with respect to the pulse width t1. The determination value Hl is a criterion for determining the stage 6 and the stage 4 with respect to the pulse width t2—the pulse width t1. The determination value Hh is a criterion for determining the stage 2 and the stage 6 with respect to the pulse width t2. The determination value Hi is a criterion for determining the stage 3 and the stage 2 with respect to the pulse width t1. The determination value Hj is a criterion for determining the stage 3 and the stage 2 with respect to the pulse width t2—the pulse width t1.

Additionally, FIG. 36 shows, by marks Δ (apexes) d1 to d6, boundary positions of the stages detected using three Hall elements installed at the energization angle of 120° and the advance angle of 30°. The position d1 is the boundary between the stage 1 and the stage 3 at the energization angle of 120° and the advance angle of 30°. The position d2 is the boundary between the stage 3 and the stage 2 at the energization angle of 120° and the advance angle of 30°. The position d3 is the boundary between the stage 2 and the stage 6 at the energization angle of 120° and the advance angle of 30°. The position d4 is the boundary between the stage 6 and the stage 4 at the energization angle of 120° and the advance angle of 30°. The position d5 is the boundary between the stage 4 and the stage 5 at the energization angle of 120° and the advance angle of 30°. The position d6 is the boundary between the stage 5 and the stage 1 at the energization angle of 120° and the advance angle of 30°.

In the second embodiment, the boundary of each stage is set so that the phase difference between the magnetic flux and the current on the boundaries of the stages can be 120°. Therefore, a position advanced by 15° in electrical angle with respect to the positions d1 to d6 is set as the boundary of each stage. In other words, a position advanced by 15° in electrical angle from the position d1 is set as the boundary between the stage 1 and the stage 3. A position advanced by 15° in electrical angle from the position d2 is set as the boundary between the stage 3 and the stage 2. A position advanced by 15° in electrical angle from the position d3 is set as the boundary between the stage 2 and the stage 6. A position advanced by 15° in electrical angle from the position d4 is set as the boundary between the stage 6 and the stage 4. A position advanced by 15° in electrical angle from the position d5 is set as the boundary between the stage 4 and the stage 5. A position advanced by 15° in electrical angle from the position d6 is set as the boundary between the stage 5 and the stage 1.

Next, an operation example of the rotor position determination circuit 75 in the second embodiment will be described with reference to FIG. 37. In the process shown in FIG. 37, the rotor position determination circuit 75 first reads the battery voltage (step S200). Next, the rotor position determination circuit 75 turns off the MOSFETs (Q7) to (Q9) of the second power conversion unit 62, turns on the MOSFETs (Q1) and (Q6) of the first power conversion unit 61, and energizes the winding U1 and the winding W1 of the primary winding (from the U-phase to the W-phase) for 3 ms (step S201). Next, the rotor position determination circuit 75 selects values of the determination values (threshold values) Ha to Hj from the predetermined values in accordance with the battery voltage read in step S200 (step S202).

Figure 41:
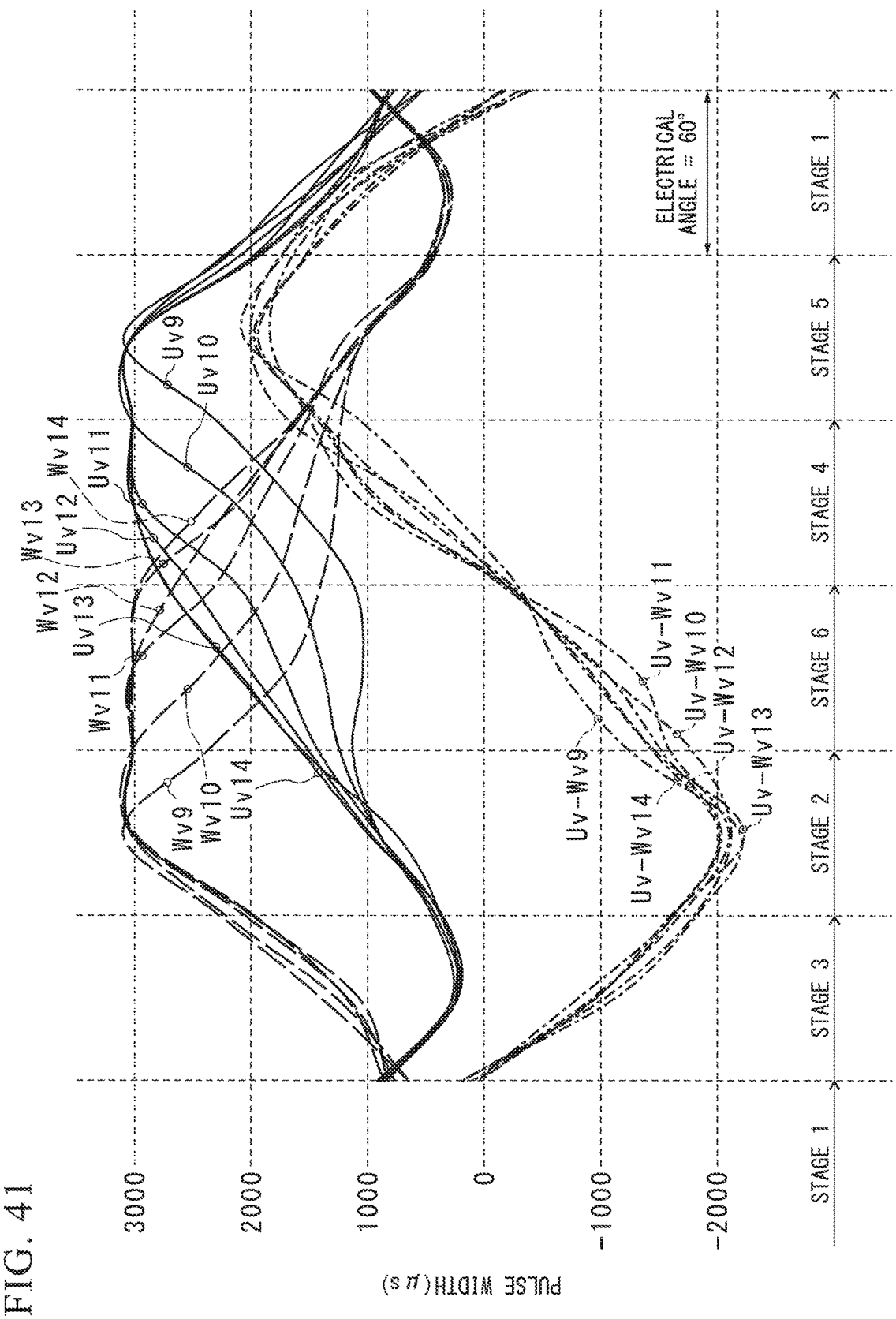
FIG. 41 is a characteristic diagram for illustrating the second embodiment of the present invention.

The pulse width t1 and the pulse width t2 have dependency on the battery voltage as shown in FIG. 41. Additionally, this voltage dependency varies depending on the rotor position. Similar to FIG. 36, FIG. 41 is a characteristic diagram showing a result of measuring a pulse width t1 of the W2-N2 induced voltage Wv of the secondary winding and a pulse width t2 of the U2-N2 induced voltage Uv of the secondary winding when a battery voltage with a pulse width of 2 ms is applied between U1 and W1 of the primary winding while varying the rotor angle. A horizontal axis is the electrical angle, while a vertical axis is the pulse width.

Wv14 to Wv9 indicate changes of the pulse width t1 when the battery voltage is 14V to 9V. Uv14 to Uv9 indicate changes of the pulse width t2 when the battery voltage is 14V to 9V. Additionally, Uv-Wv14 to Uv-Wv9 are curves of values obtained by subtracting the pulse width t1 of the W2-N2 induced voltage Wv from the pulse width t2 of the U2-N2 induced voltage Uv. As shown in FIG. 41, the voltage dependency is large in the vicinity of the boundary between the stage 4 and the stage 6, whereas the voltage dependency is relatively small at the boundary between the stage 1 and the stage 3, at the boundary between the stage 3 and the stage 2, and at the boundary between the stage 5 and the stage 1. Here, the value obtained by subtracting the pulse width t1 of the W2-N2 induced voltage Wv from the pulse width t2 of the U2-N2 induced voltage Uv has a relatively small voltage dependency. Therefore, in the second embodiment, a determination value is selected from a plurality of predetermined values in accordance with the battery voltage in order to deal with a voltage change that differs depending on the stage (rotor position), so that a rate of change of the determination value with respect to the voltage change varies depending on the stage (rotor position). Here, the value of the determination value can be calculated using interpolation calculation without preliminarily preparing values corresponding to all the voltages. Additionally, in the second embodiment, in addition to the pulse width t1 and the pulse width t2, the pulse width t2—the pulse width t1, which has relatively small voltage dependency over the entire stages, is set to be a target of the comparison, thereby enhancing the accuracy of determining a stage.

Next, the rotor position determination circuit 75 waits until the pulse width t1 of the W2-N2 induced voltage Wv is detected (step S203: repetition of NO). Then, when the pulse width t1 is detected (step S203: YES), the rotor position determination circuit 75 reads a state of the U2-N2 induced voltage Uv and a state of the W2-N2 induced voltage Wv (H-level or L-level) (step S204). Then, the rotor position determination circuit 75 determines whether or not the U2-N2 induced voltage Uv is "1" (H-level), and the W2-N2 induced voltage Wv is "0" (L-level) (step S205). Hereinafter, in the present embodiment, a description of the name for each value is omitted as appropriate.

If Uv=1 and Wv=0 (step S205: Y), the rotor position determination circuit 75 performs stage determination in the order of the stage 1, the stage 3, the stage 5, and the stage 4. First, the rotor position determination circuit 75 determines whether or not Ha≥t2≥Hd and Hb≥t1 and Hc≥t2−t1≥He is met (step S206). If Ha≥t2≥Hd and Hb≥t1 and Hc≥t2−t1≥He is met (step S206: Y), the rotor position determination circuit 75 determines that the rotor position is the stage 1 (step S207). If Ha≥t2≥Hd and Hb≥t1 and Hc≥t2−t1≥He is not met (step S206: N), the rotor position determination circuit 75 determines whether or not Hd≥t2 and He≥t2−t1 is met (step S208). If Hd≥t2 and He≥t2−t1 is met (step S208: Y), the rotor position determination circuit 75 determines that the rotor position is the stage 3 (step S209). If Hd≥t2 and He≥t2−t1 is not met (step S208: N), the rotor position determination circuit 75 determines whether or not Hf≥t2 and Hg≥t1 is met (step S210). If Hf≤t2 and Hg≥t1 is met (step S210: Y), the rotor position determination circuit 75 determines that the rotor position is the stage 5 (step S211). If Hf≤t2 and Hg≥t1 is not met (step S210: N), the rotor position determination circuit 75 determines that the rotor position is the stage 4 (step S212).

On the other hand, if Uv=1 and Wv=0 is not met (step S205: N), the rotor position determination circuit 75 performs stage determination in the order of the stage 2, the stage 3, the stage 6, and the stage 4. First, the rotor position determination circuit 75 determines whether or not Hf≥t2≥Hi and Hh≥t1 and Hj≤t2−t1 is met (step S213). If Hf≥t2≥Hi and Hh≥t1 and Hj≤t2−t1 is met (step S213: Y), the rotor position determination circuit 75 determines that the rotor position is the stage 2 (step S214). If Hf≥t2≥Hi and Hh≥t1 and Hj≤t2−t1 is not met (step S213: N), the rotor position determination circuit 75 determines whether or not Hi≥t2 and Hj≥t2−t1 is met (step S215). If Hi≥t2 and Hj≥t2−t1 is met (step S215: Y), the rotor position determination circuit 75 determines that the rotor position is the stage 3 (step S215). If Hi≥t2 and Hj≥t2−t1 is not met (step S215: N), the rotor position determination circuit 75 determines whether or not Hf≤t2 and Hk≥t1 is met (step S217). If Hf≤t2 and Hk≥t1 is met (step S217: Y), the rotor position determination circuit 75 determines that the rotor position is the stage 6 (step S218). If Hf≤t2 and Hk≥t1 is not met (step S217: N), the rotor position determination circuit 75 determines that the rotor position is the stage 4 (step S219).

As described above, the rotor position determination circuit 75 performs the stage determination process in step S12 of FIG. 5.

Figure 38:
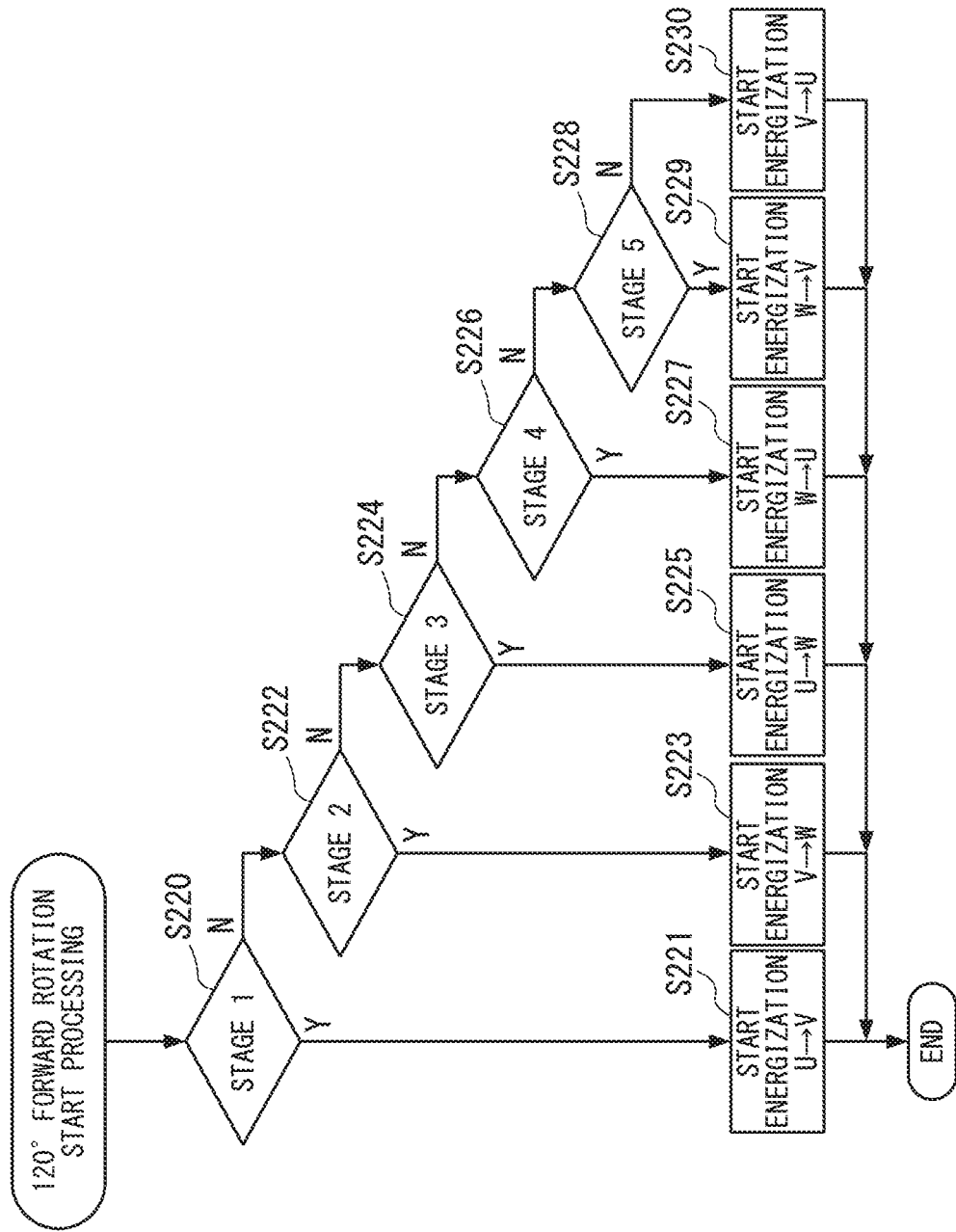
FIG. 38 is a flowchart for illustrating the second embodiment of the present invention.
Figure 39:
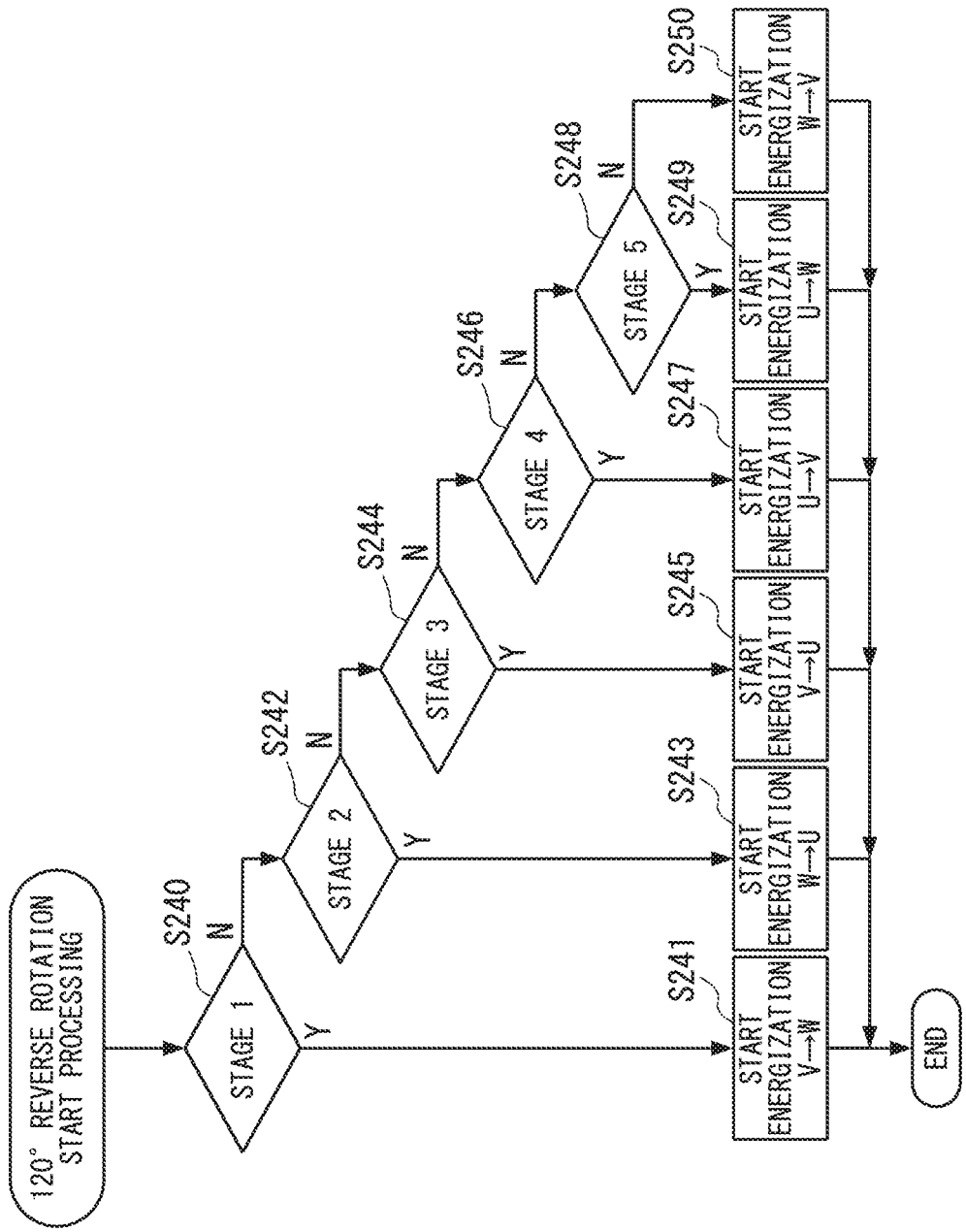
FIG. 39 is a flowchart for illustrating the second embodiment of the present invention.
Figure 40:
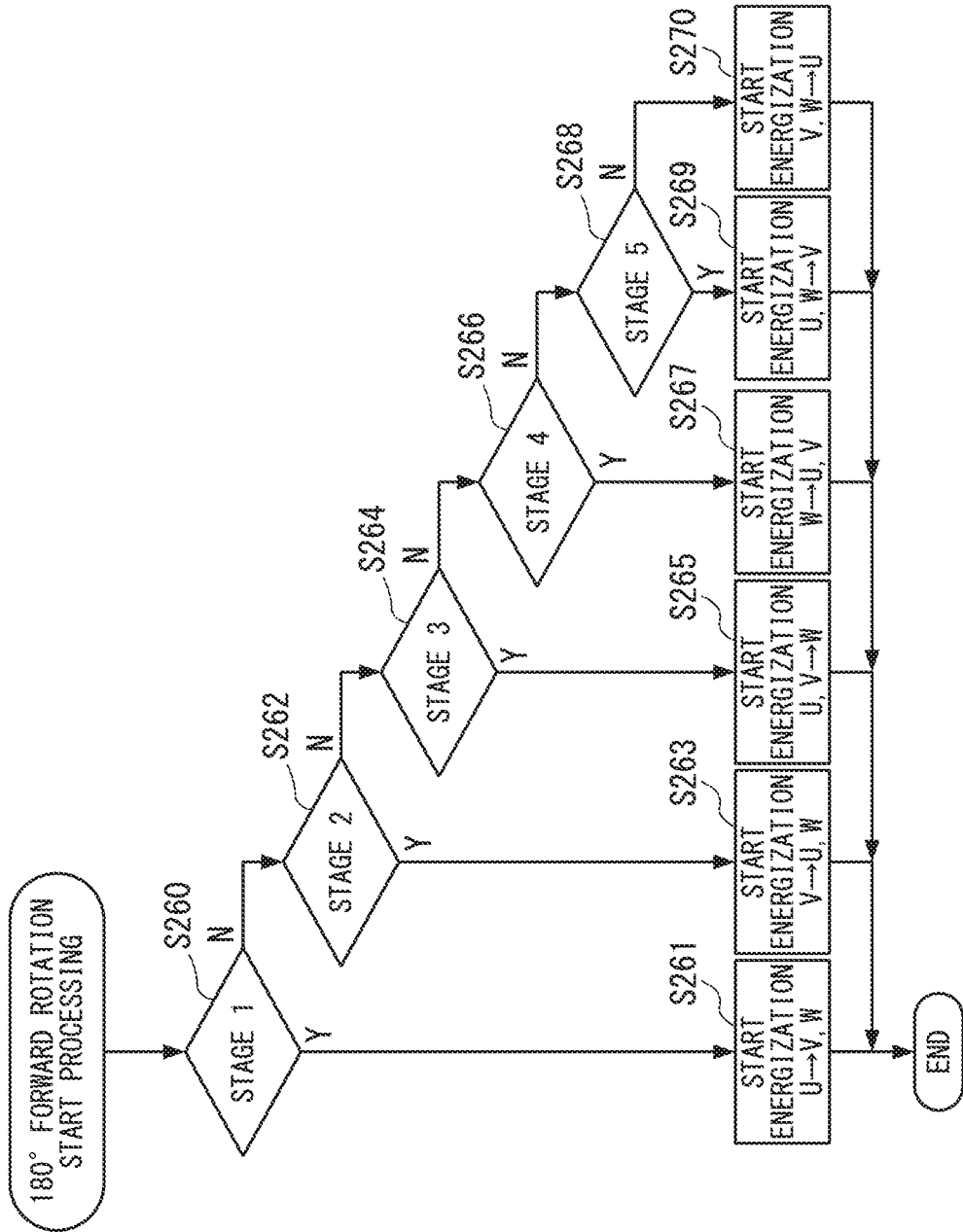
FIG. 40 is a flowchart for illustrating the second embodiment of the present invention.

Next, with reference to FIG. 38 to FIG. 40, the process at the start of the energization in step S14 shown in FIG. 5 in the second embodiment will be described. FIG. 38 shows a flow of energization start processing at the time of forward rotation with 120° energization. FIG. 39 shows a flow of energization start processing at the time of reverse rotation with 120° energization. FIG. 40 shows a flow of energization start processing at the time of the forward rotation with 180° energization.

In the energization start processing at the time of the forward rotation with the 120° energization shown in FIG. 38, if the rotor position determination circuit 75 determines that the rotor position is stage 1 (step S220: Y), the CPU 72 starts energization in a flow from the U-phase to the V-phase (step S221). Here, for example, U⇒V represents a connection state in which the U-phase is connected to the positive electrode side of the battery 9, while the V-phase is grounded. Additionally, if the rotor position determination circuit 75 determines that the rotor position is the stage 2 (step S222: Y), the CPU 72 starts energization in a flow from the V-phase to the W-phase (step S223). Further, if the rotor position determination circuit 75 determines that the rotor position is the stage 3 (step S224: Y), the CPU 72 starts energization in a flow from the U-phase to the W-phase (step S225). Moreover, if the rotor position determination circuit 75 determines that the rotor position is the stage 4 (step S226: Y), the CPU 72 starts energization in a flow from the W-phase to the U-phase (step S227). Additionally, if the rotor position determination circuit 75 determines that the rotor position is the stage 5 (step S228: Y), the CPU 72 starts energization in a flow from the W-phase to the V-phase (step S229). Further, if the rotor position determination circuit 75 determines that the rotor position is not the stage 1 to the stage 5 (steps S220, S222, S224, S226, and S228: N), the CPU 72 starts energization in a flow from the V-phase to the U-phase in correspondence with the state 6 (step S230).

In the energization start processing with the 120° energization shown in FIG. 39, if the rotor position determination circuit 75 determines that the rotor position is stage 1 (step S240: Y), the CPU 72 starts energization in a flow from the V-phase to the W-phase (step S241). Additionally, if the rotor position determination circuit 75 determines that the rotor position is the stage 2 (step S242: Y), the CPU 72 starts energization in the flow from the W-phase to the U-phase (step S243). Further, if the rotor position determination circuit 75 determines that the rotor position is the stage 3 (step S244: Y), the CPU 72 starts energization in a flow from the V-phase to the U-phase (step S245). Moreover, if the rotor position determination circuit 75 determines that the rotor position is the stage 4 (step S246: Y), the CPU 72 starts energization in the flow from the U-phase to the V-phase (step S247). Additionally, if the rotor position determination circuit 75 determines that the rotor position is the stage 5 (step S248: Y), the CPU 72 starts energization in the flow from the U-phase to the W-phase (step S249). Further, if the rotor position determination circuit 75 determines that the rotor position is not the stage 1 to the stage 5 (steps S240, S242, S244, S246, and S248: N), the CPU 72 starts energization in the flow from the W-phase to the V-phase (step S250).

In the energization start processing at the time of the forward rotation with the 180° energization shown in FIG. 40, if the rotor position determination circuit 75 determines that the rotor position is stage 1 (step S260: Y), the CPU 72 starts energization from the U-phase to the V-phase and the W-phase (step S261). Here, for example, "U⇒V, W" represents a connection state in which the U-phase is connected to the positive electrode side of the battery 9, while the V-phase and the W-phase are grounded. Additionally, if the rotor position determination circuit 75 determines that the rotor position is the stage 2 (step S262: Y), the CPU 72 starts energization in a flow from the V-phase to the U-phase and the W-phase (step S263). Further, if the rotor position determination circuit 75 determines that the rotor position is the stage 3 (step S264: Y), the CPU 72 starts energization in a flow from the U-phase and the V-phase to the W-phase (step S265). Moreover, if the rotor position determination circuit 75 determines that the rotor position is the stage 4 (step S266: Y), the CPU 72 starts energization in a flow from the W-phase to the U-phase and the V-phase (step S267). Additionally, if the rotor position determination circuit 75 determines that the rotor position is the stage 5 (step S268: Y), the CPU 72 starts energization in a flow from the U-phase and the W-phase to the V-phase (step S269). Further, if the rotor position determination circuit 75 determines that the rotor position is not the stage 1 to the stage 5 (steps S260, S262, S264, S266, and S268: N), the CPU 72 starts energization in a flow from the V-phase and the W-phase to the U-phase in accordance with the state 6 (step S270).

According to the second embodiment, as shown in FIG. 36, it is possible to set and detect the stage 1 to the stage 6 for determining the energization patterns while including the positions d1 to d6 in the stages, instead of setting the positions d1 to d6 at the energization angle of 120° and the advanced angle of 30° to be the boundary positions. Additionally, according to the second embodiment, the rotor position determination circuit 75 is configured to detect the rotor position for each stage (predetermined region) and can set each stage so that the phase difference between the magnetic flux vector formed by the field portion on the boundary of each stage and the current vector flowing through the multi-phase winding can be 120°. Therefore, in the second embodiment, energization can be performed at the current phase of 120° on the boundary positions d1 to d6 of the conventional stages, thereby making it possible to increase the torque at the start of rotation.

Here, in the second embodiment, the order of determining the stages is as follows. In other words, the stage determination by the pulse time method depends on the voltage (battery voltage) from the principle equation. Particularly when the energization is performed from the U-phase to the W-phase, the stages 4, 5-6, 1-2-3 are affected in this order. Therefore, the stable stages 1 and 2 are determined first, and then the stage 3 is determined. Since the determination of the stage 5 is not the stage 1 adjacent thereto, the determination on only one side is sufficient. The stage 4 that is the hardest to determine remains, but the remaining stage is automatically the stage 4, so that no determination is necessary.

<Third Embodiment>

Figure 42:
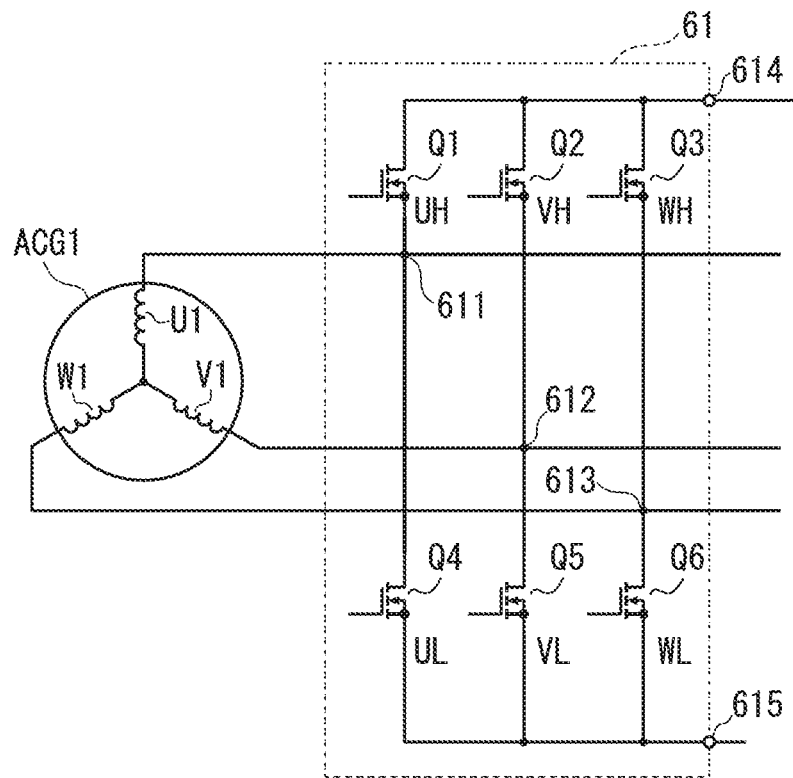
FIG. 42 is a diagram showing part of the circuit shown in FIG. 4.

Next, a third embodiment of the present invention will be described with reference to FIGS. 42 to 51. The third embodiment of the present invention has the same hardware configuration as that of the first embodiment, while a software configuration, that is, operation partially differs. Specifically, the contents of the stage determination process in step S12 shown in FIG. 5 and the energization pattern at the start of rotation in step S14 are different. First, with reference to FIGS. 42 to 46, the difference in energization pattern at the start of rotation will be described. Although there are various types of energization patterns at the start of rotation, such as energization at 180 degrees and energization at 120 degrees, here, a description will be given taking the energization at 120 degrees as an example. FIG. 42 shows the winding portion ACG1 and the first power conversion portion 61 shown in FIG. 4, which is a figure where symbols UH, VH, WH, UL, VL, and WL representing the energization patterns at the start of rotation have been newly added. For example, an energization pattern where the high side is UH while the low side is WL means that the MOSFET (Q1) and the MOSFET (Q6) turn on, while the MOSFETs (Q2) to (Q5) turn off.

Figure 43:
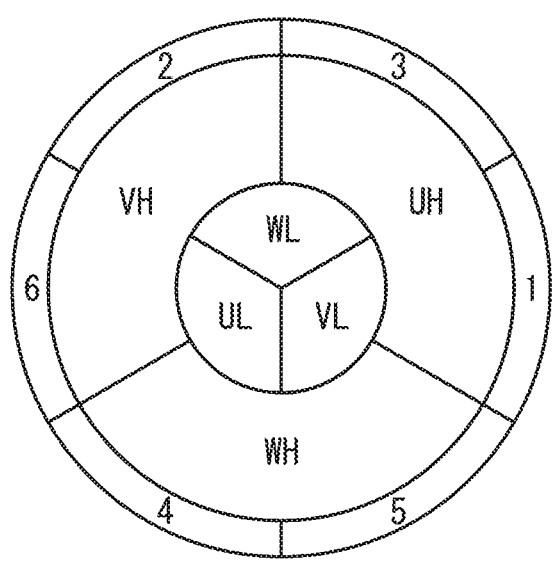
FIG. 43 is a view showing an example of an energization pattern at the start of rotation of the starter generator 1 shown in FIG. 1

FIG. 43 is a diagram schematically showing a correspondence relationship among each stage described with reference to FIG. 7, and a high-side MOSFET and a low-side MOSFET which are energized at the time of 120-degree energization. For example, in the stage 3, the high side is UH, while the low side is WL. Similarly, in the stage 1, the high side is UH, while the low side is VL. Similarly, in the stage 5, the high side is WH, while the low side is VL.

Figures 44, 45, 46:
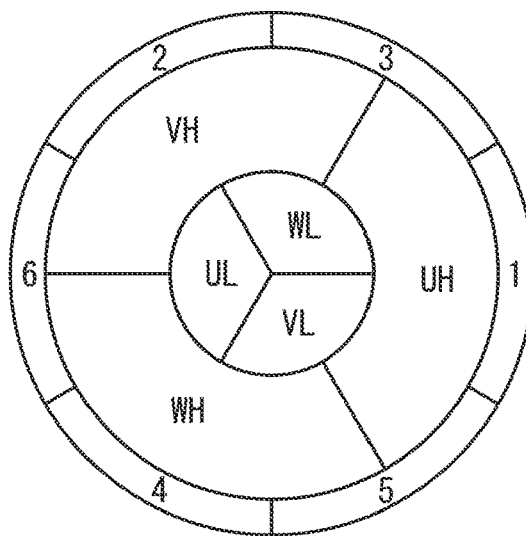
FIG. 44 is a figure showing a correspondence relationship between the energization pattern shown in FIG. 43 and a rotor angle.
FIG. 45 is a view showing another energization pattern at the start of the rotation of the starter generator 1 shown in FIG. 1.
FIG. 46 is a figure showing a correspondence relationship between the energization pattern shown in FIG. 45 and a rotor angle.

FIG. 44 is a diagram showing a relationship between the relationship shown in FIG. 43 and the rotor angle. In the energization patterns shown in FIGS. 43 and 44, the high-side switching position and the low-side switching position coincide with the switching positions of any of the stages. For example, the position where the high side switches from UH to VH is the boundary between the stage 3 and the stage 2. Additionally, for example, the position where the low side switches from WL to UL is the boundary between the stage 2 and the stage 6.

Incidentally, in the first embodiment, the rotor position determination circuit 75 determines the rotor position on the stage basis. In other words, the rotor position determination circuit 75 determines in which stage among the stage 1 to the stage 6 the rotor position is present. Additionally, even for brushless motors using Hall sensors, the determination is generally made on the stage basis. Therefore, in the first embodiment and in the case of using the Hall sensor, a position in the stage cannot be identified. For example, when the rotor is in the stage 1, it is impossible to determine whether the rotor is close to the stage 3 or stage 5, or in the center of stage 1. Therefore, if the stage is determined to be the stage 1, the energization pattern becomes UH⇒VL no matter where the rotor is present. The torque generated in this case is influenced by the position of the rotor. For example, if the rotation is in a CW direction (clockwise), and the rotor position is close to the stage 5, the torque becomes large, but if the rotor position is close to the stage 3, the torque becomes small. If the rotor position is close to the stage 3, the torque becomes larger when energization UH⇒WL is performed. Thus, there is a possibility that the torque will become small in the case of the first embodiment or the rotor position information indicated by the Hall sensor, so that when the battery is exhausted, it may take time to start the motor, or the motor cannot be started.

Therefore, in the third embodiment, it is made possible to determine which of the stages the rotor is close to. Additionally, the energization pattern is set to the energization pattern shown in FIG. 45 which is obtained by rotating the one shown in FIG. 43 by 30° in the CW direction, thereby enabling the maximum torque to be always generated. For example, when the rotor position is in the stage 1 and close to the stage 3, energization VH⇒WL is performed, while when the rotor position is close to the stage 5, the energization is switched to energization UH⇒VL, so that the maximum torque can be generated. According to this configuration, even when the battery is exhausted, it is possible to reliably start the motor.

Similarly to FIG. 43, FIG. 45 is a diagram schematically showing a correspondence relationship between each stage described with reference to FIG. 7, and the high-side MOSFETs and low-side MOSFETs to be energized at the time of the 120-degree energization. For example, in the stage 3, when the rotor position is close to the stage 1, the high side is UH, and when the rotor position is close to the stage 2, the high side is VH, and the low side is WL. Similarly, in the stage 1, the high side is UH, and when the rotor position is close to the stage 3, the low side is WL, and when the rotor position is close to the stage 5, the low side is VL. Similarly, in the stage 5, when the rotor position is close to the stage 1, the high side is UH, and when the rotor position is close to the stage 4, the high side is WH, and the low side is VL.

FIG. 46 is a diagram showing a relationship between the relationship shown in FIG. 45 and the rotor angle. In the energization patterns shown in FIGS. 45 and 46, the high-side switching position and the low-side switching position do not coincide with the stage switching positions.

Figure 47:
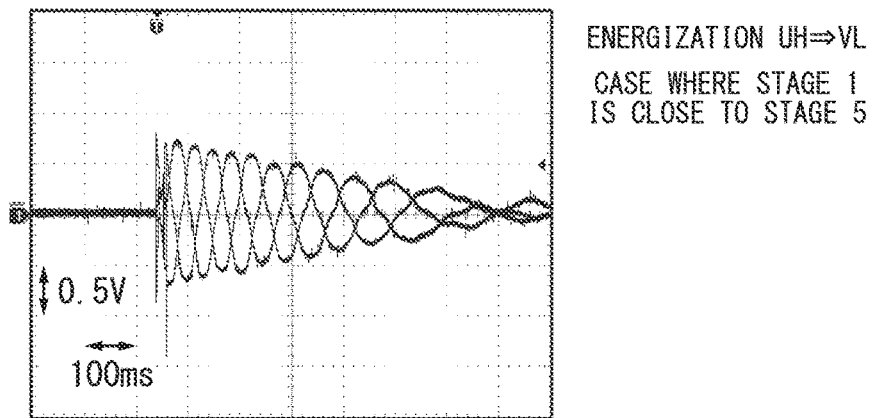
FIG. 47 is a waveform diagram used in comparing the energization pattern shown in FIG. 43 and the energization pattern shown in FIG. 45.
Figure 48:
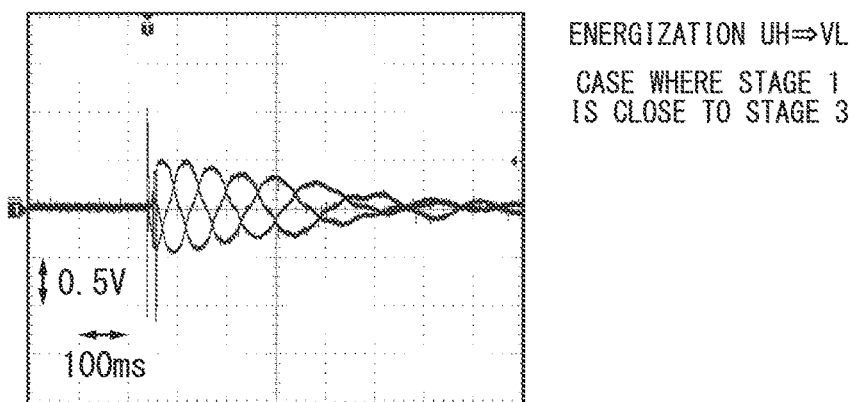
FIG. 48 is a waveform diagram used in comparing the energization pattern shown in FIG. 43 and the energization pattern shown in FIG. 45.
Figure 49:
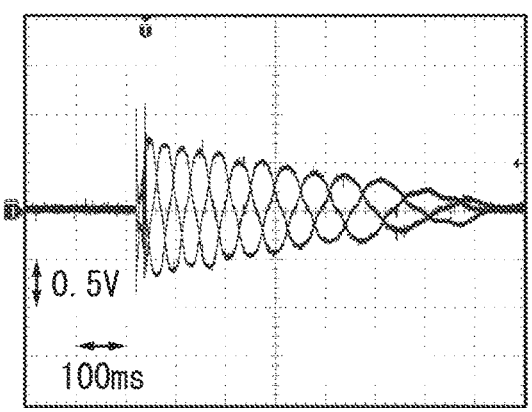
FIG. 49 is a waveform diagram used in comparing the energization pattern shown in FIG. 43 and the energization pattern shown in FIG. 45.

Here, with reference to FIGS. 47 to 49, the difference in generated torque between the energization pattern of the third embodiment shown in FIGS. 45 and 46 and the energization pattern shown in FIGS. 43 and 44 will be described. FIGS. 47 and 48 show the case of the energization patterns shown in FIGS. 43 and 44, while FIG. 49 shows the case of the energization patterns of the third embodiment shown in FIGS. 45 and 46. FIG. 47 is a waveform diagram showing a result of observing the phase voltages of the secondary windings U2, V2, and W2 when the rotor position is in the stage 1 and close to the stage 5, and energization UH⇒VL is performed for 20 ms. FIG. 47 indicates that the phase voltages of the secondary windings U2, V2, and W2 are large, and the speed becomes relatively large with the energization of 20 ms. FIG. 48 is a waveform diagram showing a result of observing the phase voltages of the secondary windings U2, V2, and W2 when the rotor position is in the stage 1 and close to the stage 3, and energization UH⇒VL is performed for 20 ms. Compared to FIG. 47, the waveform of FIG. 48 has a small amplitude. In other words, it indicates that the driving torque applied to the rotor was smaller in the case of FIG. 48 than in the case of FIG. 47. On the other hand, FIG. 49 is waveform diagram showing a result of observing the phase voltages of the secondary windings U2, V2, and W2 when the rotor position is in the stage 1 and close to the stage 5 or the stage 3, and energization UH⇒VL or UH⇒WL is performed for 20 ms. It has been confirmed that in this energization pattern, the same waveform is obtained in both cases where the rotor position is close to the stage 5 and where the rotor position is close to the stage 3. From the waveform of FIG. 49, it was confirmed that the same driving torque as in the case of FIG. 47 was generated in the case of FIG. 49.

Figure 50:
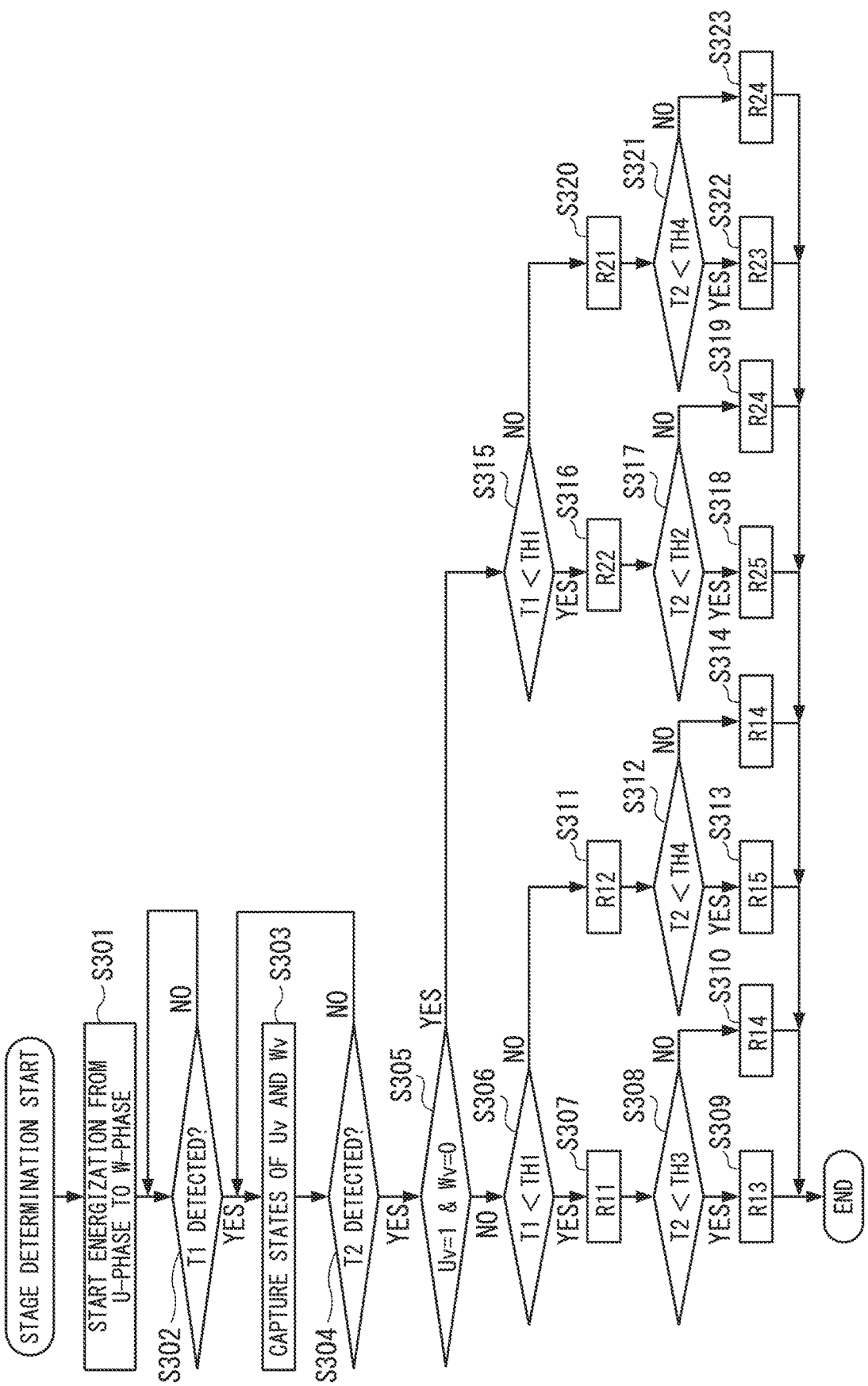
FIG. 50 is a flowchart for illustrating the stage determination process (S12) shown in FIG. 5 according to a third embodiment of the present invention.

FIG. 50 is a flowchart showing an operation example of the rotor position determination circuit 75 in the third embodiment. In other words, FIG. 50 is a flowchart showing the contents of stage determination processing (the process in step S12 of FIG. 5) in the third embodiment. FIG. 51 is a graph obtained by adding to the characteristic diagram shown in FIG. 26, ranges of the rotor angle corresponding to the respective symbols UH, VH, WH, UL, VL, and WL representing the energization patterns and ranges R1 to R25 sectionalizing the rotor angle. Additionally, FIG. 51 shows threshold values TH1, TH2, TH3, and TH4 used in the processing shown in FIG. 50.

As shown in FIG. 51, the region R1 corresponds to a range in which the pulse width of the W2-N2 induced voltage Wv is larger than the pulse width of the U2-N2 induced voltage Uv. In the region R1, the pulse width of the W2-N2 induced voltage Wv corresponds to the fall time T2, while the pulse width of the U2-N2 induced voltage Uv corresponds to the rise time T1. The region R2 corresponds to a range in which the pulse width of the W2-N2 induced voltage Wv is smaller than the pulse width of the U2-N2 induced voltage Uv. In the region R2, the pulse width of the W2-N2 induced voltage Wv corresponds to the rise time T1, while the pulse width of the U2-N2 induced voltage Uv corresponds to the fall time T2.

The region R1 is sectionalized into two regions R11 and R12. The region R11 corresponds to a range in which the rise time T1 is shorter than the threshold value TH1 in the region R1. The region R12 corresponds to a region in which the rise time T1 is equal to or longer than the threshold TH1 in the region R1.

Additionally, the region R1 is sectionalized into three regions R13, R14, and R15. The region R13 corresponds to a range in which the fall time T2 is shorter than the threshold TH3 in the region R11. The region R15 corresponds to a range in which the fall time T2 is shorter than the threshold value TH4 in the region R12. The region R14 corresponds to a region other than the region R13 or the region R15 in the region R1.

The region R2 is sectionalized into two regions R21 and R22. The region R21 corresponds to a range in which the rise time T1 is equal to or longer than the threshold value TH1 in the region R2. The region R22 corresponds to a range in which the rise time T1 is shorter than the threshold value TH1 in the region R2.

Additionally, the region R2 is sectionalized into three regions R23, R24, and R25. The region R25 corresponds to a range in which the fall time T2 is shorter than the threshold value TH2 in the region R22. The region R23 corresponds to a region in which the fall time T2 is shorter than the threshold value TH4 in the region R21. The region R24 corresponds to a region other than the region R23 or the region R25 in the region R2.

A correspondence relationship between each region and each of the energization patterns UH, VH, WH, UL, VL, and WL is as follows. In other words, the energization pattern UH corresponds to a range of a combination of the region R22 and the region R13. The energization pattern VH corresponds to the range of the region R14. The energization pattern WH corresponds to a range of a combination of the region R21 and the region R15. The energization pattern UL corresponds to a range of a combination of the region R12 and the region R23. The energization pattern VL corresponds to the range of the region R24. The energization pattern WL corresponds to a range of a combination of the region R11 and the region R25. Thus, by combining the regions R11 to R15 or R21 to R25, it is possible to represent the ranges corresponding respectively to the energization patterns UH, VH, WH, UL, VL, and WL. Therefore, by determining in step S12 of FIG. 5 in which region of the regions R11 to R15 or R21 to R25 the stop position of the rotor is present, it is possible to, in step 14 of FIG. 5, rotate and start the starter generator 1 by the energization pattern shown in FIG. 45.

Next, an operation example of the rotor position determination circuit 75 in the third embodiment will be described with reference to FIG. 50. In the processing shown in FIG. 50, the rotor position determination circuit 75 turns off the MOSFETs (Q7) to (Q9) of the second power conversion unit 62, turns on the MOSFETs (Q1) and (Q6) of the first power conversion unit 61, and energizes the winding U1 and the winding W1 of the primary winding for 2 ms (step S301). Then, the rotor position determination circuit 75 waits until the rise time T1 is detected (step S302: repetition of NO). If the rise time T1 is detected (step S302: YES), the rotor position determination circuit 75 repeatedly captures the states of the W2-N2 induced voltage Wv and the U2-N2 induced voltage Uv until the fall time T2 is detected (repetition of step S303→step S304: NO→step S303). When the fall time T 2 is detected (step S304: YES), the rotor position determination circuit 75 determines whether or not the U2-N2 induced voltage Uv is "1" (H-level), and the W2-N2 induced voltage Wv is "0" (L-Level) (step S305). Hereinafter, a description of the name for each value is omitted as appropriate. Here, if Uv=1 and Wv=0 is met, the rotor position is in the region R2. If Uv=1 and Wv=0 is not met, the rotor position is in the region R1.

If Uv=1 and Wv=0 is not met (step S305: NO), the rotor position determination circuit 75 determines whether or not T1<TH1 is met (step S306). If T1<TH1 is met (step S306: YES), the rotor position determination circuit 75 determines that the rotor position is in the region R11 (step S307) and determines whether or not T2<TH3 is met (step S308). If T2<TH3 is met (step S308: YES), the rotor position determination circuit 75 determines that the rotor position is in the region R13 (step S309). Otherwise (step S308: NO), the rotor position determination circuit 75 determines that the rotor position is in the region R14 (step S310).

On the other hand, if T1<TH1 is not met (step S306: NO), the rotor position determination circuit 75 determines that the rotor position is in the region R12 (step S311) and determines whether or not T2<TH4 is met (step S312). If T2<TH4 is met (step S312: YES), the rotor position determination circuit 75 determines that the rotor position is in the region R15 (step S313). Otherwise (step S312: NO), the rotor position determination circuit 75 determines that the rotor position is in the region R14 (step S314).

On the other hand, if Uv=1 and Wv=0 (step S305: YES), the rotor position determination circuit 75 determines if T1<TH1 is met (step S315). If T1<TH1 is met (step S315: YES), the rotor position determination circuit 75 determines that the rotor position is in the region R22 (step S316) and determines whether or not T2<TH2 is met (step S317). If T2<TH2 is met (step S317: YES), the rotor position determination circuit 75 determines that the rotor position is in the region R25 (step S318). Otherwise (step S317: NO), the rotor position determination circuit 75 determines that the rotor position is in the region R24 (step S319).

On the other hand, if T1<TH1 is not met (step S315: NO), the rotor position determination circuit 75 determines that the rotor position is in the region R21 (step S320) and determines whether or not T2<TH4 is met (step S321). If T2<TH4 is met (step S321: YES), the rotor position determination circuit 75 determines that the rotor position is in the region R23 (step S322). Otherwise (step S321: NO), the rotor position determination circuit 75 determines that the rotor position is in the region R24 (step S323).

As described above, the rotor position determination circuit 75 detects the positional relationship by determining the plurality of regions that cross over the switching positions of the energization patterns to the armature unit 161 at the start of the rotation of the starting power generator 1. Thus, when the stage determination processing shown in FIG. 5 is completed, in step S14 shown in FIG. 5, an energization mode shown in FIGS. 45 and 46 is selected based on the determination result indicating in which of the regions R11 to R15 or R21 to R25 the rotor is positioned.

Therefore, according to the third embodiment, it is possible to always generate the maximum torque by using the energization patterns shown in FIG. 45 and reliably start the motor even when the battery is exhausted.

As described above, according to the respective embodiments of the present invention, in both cases where the starter generator 1 in which the winding portion ACG1 and the winding portion ACG2 are arranged in parallel is used for starting the engine 2 and where the starter generator 1 is used as the power generator, the winding portion ACG2 is used as a detection winding for detecting the position of the rotor, it is possible to detect the position of the rotor with high accuracy without providing a Hall sensor. Therefore, it is unnecessary to dispose an expensive Hall sensor in accordance with high mounting accuracy, thereby making it possible to provide a starter generator capable of detecting the rotor at low cost and with high accuracy.

Additionally, according to the respective embodiments of the present invention, when a predetermined line-to-line voltage is applied to the winding portion ACG1 (first multi-phase winding) only once, a value of the phase voltage generated in the winding portion ACG2 (second multi-phase winding) is detected, thereby making it possible to determine the stop position of the rotor. According to this, current detection can be made unnecessary. In other words, according to the first embodiment of the present invention, when the output voltage of the battery is applied to the first multi-phase winding for a predetermined time, the time widths of the two or more predetermined voltages generated in the two or more the windings constituting the second multi-phase windings are detected, thereby making it possible to detect the stop position of the rotor. According to this, current detection can be made unnecessary. Additionally, according to the first embodiment of the present invention, it is possible to determine the stop position (stage or region) of the rotor by one-time energization, so that the determination time and power consumption can be reduced. Further, in the vicinity of the boundaries of the stages and regions, it is possible to determine in which of the two adjacent stages and regions the rotor is positioned by comparing the time widths, so that the position detection accuracy in the vicinity of the boundaries of the stages and boundaries can easily be increased.

Here, the embodiments of the present invention are not limited to the above-described ones, and designs and the like within the scope not deviating from the gist of the invention are included. For example, when the stop position is detected, position determination may be performed based on the induced voltages of the U2-phase, the W2-phase, and the V2-phase, taking into consideration the generation time of the voltage of the V2-phase, the pulse width, or the difference value in pulse width. Additionally, when the stop position is detected, the position determination may be performed by measuring the voltage generated in the secondary winding in a state where the three phases U1, W1 and V1 are energized.

DESCRIPTION OF REFERENCE NUMERALS 100, 100a, 100b: starting power generation control apparatus
1 starter generator
ACG1, ACG2 winding portion
61, 61b first power conversion unit
62, 62a second power conversion unit
7, 7a, 7b control unit
U1, V1, W1, U2, V2, W2 windings
72 CPU
73 detection and determination circuit
74 zero-cross detection circuit
75, 75c rotor position determination circuit
Q1 to Q14, Q17 to Q19 MOSFET

The invention claimed is:

1. A starting power generation apparatus comprising:
a starter generator including
a field portion having a permanent magnet, and
an armature unit including a first multi-phase winding and a second multi-phase winding which are arranged in parallel;
a first power conversion unit including a first positive-side DC terminal connected to a battery and a plurality of first AC terminals connected to the first multi-phase winding, the first power conversion unit being configured to convert a power bidirectionally between DC and AC;
a second power conversion unit including a plurality of second AC terminals connected to the second multi-phase winding, the second power conversion unit being configured to control a current to be input and output via the second AC terminals; and
a control unit configured to
detect a positional relationship between the field portion and the armature unit based on an output voltage of the second multi-phase winding, and
control the first power conversion unit and the second power conversion unit in accordance with the positional relationship detected,
wherein the control unit is configured to detect the positional relationship when the starter generator is stopped, based on time widths of two or more predetermined voltages generated in two or more windings constituting the second multi-phase winding in a case that an output voltage of the battery is applied to the first multi-phase winding for a predetermined time in a state where current input and output via the second AC terminals is off.

2. The starting power generation apparatus according to claim 1, wherein
the control unit is configured to compare the time widths of the two or more predetermined voltages and a plurality of determination values having different voltage dependencies, thereby detecting the positional relationship when the starter generator is stopped.

3. The starting power generation apparatus according to claim 1, wherein
the control unit is configured to compare the time widths of the two or more predetermined voltages, a difference value between the time widths of the two or more predetermined voltages, and a plurality of determination values having different voltage dependencies, thereby detecting the positional relationship when the starter generator is stopped.

4. The starting power generation apparatus according to claim 1, wherein
the control unit is configured to detect the positional relationship for each of regions predetermined, and
each of the regions is set so that a phase difference between a magnetic flux vector formed by the field portion on a boundary of each region and a current vector flowing in the multi-phase winding can be 120°.

5. The starting power generation apparatus according to claim 1, wherein
the control unit is configured to determine a plurality of regions crossing over switching positions of energization patterns to the armature unit at start of rotation of the starter generator, thereby detecting the positional relationship when the starter generator is stopped.

6. The starting power generation apparatus according to claim 1, wherein
the predetermined voltage is a voltage at which voltages generated in the two or more windings exceed a predetermined threshold value, and
the threshold value is set based on the output voltage of the battery.

7. A starting power generation method using:
a starter generator including
a field portion having a permanent magnet, and
an armature unit including a first multi-phase winding and a second multi-phase winding which are arranged in parallel;
a first power conversion unit including a first positive-side DC terminal connected to a battery and a plurality of first AC terminals connected to the first multi-phase winding, the first power conversion unit being configured to convert a power bidirectionally between DC and AC;
a second power conversion unit including a plurality of second AC terminals connected to the second multi-phase winding, the second power conversion unit being configured to control a current to be input and output via the second AC terminals; and
a control unit configured to
detect a positional relationship between the field portion and the armature unit based on an output voltage of the second multi-phase winding, and
control the first power conversion unit and the second power conversion unit in accordance with the positional relationship detected,
the starting power generation method comprising:
detecting, by the control unit, the positional relationship when the starter generator is stopped, based on time widths of two or more predetermined voltages generated in two or more windings constituting the second multi-phase winding in a case that an output voltage of the battery is applied to the first multi-phase winding for a predetermined time in a state where current input and output via the second AC terminals is off.

* * * * *